United States Patent
Tohkairin

[11] Patent Number: 5,963,398
[45] Date of Patent: Oct. 5, 1999

[54] DISK APPARATUS WITH VOICE COIL MOTOR

[75] Inventor: Koichi Tohkairin, Higashine, Japan

[73] Assignee: Fujitsu Limited, Kawasaki, Japan

[21] Appl. No.: 08/802,165

[22] Filed: Feb. 18, 1997

Related U.S. Application Data

[62] Division of application No. 08/435,132, May 5, 1995, Pat. No. 5,798,885.

[30] Foreign Application Priority Data

| Jun. 6, 1994 | [JP] | Japan | 6-123743 |
| Jun. 7, 1994 | [JP] | Japan | 6-125123 |
| Jun. 10, 1994 | [JP] | Japan | 6-128617 |

[51] Int. Cl.$^6$ .................................................. G11B 5/55
[52] U.S. Cl. ............................................................ 360/106
[58] Field of Search ............................................. 360/106

[56] References Cited

U.S. PATENT DOCUMENTS

| 3,576,454 | 4/1971 | Beach .................................. 360/106 |
| 4,707,754 | 11/1987 | Patel et al. . |
| 4,980,787 | 12/1990 | Iwanaga . |
| 5,109,521 | 4/1992 | Culley . |
| 5,130,873 | 7/1992 | Yumura et al. . |
| 5,373,513 | 12/1994 | Howe et al. ............................ 371/42 |
| 5,381,281 | 1/1995 | Shrinkle et al. ..................... 360/77.08 |
| 5,465,034 | 11/1995 | Andrews, Jr. et al. ............... 318/560 |
| 5,576,583 | 11/1996 | Umehara ............................... 360/106 |

FOREIGN PATENT DOCUMENTS

| 0316880 | 5/1989 | European Pat. Off. . |
| 0410462 | 1/1991 | European Pat. Off. . |
| 0419345 | 3/1991 | European Pat. Off. . |
| 55-34303 | 3/1980 | Japan . |
| 55-108969 | 8/1980 | Japan . |
| 55-157101 | 12/1980 | Japan . |
| 56-68901 | 6/1981 | Japan . |
| 56-093142 | 7/1981 | Japan . |
| 56-156971 | 12/1981 | Japan . |
| 57-29123 | 2/1982 | Japan . |
| 57-85567 | 5/1982 | Japan . |
| 57-152507 | 9/1982 | Japan . |
| 57-212666 | 12/1982 | Japan . |
| 59-47624 | 3/1984 | Japan . |
| 59-079351 | 5/1984 | Japan . |
| 60-186934 | 9/1985 | Japan . |
| 61-65346 | 4/1986 | Japan . |
| 61-114597 | 7/1986 | Japan . |
| 61-271631 | 12/1986 | Japan . |
| 62-221034 | 9/1987 | Japan . |
| 62-241054 | 10/1987 | Japan . |
| 62-270093 | 11/1987 | Japan . |
| 63-140472 | 6/1988 | Japan . |
| 63-184155 | 7/1988 | Japan . |
| 63-188871 | 8/1988 | Japan . |
| 1100777 | 4/1989 | Japan . |
| 1-192065 | 8/1989 | Japan . |
| 1-277376 | 11/1989 | Japan . |
| 2-156701 | 6/1990 | Japan . |
| 2-187971 | 7/1990 | Japan . |
| 2-236887 | 9/1990 | Japan . |
| 2-252182 | 10/1990 | Japan . |
| 2-135970 | 11/1990 | Japan . |
| 2-306490 | 12/1990 | Japan . |
| 2-307353 | 12/1990 | Japan . |
| 3-7047 | 1/1991 | Japan . |
| 3-7875 | 2/1991 | Japan . |
| 3-76055 | 4/1991 | Japan . |
| 3-99334 | 4/1991 | Japan . |
| 3-214481 | 9/1991 | Japan . |
| 3-214691 | 9/1991 | Japan . |

(List continued on next page.)

Primary Examiner—A. J. Heinz
Attorney, Agent, or Firm—Greer, Burns & Crain, Ltd.

[57] ABSTRACT

A disk apparatus has an actuator supporting a head and a motor for rotating the actuator. The motor has a flat movable coil supported by the actuator and a pair of permanent magnets supported by a pair of yokes. The coil moves in a space defined between the permanent magnets. The yokes are fixed to each other by an adsorption by the permanent magnets. An inner edge of the coils overlaps an outer edge of the permanent magnets.

6 Claims, 74 Drawing Sheets

FOREIGN PATENT DOCUMENTS

| | | |
|---|---|---|
| 4-76882 | 3/1992 | Japan . |
| 4-184538 | 7/1992 | Japan . |
| 4195776 | 7/1992 | Japan . |
| 4-221473 | 8/1992 | Japan . |
| 4302874 | 10/1992 | Japan . |
| 4-351765 | 12/1992 | Japan . |
| 4-355654 | 12/1992 | Japan . |
| 5-2462 | 1/1993 | Japan . |
| 5-62360 | 3/1993 | Japan . |
| 5210924 | 8/1993 | Japan . |
| 5242057 | 9/1993 | Japan . |
| 5289786 | 11/1993 | Japan . |
| 2505017 | 5/1996 | Japan . |
| 2683139 | 8/1997 | Japan . |
| 2184577 | 6/1987 | United Kingdom . |
| WO9102354 | 2/1991 | WIPO . |

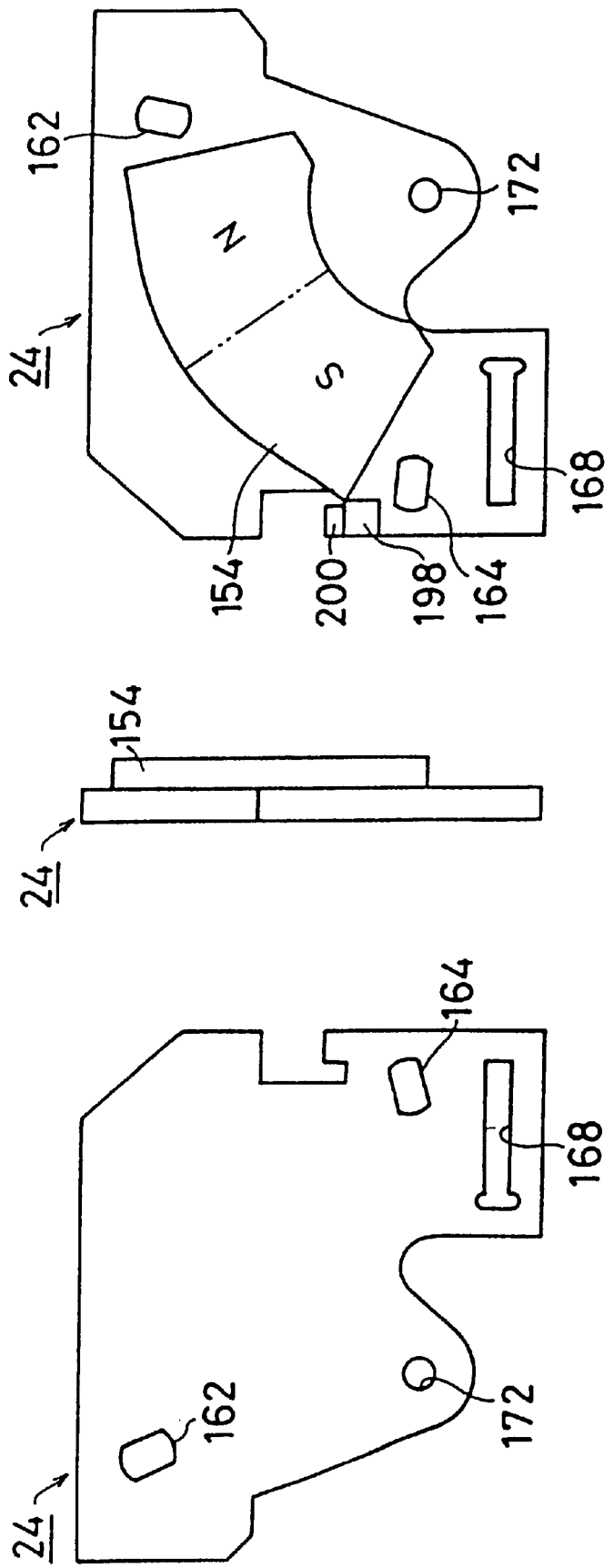

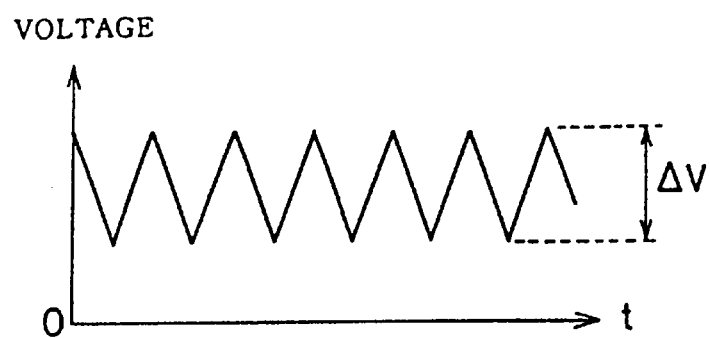
F I G. 3 9 A
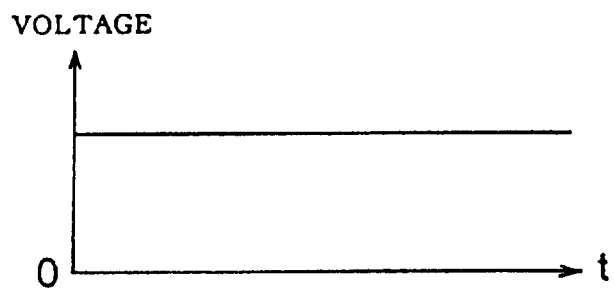
F I G. 3 9 B

FIG. 58A

| PULSE STATE | PEAK INTERVAL PATTERN |
|---|---|
| NORMAL PULSE | C ⇨ C ⇨ B ⇨ $\overline{A}$ |
| FIRST PULSE ABSENT | D ⇨ C ⇨ B ⇨ $\overline{A}$ |
| SECOND PULSE ABSENT | E ⇨ B ⇨ $\overline{A}$ |
| THIRD PULSE ABSENT | C ⇨ D ⇨ $\overline{A}$ |
| FOURTH PULSE ABSENT | B ⇨ B ⇨ $\overline{A} \cdot \overline{B}$ |

$\overline{A}$ SHOWS THE CONDITIONS OTHER THAN THE CONDITION A.

$\overline{A} \cdot \overline{B}$ SHOWS THE CONDITIONS OTHER THAN THE CONDITIONS A AND B.

FIG. 58B

| A | 1T |
|---|---|
| B | 2T ~ 4T |
| C | 5T ~ 7T |
| D | 8T ~ 10T |
| E | 11T ~ 13T |
| F | 14T ~ |

FIG. 59

| PULSE STATE | POLARITY PATTERN |
|---|---|
| NORMAL PULSE | + ⇨ − ⇨ + ⇨ − |
| FIRST PULSE ABSENT | − ⇨ − ⇨ + ⇨ − |
| SECOND PULSE ABSENT | + ⇨ + ⇨ − |
| THIRD PULSE ABSENT | + ⇨ − ⇨ − |
| FOURTH PULSE ABSENT | + ⇨ − ⇨ + |

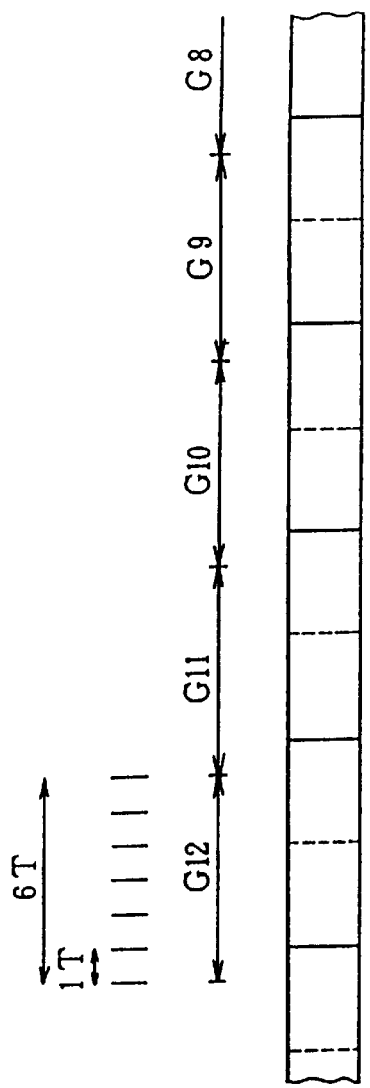
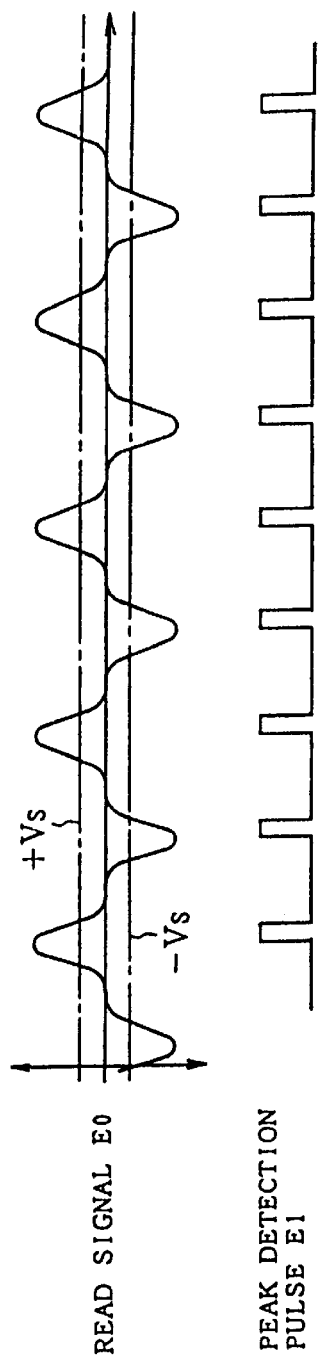
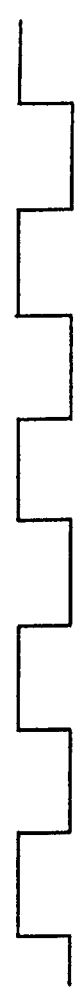
F I G. 6 3 A  GRAY CODE MAGNETIZATION PATTERN
F I G. 6 3 B  READ SIGNAL E0
F I G. 6 3 C  PEAK DETECTION PULSE E1
F I G. 6 3 D  POLARITY DETECTION SIGNAL E2

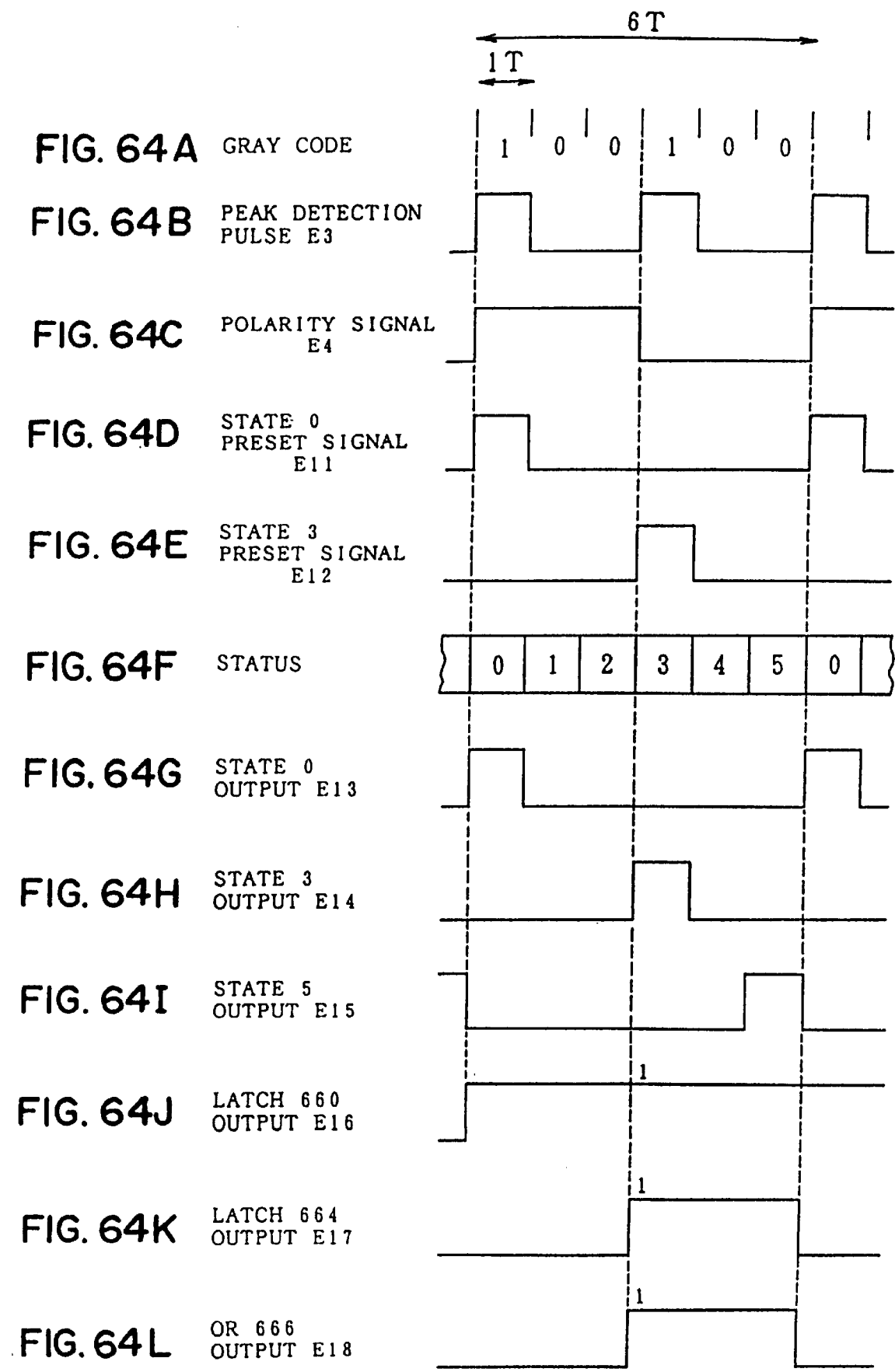

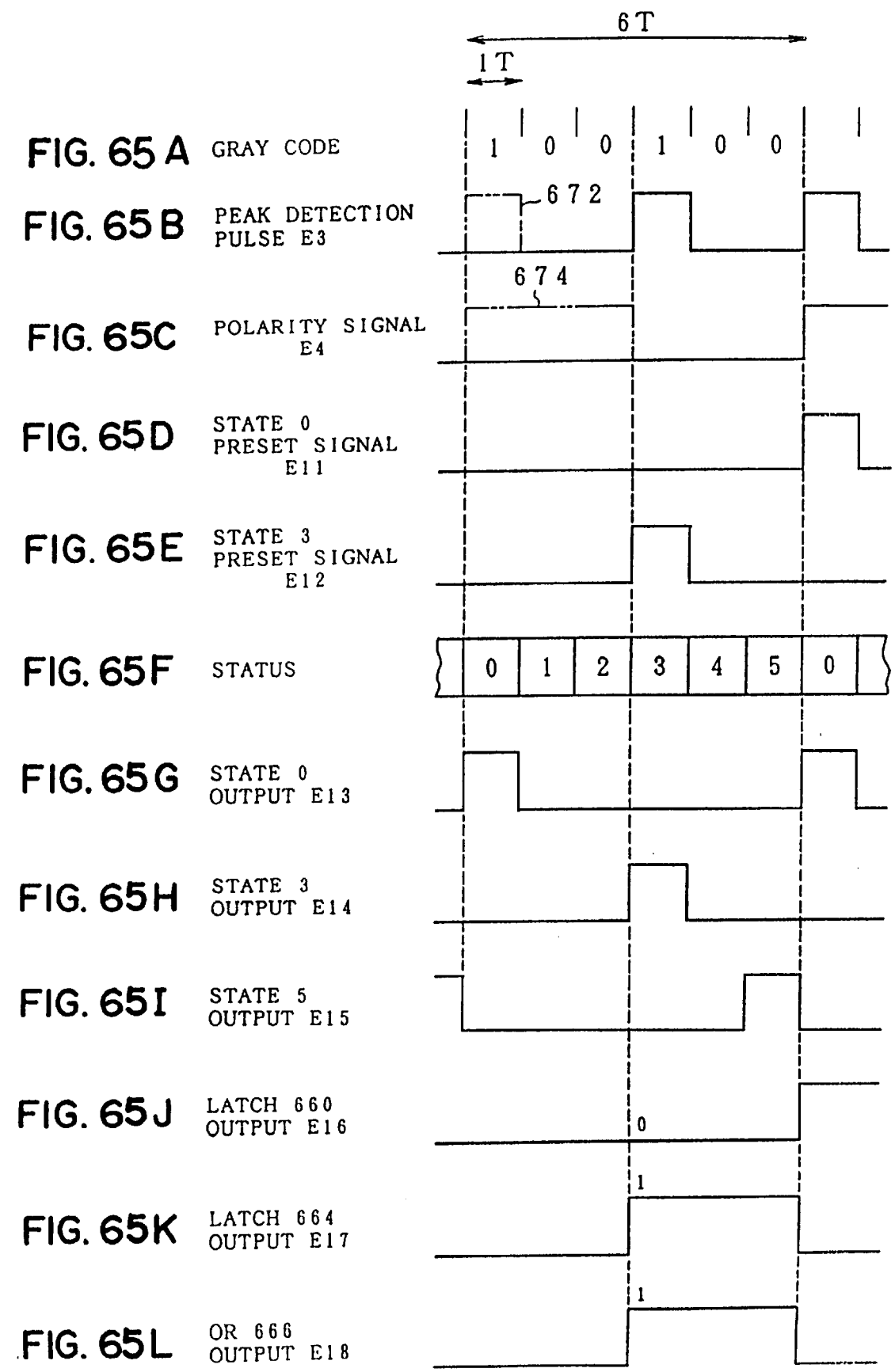

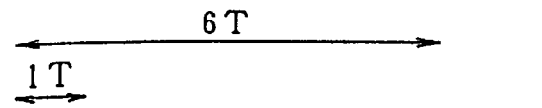
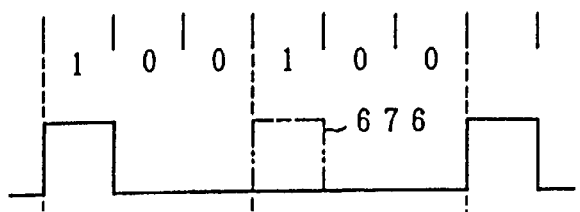
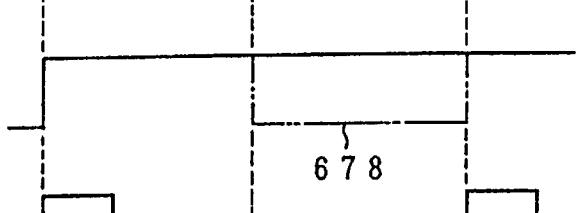
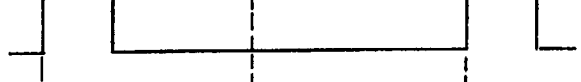
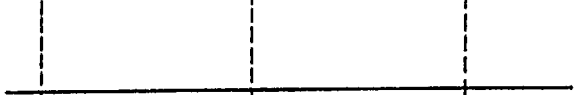
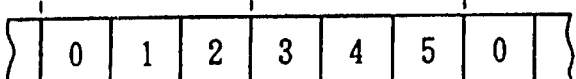
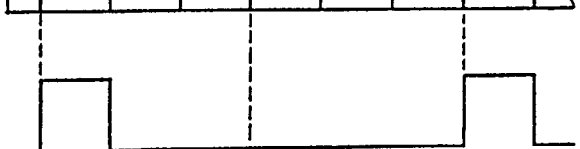
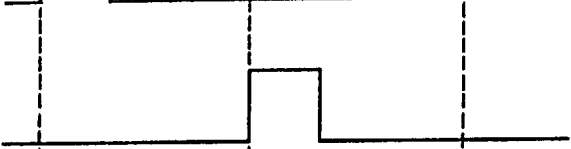
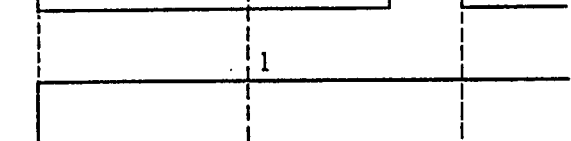
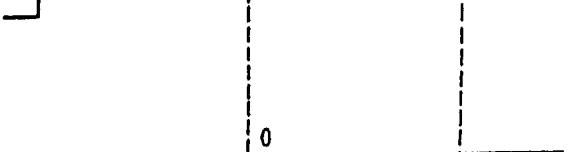
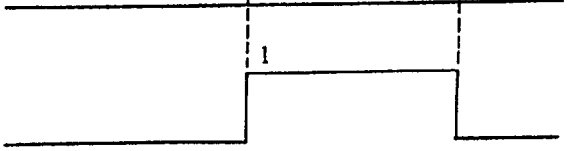
FIG. 66A  GRAY CODE
FIG. 66B  PEAK DETECTION PULSE E3
FIG. 66C  POLARITY SIGNAL E4
FIG. 66D  STATE 0 PRESET SIGNAL E11
FIG. 66E  STATE 3 PRESET SIGNAL E12
FIG. 66F  STATUS
FIG. 66G  STATE 0 OUTPUT E13
FIG. 66H  STATE 3 OUTPUT E14
FIG. 66I  STATE 5 OUTPUT E15
FIG. 66J  LATCH 660 OUTPUT E16
FIG. 66K  LATCH 664 OUTPUT E17
FIG. 66L  OR 666 OUTPUT E18

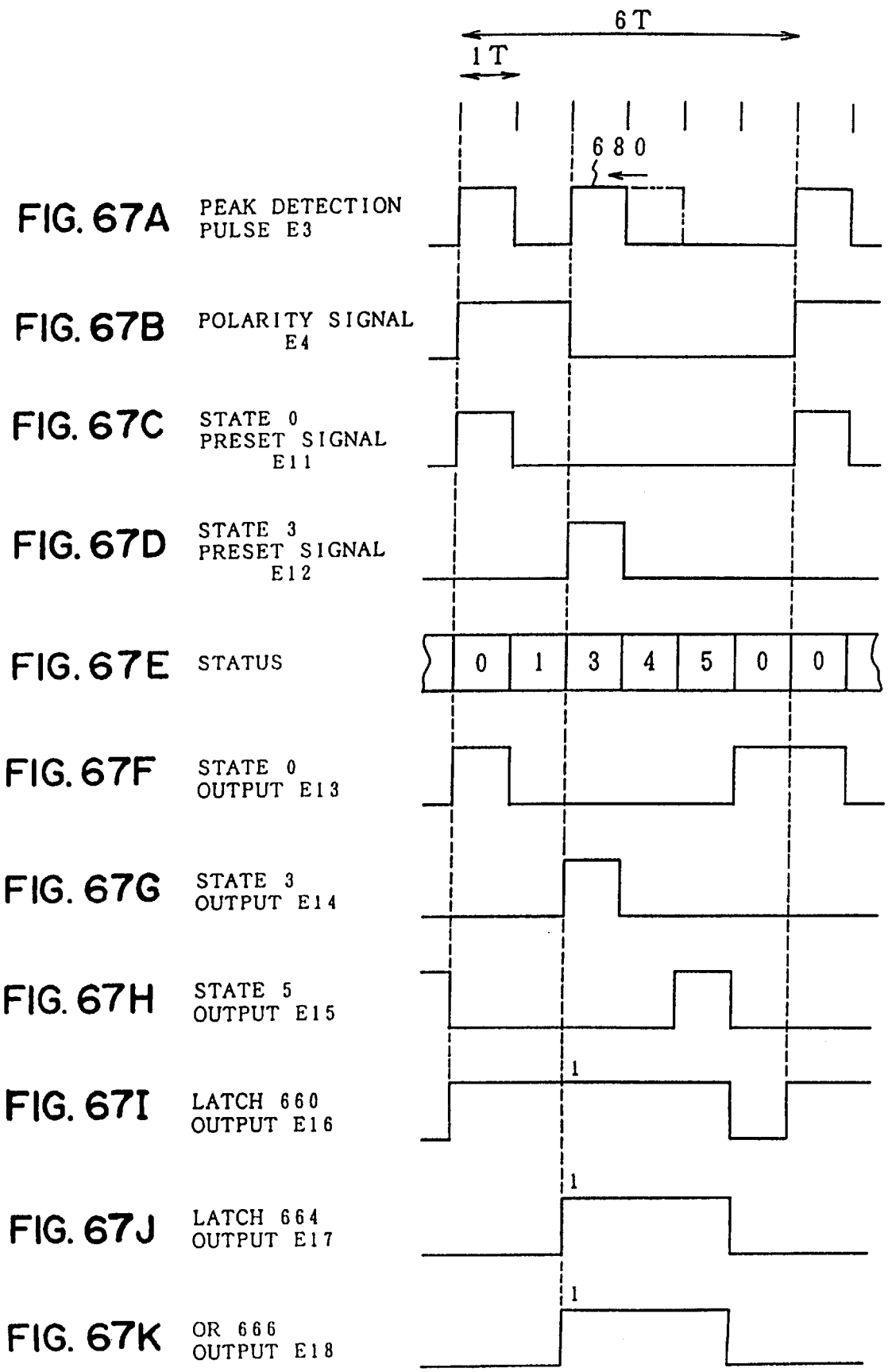

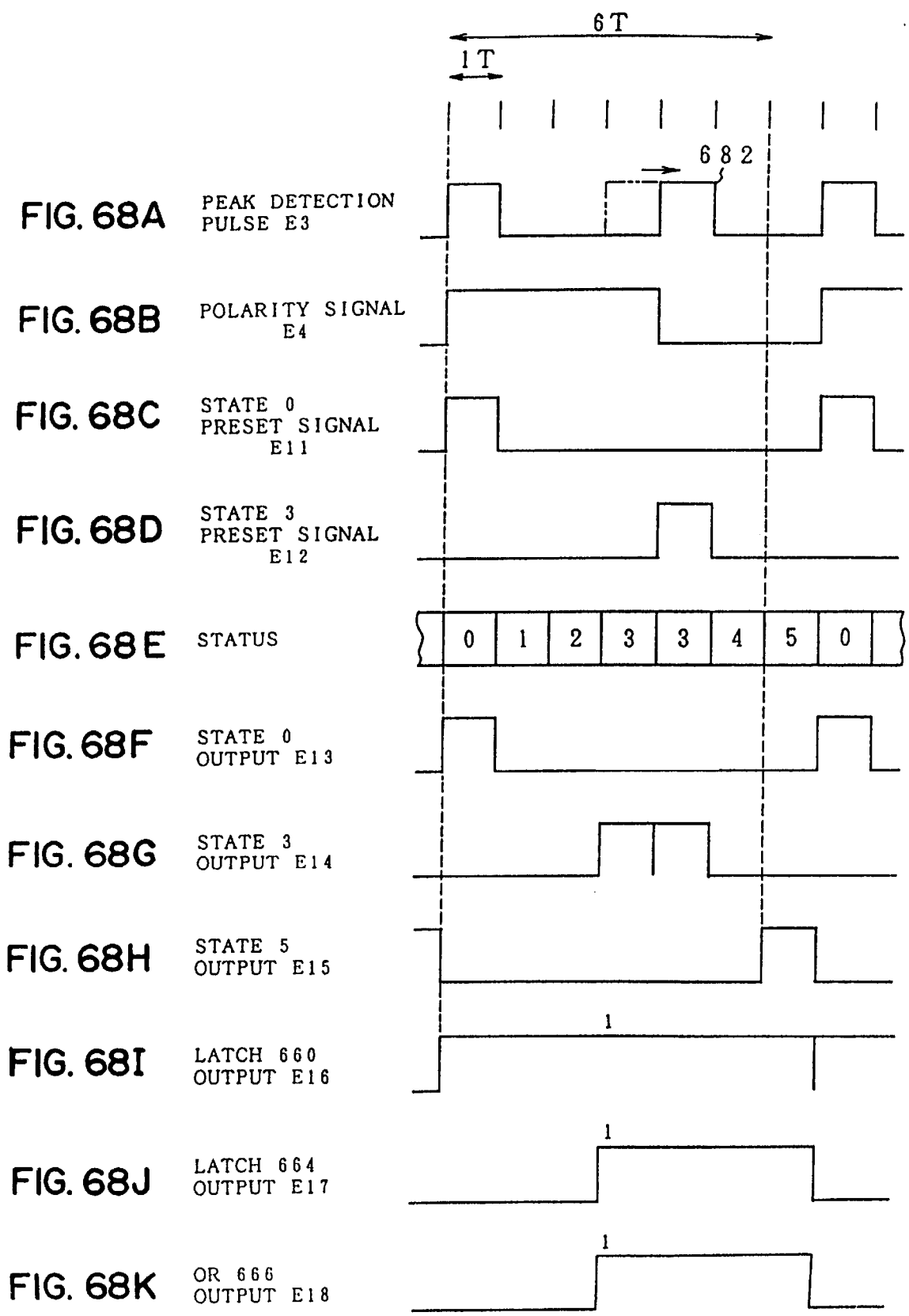

FIG. 70

| SECTOR NO. | CORRECTION VALUE | 694 |
|---|---|---|
| 0 | $X_0$ | |
| 1 | $X_1$ | |
| 2 | $X_2$ | |
| 3 | $X_3$ | |
| ⋮ | ⋮ | |
| 58 | $X_{58}$ | |
| 59 | $X_{59}$ | |

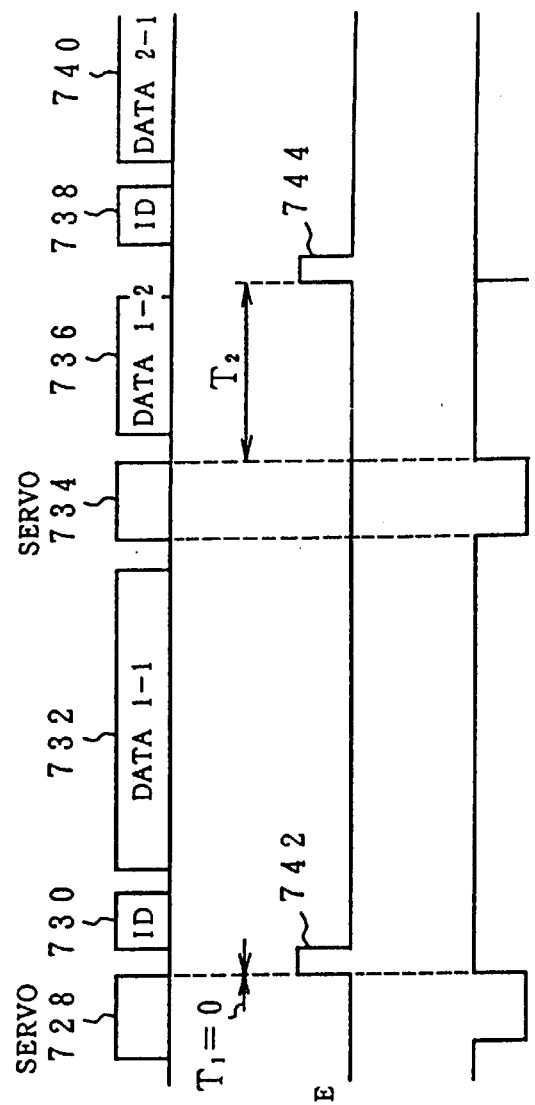

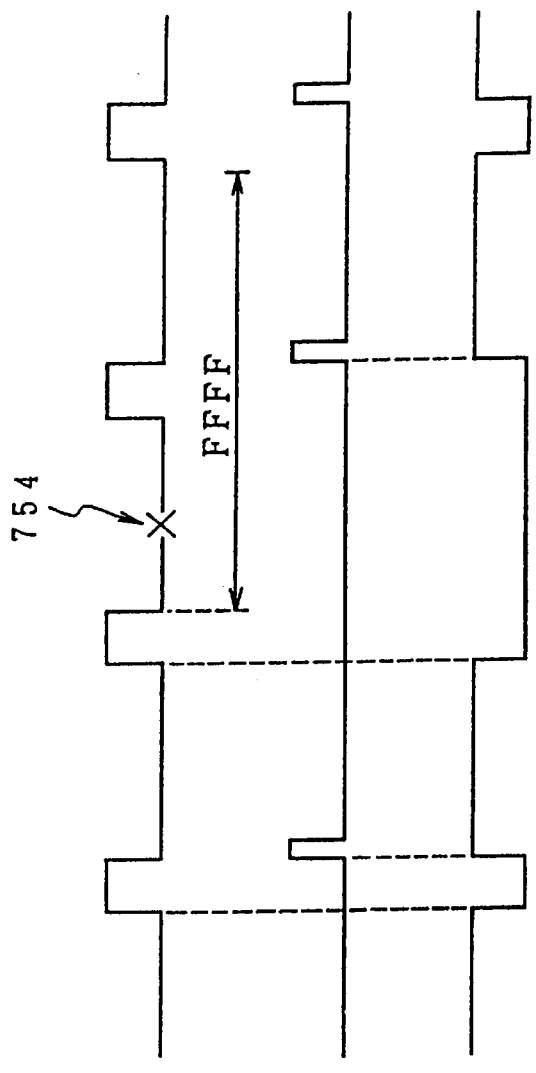

F I G. 77A   SERVO FRAME
F I G. 77B   SECTOR PULSE
F I G. 77C   DIGITAL ERROR WRITE TEST
F I G. 77D   DIGITAL ERROR READ TEST

FIG. 82

| | |
|---|---|
| SPINDLE MOTOR CONTROL PROGRAM | 1088 |
| SEEK CONTROL PROGRAM | 1090 |
| READING/WRITING/FORMAT OPERATION CONTROL PROGRAM | 1092 |
| HOST INTERFACE CONTROL PROGRAM | 1094 |
| CACHE/DATA BUFFER CONTROL PROGRAM | 1096 |
| SCSI COMMAND CONTROL PROGRAM | 1098 |
| DEFECTIVE BLOCK MANAGEMENT PROGRAM | 1100 |
| ECC ERROR CORRECTION PROGRAM | 1102 |
| ENTRY ADDRESS TABLE | 1068 |

(1066 brackets the upper programs)

| ENTRY ADDRESS | PROGRAM MODULE ID |
|---|---|
| A100 | SPINDLE MOTOR CONTROL PROGRAM |
| A101 | SEEK CONTROL PROGRAM |
| A102 | READING/WRITING/FORMAT OPERATION CONTROL PROGRAM |
| A103 | HOST INTERFACE CONTROL PROGRAM |
| A104 | CACHE/DATA BUFFER CONTROL PROGRAM |
| A105 | SCSI COMMAND CONTROL PROGRAM |
| A106 | DEFECTIVE BLOCK MANAGEMENT PROGRAM |
| A107 | ECC ERROR CORRECTION PROGRAM |

1072

| ENTRY ADDRESS | PROGRAM MODULE ID |
|---|---|
| A007 | IDLE PROGRAM |
| A100 | SPINDLE MOTOR CONTROL PROGRAM |
| A101 | SEEK CONTROL PROGRAM |
| A102 | READING/WRITING/FORMAT OPERATION CONTROL PROGRAM |
| A103 | HOST INTERFACE CONTROL PROGRAM |
| A104 | CACHE/DATA BUFFER CONTROL PROGRAM |
| A105 | SCSI COMMAND CONTROL PROGRAM |
| A106 | DEFECTIVE BLOCK MANAGEMENT PROGRAM |
| A107 | ECC ERROR CORRECTION PROGRAM |

DISK APPARATUS WITH VOICE COIL MOTOR

This is a divisional of application Ser. No. 08/435,132 filed on May 5, 1995 now U.S. Pat. No. 5,798,885.

BACKGROUND OF THE INVENTION

The present invention relates to a disk apparatus which can increase a memory capacity and can realize a small and thin shape and, more particularly, to a small disk apparatus using a disk medium of 2.5 inches.

The invention relates to a disk apparatus of a sector servo system for positioning a head on the basis of servo information recorded on a data surface and, more particularly, relates to a disk apparatus which accurately detects a sector mark and a gray code indicative of a cylinder address which have been recorded in a servo frame at the head of a sector together with servo information.

Further, the invention relates to a data processing apparatus including a disk apparatus which is controlled by a microprocessor and also relates to a power saving method of such an apparatus. More particularly, the invention relates to a data processing apparatus in which a program memory is constructed by a ROM and a RAM of different electric power consumptions and also relates to a power saving method of such an apparatus.

In recent years, a small hard disk has been installed as an external memory apparatus of a notebook type computer or a portable communication terminal. As such a small hard disk, for example, a hard disk having therein two or three small disk media of 2.5 inches is used. In such a small disk apparatus, in addition to an enlargement of a memory capacity, a miniaturization, a light weight, and a thin shape of the apparatus are further requested. The miniaturization, light weight, and thin shape of the disk apparatus reduce an installation space when the apparatus is installed in a notebook type computer or the like. The whole computer including a magnetic disk apparatus is miniaturized and can be easily carried. Further, drive loads of a spindle motor and a voice coil motor are reduced, so that the electric power consumption can be saved. The notebook type computer or portable communication terminal can operate by a battery power source. The performance is, therefore, decided by a period of time during which the computer or terminal can be used without charging the battery. Thus, when the electric power consumption of the disk apparatus decreases, the battery's usable time increases by a time corresponding to such a decreased power consumption and the performance is improved. In order to further accomplish a small size, light weight, and thin shape of the disk apparatus, however, there are the following various problems.

In an actuator of the in-line type for positioning a head, an arm portion for supporting the head is provided at one end of a rotary shaft and a movable coil of a voice coil motor is provided at the other end of the rotary shaft. The actuator must accomplish both the light weight and a balance between the head side and the coil side. Particularly, in recent years, the actuator has an asymmetrical arm shape in which the front edge of the arm is bent to the disk center side in a manner such that even if the rotational position of the actuator changes, the head direction does not largely deviate from the track tangent line. Thus, in addition to a balance adjustment in the front/rear direction, a balance in the right/left direction in association with the asymmetrical arm shape has to be obtained. Hitherto, such a balance adjustment is performed by a weight adjustment such as to change the thicknesses of the right and left portions of the movable coil on the installation side, or the like. However, designing works to simultaneously adjust both the balance in the front/rear direction and the balance in the right/left direction of the actuator by adjusting the thicknesses is complicated. There is a problem such that even if the weight balance is obtained, the shape balance is largely lost, or the like.

In the voice coil motor for driving the actuator of the head, a yoke having a permanent magnet is fixed and arranged to a casing base for the movable coil on the actuator side. Hitherto, the yoke side having the permanent magnet is assembled and fixed by screws, an adhesive agent, caulking, or the like. Therefore, the number of parts and the number of assembling steps increase and the assembling works are complicated.

In the conventional voice coil motor, the magnet on the yoke side is set to the same size as that of each of the coil portions on the right and left sides of the rectangular movable coil on the actuator side, thereby allowing a magnetic flux to pass through the coil effective portion to generate a rotational torque. A magnetic flux density of the coil at the edge portion of the magnet decreases, however, due to a leakage magnetic flux and the coil effective length is not fully used.

In the disk apparatus, generally, the actuator on the movable side and the circuit board on the fixed side are coupled by a connecting band of a flexible printed circuit (hereinlater, referred to as 'FPC'). In this case, the assembling work to position and fix the FPC connecting band to the fixed side is important. When there is a small mistake in the assembling work, a variation easily occurs in the bending state of the FPC connecting band by the driving of the actuator, so that there are problems such that a force that is applied to the actuator abnormally changes, the FPC connecting band shakes and may come into contact with the parts such as IC, resister, and the like during the driving.

An MR head using a magnetoresistive device is used as a read head in order to improve a recording density by reducing a track pitch of the disk medium. In the reading operation of the MR head, in order to assure a high S/N ratio of an ultra weak read signal, a specified DC bias current is supplied to the MR head. When the bias current flows in the MR head, a head core has a potential. In the case where the head core comes into contact with the disk medium, there is a danger such that the current flows between the core and the disk medium and the head core are destructed. To avoid such a situation, it is necessary for the disk medium to have the same potential as that of the head core. Hitherto, the signal line is independently arranged from a circuit portion which is fixedly installed to the actuator side and the bias voltage is also supplied to the disk medium. Therefore, there are problems such that the parts arrangement is complicated and the number of working steps also increases by an amount corresponding to that an exclusive-use bias supply line is provided and further, an external force due to the exclusive-use bias line is applied to the actuator.

Further, in case of using the MR head as a read head, there is a problem such that when the read signal passes in the circuit pattern formed on the FPC connecting band, external noises are superimposed on the circuit pattern as induction noises, so that the S/N ratio deteriorates.

Further, in association with the supply of the bias to the MR head in the reading operation, a disk enclosure itself having the disk mechanism therein has a certain potential. For instance, when the disk apparatus is assembled as an external memory apparatus into the notebook type computer, a problem such that the apparatus has to be insulated from the assembled apparatus newly occurs.

In the small hard disk, an exclusive-use servo surface on which the servo information for positioning the head has been recorded as in the conventional large disk apparatus cannot be provided. A sector servo system in which the servo information has been recorded on the data surface is used. For example, one cylinder is divided into 60 sectors and a servo frame is recorded to the head of each sector. A sector mark indicative of the servo frame, a gray code to detect a cylinder address, an index pattern (only for the head sector), an AGC pattern to set an AGC level of a reading amplifier, and a servo pattern to detect the head position are magnetically recorded in the servo frame.

In the disk apparatus using the sector servo system, since a data area in the sector can be enlarged as the servo frame is short, it is desired to minimize each pattern which is recorded in the servo frame in order to increase the memory capacity.

On the contrary, in order to raise a precision of the pattern detection of the sector mark, gray code, or the like recorded in the servo frame, a recording pitch in the cylinder direction per pattern is enlarged. For example, the sector mark has a recording pattern of "N☐S☐NS". When a recording period that is decided by a reference clock assumes (T), it is recorded as "16T, 16T, 10T, 10T" and an interval of total 52T is needed.

For example, when one bit width is equal to 6T, in the gray code that is recorded subsequent to the sector mark, 14 bits of "G12, G11, . . . , G0, GH" are recorded by the gray code "X000X000". The gray code has a length of 84T. Further, an interval of about 160T is necessary as a position area. Thus, an interval of 196T is needed as a whole servo frame.

Now, assuming that an interval between one servo frame and the next servo frame is equal to 3600T, the servo area occupies 5.4% of one track. By shortening the sector mark and gray code, the memory capacity can be increased. However, when the sector mark and gray code are shortened, the pattern detecting precision deteriorates. Therefore, there is a limitation in length of each of the sector mark and gray code.

On the other hand, in the conventional disk apparatus using the sector servo system, a deviation value due to an eccentricity of the disk medium is measured and the eccentricity is corrected at the time of an on-track control. In the measurement of the eccentricity correction value for this purpose, a command for the eccentricity correction is generated every predetermined time and a deviation amount from the track center is stored into an RAM or the like. In an ordinary on-track control, the deviation amount which has already been measured is subtracted from the target position and the on-track control is performed, thereby enabling the head to be always positioned to the track center.

Since the eccentricity correction value, however, is measured every predetermined time, the correction is performed with the previous measurement value for a period of time between the measurement and the subsequent measurement, so that the invention cannot cope with the eccentricity due to a temperature change or the like.

Further, in the disk apparatus using the sector servo system, since servo frames have fixedly been recorded on the cylinder, the sector size is basically fixed. However, in order to enable a data block exceeding a fixed sector length or a plurality of the data blocks which can be put into the fixed sector length to be handled, it is actually necessary to use a variable sector size which can vary the generating position of the sector pulse.

In addition to the data block size, the process for making the sector size variable ignores a defective sector and makes an exchanging process unnecessary so that the apparatus has to cope with various requests such as slipping process for inhibiting the generation of the sector pulse and, further, a generation of the sector pulse which is completely synchronized with the servo frame at the time of a digital error test, and the like.

In the hard disk which is installed in a notebook type computer or the like, a minimum program necessary to make the system operative is generally stored in an ROM (read only memory). A dynamic RAM (hereinlater, referred to as "DRAM") which is cheap in costs is used to store control programs which are used for a seeking process and reading and writing processes. The control program is downloaded from the disk medium to the DRAM when the system is made operative.

As one of the performances of a portable apparatus such as a notebook type computer, there is an operable time by a battery power supply. It is desired to extend the operable time by the battery power supply as much as possible. Consequently, with respect to an external memory apparatus such as a hard disk or the like which is installed in the notebook type computer, the apparatus of a small electric power consumption is desired.

When a microprocessor uses a DRAM and operates in a hard disk, a refreshing operation for rewriting data which was written or read to/from the DRAM is needed interlockingly with the reading or writing operation. Therefore, a current consumption of the DRAM increases to, for example, 150 mA at the time of the reading and writing operations and the refreshing operation. The current consumption of the DRAM is equal to about 1 mA when there is no access and the electric power consumption increases when the number of accesses increases.

Therefore, the electric power which is consumed when using the program on the memory constructed by the ROM is smaller than when using the program on the memory constructed by the DRAM. Therefore, it is considered that all of program memories are constructed by the ROMs in order to reduce the power consumption.

In case of constructing all of the program memories by only ROMs, however, there is a problem such that the apparatus cannot correspond to a program change such as a version-up or the like. Since the ROM cannot correspond to a revised version (program change), the apparatus has been programmed so as to access to the DRAM except in the modes other than the initial loading.

Although it is also considered to use a rewritable non-volatile EEPROM, since the costs rise, it is difficult to realize such an apparatus.

SUMMARY OF THE INVENTION

According to the invention, there is provided a disk apparatus which can eliminate a spatial vain due to an arrangement of parts and can be miniaturized and can maintain a high quality in spite of the miniaturization.

It is an object of the present invention to realize a disk apparatus comprising: a disk medium which is rotated by a spindle motor; an actuator for movably supporting a head in the radial direction for a recording surface of the disk medium; and a voice coil motor (VCM) for rotating the actuator in a range of a predetermined rotational angle.

According to the invention, a disk apparatus having an actuator which has a relatively simple shape and is balanced is provided. The actuator comprises: an arm portion having a head at a front edge; an axis attaching portion integrally formed at a root portion of the arm portion; and a coil supporting portion which is integrally formed in the rear portion of the axis attaching portion and which supports a movable coil of the voice coil motor. The arm portion, axis attaching portion, and coil supporting portion are arranged so that the position of the center of gravity is located on the coil side on the straight line connecting the rotational center of the actuator and the position of the center of gravity on the head side. In this instance, the arm portion of the actuator has an asymmetrical shape such that the front edge side to which the head is attached is bent to the disk center side.

The coil side is rotated and positioned so that the position of the center of gravity on the coil side is located on the straight line for the position of the center of gravity calculated on the head side so as to sandwich the rotational center of the actuator while setting such a rotational center to a boundary. Consequently, even in the actuator having an asymmetrical shape with respect to the right and left, an actuator having a relatively simple shape and a preferable balance in the right/left direction and the front/rear direction is obtained. A structure which is highly stable against an external vibration or an impact is realized.

According to the invention, there is provided a disk apparatus which can easily assemble the yoke side of a voice coil motor by a small number of parts. The yoke side of the voice coil motor is assembled by using an adsorbing force of a magnet. The voice coil motor first comprises: a flat movable coil supported on the actuator side; a pair of permanent magnets which are fixedly arranged at positions so as to sandwich the movable coil; and a pair of yoke members for supporting each of the permanent magnets and forming a magnetic circuit. The pair of yoke members are assembled and fixed by an absorption of the permanent magnets, thereby forming an assembly structure for forming an enclosing space of the movable coil. Specifically speaking, flat plate members are used for the pair of yoke members. A plurality of upright members to decide a coil enclosing interval between the pair of permanent magnets are provided for one of the plate members and a projection for positioning is provided at a front edge of at least one of the upright members. Further, a reception hole for positioning is formed at the position of the other plate member which faces the projection.

Since the yokes are assembled and fixed by using an attracting force of the magnet, screws, an adhesive agent, caulking, or the like is unnecessary to assemble the yokes. The number of parts and the number of assembling steps can be reduced and the assembling works can be simplified.

According to the invention, there is provided a disk apparatus which makes the most of an effective length of the coil so as to increase a generation torque of the magnetic circuit. The front and rear outer edges of the pair of permanent magnets are slightly overlapped to the inner edges of the front and rear portions of the coil in the radial direction of the arm in the movable coil. A magnetic flux of the permanent magnet is allowed to pass while outside of right and left torque generation effective portions of the movable coil.

A magnetic flux density in an edge portion of the magnet decreases by the generation of a leakage magnetic flux which does not pass the coil. However, the edge portions of the magnet are enlarged up to the front and rear portions of the coil exceeding the right and left torque generation effective portions of the coil. Thus, with respect to the magnet edge portions as well, by allowing a uniform magnet flux to pass through the right and left torque generation effective portions of the coil, the coil effective length is fully used. Consequently, the effective length of the coil can be substantially increased and the rotational torque which is generated by the magnetic circuit can be increased. That is, in association with the enlargement of the magnet in the front/rear direction, the rotational torque and a thrust force of the actuator are also simultaneously increased by the magnetic flux which passes through the front and rear portions of the coil. Therefore, the widths to overlap the front and rear portions of the coil of the magnet are decided so as to increase the rotational torque in a range such that the thrust force does not exceed a specified value.

According to the invention, there is provided a disk apparatus which can easily fix and assemble an FPC connecting band at a high positioning precision and can prevent a contact with other parts due to a shake and can stabilize a force that is applied to the actuator. The invention uses a one-touch fixing structure for this purpose. According to the one-touch fixing structure, a band leading portion which is bent upward from a circuit board and in which a connecting band is integrally led out from one of the upright side edges through a J-shaped bent portion and a plate member on which the circuit board is fixed and in which a band supporting portion, having a J-shaped receiving portion to fix the band leading portion to the side surface, is bent upward, are provided on the fixed side and the FPC connecting band is held by attaching a band pressing member. The band pressing member has a plate spring shape which is folded so as to form two plates and fixes and holds the root portion of the band by pressing a reverse J-shaped pressing portion formed at a front edge of one of the two plate spring portions into the J-shaped receiving portion of the band supporting portion in a one-touch manner. A projection adapted to be fitted into an engaging hole formed in the band supporting portion is provided at the front edge of the other folded plate spring portion, thereby preventing the band pressing member from being pulled out. A positioning member is formed at the side edge of the folded plate spring portion for pressing the band for the band supporting portion, thereby positioning the connecting band.

As mentioned above, by attaching the band pressing member having a spring performance to the FPC connecting band in a one-touch manner, the FPC connecting band is fixedly supported and a shake of the fixed portion is prevented so that a danger of the contact with the other parts is eliminated. A variation of an external force that is applied to the actuator in association with the curve of the FPC connecting band is prevented and the movement is stabilized.

According to the invention, there is provided a disk apparatus which prevents an interference of external noises for an FPC read pattern by an arrangement of FPC circuit patterns. For this purpose, in a pair of connecting patterns for each of read heads and write heads of a plurality of head portions formed on the FPC connecting band, the connecting pattern for the write head is arranged so as to be positioned on the outermost side. In the reading operation, the connecting pattern for the write head which is positioned on the outermost side is electrically opened or is electrically connected to the ground.

In case of using an MR head as a read head, the number of lead wires per head is equal to four. Exclusive-use read and write patterns are provided for the FPC connecting band.

A read signal of the MR head is remarkably smaller as compared with that of the conventional magnetic head. Although it is desirable to arrange a ground pattern on the outermost side of the FPC connecting band in order to prevent noises in the reading operation, a pattern installation width is large. An attention is paid to a point that the write pattern is not used in the reading mode. The write pattern is arranged so as to be positioned on the outermost side in order to allow the write pattern to play a role of a dummy pattern for noise prevention. In the reading mode, at least three floating capacitances are formed between the two write patterns locating in the outside and the first read pattern and the external noises are divided by the floating capacitances until the noises are induced to the read pattern and can be reduced to ⅓. Further, by arranging and connecting the outside write pattern to the ground in the reading mode, the induction of the external noises for the read pattern can be almost perfectly prevented. Thus, an S/N ratio of an ultra weak read signal from the MR head can be assured. Thus, the noises for the read signal of the read pattern can be certainly prevented without increasing the width of the pattern.

According to the invention, there is further provided a disk apparatus in which even if the disk apparatus is assembled in a unit on the system side such as a notebook type computer or the like, a short-circuit is not caused by a potential due to a bias supply to the read head using the MR head. For this purpose, an insulating structure is provided to an attaching surface of the casing to another unit. As an insulating structure, an insulating layer coated with a rubber lining or an insulating film is formed. An insulated attaching block member is provided for the casing side. The attaching block member has a unit attaching surface which is slightly projected for the casing surface in order to form a difference in size between the unit side and the attaching block member. A metal block coated with a rubber lining and having an attaching screw hole or a resin block having an attaching screw hole can be used as an attaching block member. The external shape of a cover can be also formed so as not to project from the external shape of a base.

As mentioned above, even if a potential difference occurs between the disk apparatus and the system side unit as a target to be assembled in association with the use of the MR head and there occurs a danger of a short-circuit, an insulating structure is provided for the unit attaching surface on the casing side of the disk apparatus, thereby enabling the short-circuit due to a contact with the system side unit to be certainly prevented.

According to the invention, there is further provided a disk apparatus which can easily supply a bias voltage to the disk medium through an actuator. For this purpose, in addition to a pair of connecting patterns for the read head and write head, a bias supply pattern to apply a bias voltage to the actuator is formed on the FPC connecting band which connects the head portion installed on the actuator and a fixedly arranged circuit board.

By providing the pattern to supply the bias voltage in the FPC connecting band as mentioned above, the bias supply pattern can be easily connected by merely screwing and fixing the bias supply pattern on the actuator side.

The above and other objects, features, and advantages of the present invention will become more apparent from the following detailed description with reference to the drawings.

According to the invention, there is provided a disk apparatus which can increase a memory capacity by reducing recording areas of sector marks and gray codes without decreasing a detection ratio.

The disk apparatus of the invention uses a sector servo system using a disk medium in which a plurality of sector areas each comprising a servo area and a data area are provided on the same cylinder. At least the sector mark indicative of the servo area, the gray code as a code indicative of a cylinder address, and a predetermined servo pattern for detecting a head position are magnetically recorded in the servo area (servo frame) of each sector of the disk medium.

A disk control section detects the head position on the basis of a read signal of the servo pattern by a head portion, positions the head portion to an arbitrary cylinder, and executes reading and writing operations.

The sector mark and gray code recorded in the servo area are detected on the basis both a peak and a polarity of the read signal. A peak detecting section detects a time interval between the peaks of the read signals of the sector mark and gray code which were read by the head portion and generates a peak detection pulse. A polarity detecting section detects polarities of the read signals of the sector mark and gray code which were similarly read by the head portion and generates a polarity signal.

In this case, in the magnetic recording of the mark or pattern, since the N pole and the S pole are alternately recorded, for example, when the read signal of the positive polarity is obtained by the reading of the N pole and its peak and polarity are detected, the read signal of the negative polarity is subsequently obtained by the reading of the S pole and its peak and polarity are detected. Such operations are alternately repeated.

A sector mark detecting section detects the sector mark on the basis of a peak detection pulse of the peak detecting section and a polarity signal of the polarity detecting section and notifies the disk control section. For this purpose, the sector mark detecting section includes a peak comparing section, a polarity comparing section and gate means. The peak comparing section compares a peak sequence as a time series of the peak detection pulse for a reading period of time of the sector mark with a peak reference sequence corresponding to the magnetic recording of the sector mark and generates a peak coincidence signal when both of them coincide.

The polarity comparing section compares a polarity sequence as a time series of the polarity signal for the reading period of time of the sector mark with a polarity reference sequence corresponding to the magnetic recording pattern of the sector mark and generates a polarity coincidence signal when both of them coincide. When both of the coincidence signals of the peak comparing section and polarity comparing section are obtained, a gate section generates a detection signal of the sector mark.

A redundancy is provided so that even if one of the read signals of the sector mark is dropped out, the read signal can be detected. For this purpose, the sector mark detecting section has the peak comparing section, polarity comparing section, and gate section every read sequence signal which coincides with the magnetic recording of the sector mark and every read sequence signal in which one of the read signals of the magnetical recordings of the sector mark was dropped out. The sector mark detecting section outputs the detection signal of the sector mark on the basis of either one of the coincidence signals of the plurality of gate sections.

In this case, a control register section for selectively validating the plurality of gate sections by a bit setting by the disk control section is provided. For the control register section, with respect to the first detection of the sector mark after positioning the head to the specific cylinder, the disk control section executes the bit setting for validating the gate section which outputs the coincidence signal based on the read sequence signal which coincides with the magnetic recording of the sector mark.

With respect to the second and subsequent detections of the sector mark, the bit setting is performed by the control register section so as to also validate the other gate sections which generate the coincidence signal even if there is a drop-out in the read sequence signal. In the first detection of the sector mark in an on-track control, it is necessary that the pattern perfectly coincides with a specified pattern. After the sector mark could be once detected, the detection can be performed without regarding as a read error even if one of the patterns is dropped out.

A cylinder address detecting section (gray code detecting section) for detecting the cylinder address from the gray code also detects the gray code on the basis of the peak detection pulse of the gray code by the peak detecting section and the polarity signal of the gray code by the polarity detecting section and judges the cylinder address and notifies the disk control section.

The cylinder address detecting section (gray code detecting section) uses a status counter in addition to the peak detection pulse and polarity signal and reconstructs a bit string indicative of the cylinder address. A status counter section repeatedly counts a status based on a recording bit length (N) of the gray code at a reference period (T).

For example, when the gray code "X00X00" is magnetically recorded in the servo frame of the disk medium at a period of 6T per one bit of the address, a sequence counter section repeatedly counts 0 to 5 indicative of six statuses 0, 1, 2, 3, 4, and 5 at the reference period (T).

The count value of the status counter section is preset to "100000" by which the status counter section is forcedly set into the state 1 status and to "000100" by which the status counter section is set into the state 3 status under the condition such that both of the peak and polarity were correctly detected in a bit "X" portion in the gray code of 6T, namely, at timings of the state 0 and state 3.

That is, when a first preset section detects both of the peak detection pulse of the read signal of the positive polarity and its polarity signal, the status counter section is preset into the status of the state count 0. When a second preset section detects both of the peak detection pulse of the read signal of the negative polarity and its polarity signal, the status counter section is preset into the status of the state count 3.

A detection output when both of the peak detection pulse of the read signal of the positive polarity and its polarity signal are obtained or an output of the first state status of the status counter section is latched into a first latch section. A detection output when both of the peak detection pulse of the read signal of the negative polarity and its polarity signal are obtained or an output of the second state status of the status counter section is latched into a second latch section.

Finally, the OR of the first and second latch sections is calculated by the gate section and the address bit is reconstructed. That is, for the normal reading of the gray code "100100" indicative of the address bit 1, the first and second latch sections latch a state-0 sequence and a state-3 sequence of "11" and the bit 1 is reconstructed. For the normal reading of the gray code "000000" indicative of the address bit 0, the first and second latch sections latch "00 " and the bit 0 is reconstructed.

Further, even if either one of the read signals corresponding to the code "1" in the gray code "100100" indicative of the bit 1 is dropped out, so long as the other signal is normal, the bit 1 can be normally reconstructed. The latch sequences of the first and second latch sections are equal to "01" or "10" and the bit 1 can be normally reconstructed in both of those cases.

When the gray codes continue in correspondence to the continuation of the bit 0, the peak and polarity are not detected, so that the status counter section is set to a free-run state and there is a possibility of an erroneous operation. Therefore, a dummy code "100100" which forcedly allows the status counter section to be preset is inserted among the gray codes.

According to the invention as mentioned above, when the sector mark and gray code recorded in the servo frame are detected, by adding the polarity detection in addition to the peak detection of the read signal, even if the recording length is short, the sector mark and gray code can be certainly detected. Consequently, the pattern recording length can be reduced without decreasing the detection ratio, a formatting efficiency of the sector servo is raised, and the memory capacity can be increased.

According to the invention, there is also provided a disk apparatus which can correct an eccentricity in an almost real-time manner by always measuring an eccentricity amount and storing into a RAM in the on-track state. It is an advantage of the sector servo system that the eccentricity correction against a thermal offset or the like can be performed on a cylinder unit basis. In case of a servo surface servo system, servo information is especially recorded in a guard band area or the like of a data surface and a deviation value is measured from the servo information on a data surface unit basis and corrected. According to the sector servo system, on the other hand, the eccentricity deviation amount can be measured and corrected on the cylinder unit basis, so that a head positioning precision is high.

In the correction by the eccentricity measurement at an interval of a predetermined time, however, a fluctuation due to a temperature change for such a time interval cannot be corrected. In the invention, therefore, the eccentricity amount is measured and corrected in a real-time manner at the time of the on-track control.

First, a position error obtained in the on-track control is stored as an eccentricity correction value (X) into a correction table section such as a RAM. A head positioning control section subtracts a previous eccentricity correction value $(X)_{t-1}$ obtained by reading from the correction table section from a target position (P0) which is set in the on-track state after the head portion was moved to an arbitrary cylinder, thereby correcting the eccentricity. Further, the head positioning control section subtracts a head position (P) from a correction target value (P0'), thereby obtaining a position error ($\Delta$P) and drives the head section so as to set the position error ($\Delta$P) to zero.

An updating section obtains a new eccentricity correction value $(X)_t$ by adding the head position error ($\Delta$P) to the previous eccentricity correction value $(X)_{t-1}$ and stores into the correction table. The head positioning control section corrects the target position (P0) by using the eccentricity correction value $(X)_{t-1}$ on the sector unit basis of the cylinder and updates the eccentricity correction value $(X)_{t-1}$ to the new eccentricity correction value $(X)_t$.

The updating section adds a value obtained by multiplying the head position (P) at this time by a predetermined coefficient which is equal to or less than 1 to the previous eccentricity correction value $(X)_{t-1}$, thereby setting the new eccentricity correction value $(X)_t$. In the case where the head position (P) at this time exceeds a predetermined limit value, the limit value is added to the previous eccentricity correction value $(X)_{t-1}$, thereby setting the new eccentricity correction value $(X)_t$. Further, the average value of the head positions (P) of a plurality of times can be added to the eccentricity correction value $(X)_{t-1}$ before updating and the resultant value can be also set as a new eccentricity correction value $(X)_t$.

Since the eccentricity correction using the sector servo in the on-track control can be realized in a real-time manner as mentioned above, a control precision of the tracking against the temperature fluctuation can be remarkably raised. Even if a track recording density is sufficiently increased, the reading or writing operation can be executed without causing an error.

According to the invention, there is also provided a disk apparatus which can easily variably control a generation of a sector pulse by a command by a processor. In the disk apparatus using the sector servo system, it is necessary to logically generate the sector pulse and vary a sector size without becoming aware of a physical servo frame. In the disk apparatus of the invention, therefore, in addition to a pulse generating section for generating the sector pulse which validates the reading/writing operations in the disk control section on the basis of the detection result of the servo area, there are provided a register section for setting the time from a detection time point of the servo area until the generation of the sector pulse and a coincidence detecting section for detecting that an elapsed time from the detection time point of the servo area reached the set time of the register section and allowing the pulse generating section to generate the sector pulse. Further, a plurality of register sections are provided, one of the register sections is selected by a selecting section, and the set time is supplied to the coincidence detecting section. Thus, a plurality of sector pulses can be generated until the detection of the next servo area. In the case where the generation of the sector pulse in the sector area is inhibited, a time exceeding the time until the detection of the next servo area, for example, a register maximum value is set into the register section. In case of generating the sector pulse synchronously with a termination detection of the servo area, a time "0" is set into the register section.

As mentioned above, the sector pulse can be generated so as to have an arbitrary sector length without being restricted by the physical sector servo information. The sector pulse can be easily generated as necessary at an arbitrary timing for the split recording in which block data is divided, slip process of the defective sector, generation of the fixed sector pulse at the time of the digital error test, or the like.

According to the invention, there is provided a data processing apparatus which decreases a data amount to be held in a DRAM or the number of accessing times to the DRAM, thereby reducing an electric power consumption when a processor operates. A power saving method of such an apparatus.

According to the invention, the apparatus comprises a processing section as a processor, a program storing section using a ROM and a RAM, and a program allocating section. The program storing section divides a memory space, which stores programs that are used by the processing section, into a first memory space using a first memory having small electric power consumption and a second memory space using a readable/rewritable second memory having large electric power consumption and stores a peculiar program of each memory space.

The program allocating section allocates the execution of a specific program in the first memory space for a period of time during which the processing section does not execute the program included in the second memory space of the program storing section. The first memory has at least a program module in which a predetermined program is stored and a first entry address table in which an entry address of the program module is stored. The second memory has at least a second entry address table in which the entry address of the program module is loaded from the first entry address table in the first memory. In this instance, the first memory is a ROM and the second memory is a RAM.

Specifically speaking, a leading program (boot program) having various program modules which are used to make the system operative in response to a powering on of the power supply and the first entry address table, indicative of a memory address of each of the program modules, have been stored in the first memory space. A control program which is downloaded from an external memory section when the system is made operative and the second entry address table, obtained by adding entry addresses indicative of the program modules of the first memory space which can be used after the system was made operative to the entry address of the control program, have been stored in the second memory space.

The processing section operates as follows when the system is made operative by the powering-on of the power source. First, the system is made operative by using the leading program of the first memory space. After that, the first entry address table in the first memory space is loaded as a second entry address table into the second memory space.

The control program and its entry address table from the external memory section are loaded. In this instance, only the entry addresses of the program modules in the first memory space which can be used after the activation of the system in the second entry address table which has already been loaded are kept and the entry addresses of the unusable program modules are replaced by the contents of the entry address table which was downloaded from the external memory section, thereby forming a new second entry address table.

In the invention, a similar downloading process is also executed when a download instruction is received from an upper apparatus. Namely, when the download instruction is received from the upper apparatus, the first entry address table in the first memory space is loaded as a second entry address table into the second memory space.

The control program transferred from the upper apparatus is loaded into the second memory space. Only the entry addresses of the program modules in the first memory space which can be also used after the downloading in the second entry address table which has already been loaded, are kept and the entry addresses of the unusable program modules are replaced by the entry addresses transferred from the upper apparatus, thereby updating to a new second entry address table.

The program module in the first memory space which is designated by the second address table in the second memory space after completion of the downloading is an idle program. In this case, the program allocating section allocates the idle program in the first memory to the processing section and allows the idle program to be executed for a period of time during which the processing section does not execute the program included in the second memory space. When the processing section is in an idle state, therefore, it certainly operates as a ROM, so that the electric power consumption can be reduced as compared with a case where the processing section is in the idle state and operates as a RAM.

Specifically speaking, when the execution of the program in the first memory space is allocated by the program allocating section, the processing section turns on a chip selection signal for the ROM and simultaneously turns off a chip selection signal for the RAM. The RAM is a dynamic RAM (hereinafter, referred to as "DRAM") and, further, it is desirable to change a refreshing period of a memory device to a long period of time during which the chip selection signal of the DRAM is off.

The data processing apparatus of the invention is applied to a disk apparatus in a manner such that a microprocessor provided in a disk drive unit is used as a processing section, program memories of the microprocessor are used as ROM and RAM, and further, a disk medium provided in the disk enclosure is used as an external memory section. Similarly, the data processing apparatus of the invention can be also applied to an optical disk apparatus, floppy disk apparatus, or semiconductor memory apparatus.

According to the invention, a power saving method of the data processing apparatus is also provided. The power saving method includes a storing step and a program allocating step. In the storing step, a memory space to store programs which are executed by the processing section is divided into a first memory space using a ROM (read only memory) and a second memory space using a readable/rewritable RAM. A peculiar program is stored in each of the first and second memory spaces. In the program allocating step, the execution of a specific program in the first memory space, for example, an idle program is allocated for a period of time during which the processing section does not execute the program included in the second memory space. When the system is made operative by the powering-on of the power supply and when a download instruction is received from the upper apparatus, processing is executed in accordance with the operation steps in the apparatus construction.

According to the invention, therefore, the memory of a large electric power consumption due to the holding of data is not used as much as possible but is replaced by the memory of a small electric power consumption, so that the number of accessing times and the data amount to be held are decreased, thereby enabling the electric power consumption to be reduced. According to the invention, the program, such as an idle program in which the number of accessing times is large and it is unnecessary to rewrite the program capacity, is read out from the memory of the small electric power consumption, thereby enabling the electric power consumption due to the data holding to be reduced. Further, according to the invention, in a direct accessing apparatus such as a disk apparatus which uses a cheap DRAM as a memory for storing a microprogram, since the program module included in the ROM in which the leading program is stored is used even after completion of the leading process (boot-up process) of the system, the time which is required to use the program module on the memory constructed by the DRAM is small, so that the electric power consumption can be suppressed.

The above and other objects, features, and advantages of the present invention will become more apparent from the following detailed description with reference to the drawings.

BRIEF DESCRIPTION OF THE DRAWINGS

FIGS. 12A to 12C are explanatory diagrams of a lower yoke having a lower magnet;

FIGS. 39A and 39B are explanatory diagrams of the external noise voltage and the read pattern noise voltage in FIG. 38;

FIGS. 58A and 58B are explanatory diagrams of patterns of a reference sequence which is set into the peak pattern comparing section in FIG. 55;

FIG. 59 is an explanatory diagram of patterns of the reference sequence which is set into a polarity pattern comparing section in FIG. 55;

FIGS. 63A to 63D are timing charts for the peak detection pulse and the polarity signal which are detected from the gray code read signal in the embodiment of FIG. 62;

FIGS. 64A to 64L are timing charts for a gray code detection when the reading operation is normally performed;

FIGS. 65A to 65L are timing charts for a gray code detection when a read signal of state 0 is dropped out;

FIGS. 66A to 66L are timing charts for a gray code detection when a read signal of state 3 is dropped out;

FIGS. 67A to 67K are timing charts for a gray code detection when an advanced phase shift occurs in the read signal;

FIGS. 68A to 68K are timing charts for a gray code detection when a delayed phase shift occurs in the read signal;

FIG. 70 is an explanatory diagram of a RAM correction table into which an eccentricity correction value has been stored;

FIGS. 75A to 75C are timing charts for generation of the sector pulse for a data split;

FIGS. 76A to 76C are timing charts for generation of the sector pulse which is used in a slipping process of a defective sector;

FIGS. 77A to 77D are timing charts for generation of the sector pulse at the time of a digital error test;

FIG. 82 is an explanatory diagram of the contents of control programs stored in a disk medium in FIG. 79;

FIG. 83 is an explanatory diagram of an entry address table of the control programs in FIG. 82;

FIG. 87 is a flowchart for the leading process when a power supply is turned on.

DETAILED DESCRIPTION OF THE PREFERRED EMBODIMENT

Whole Structure and Circuit Block

Figure 1:
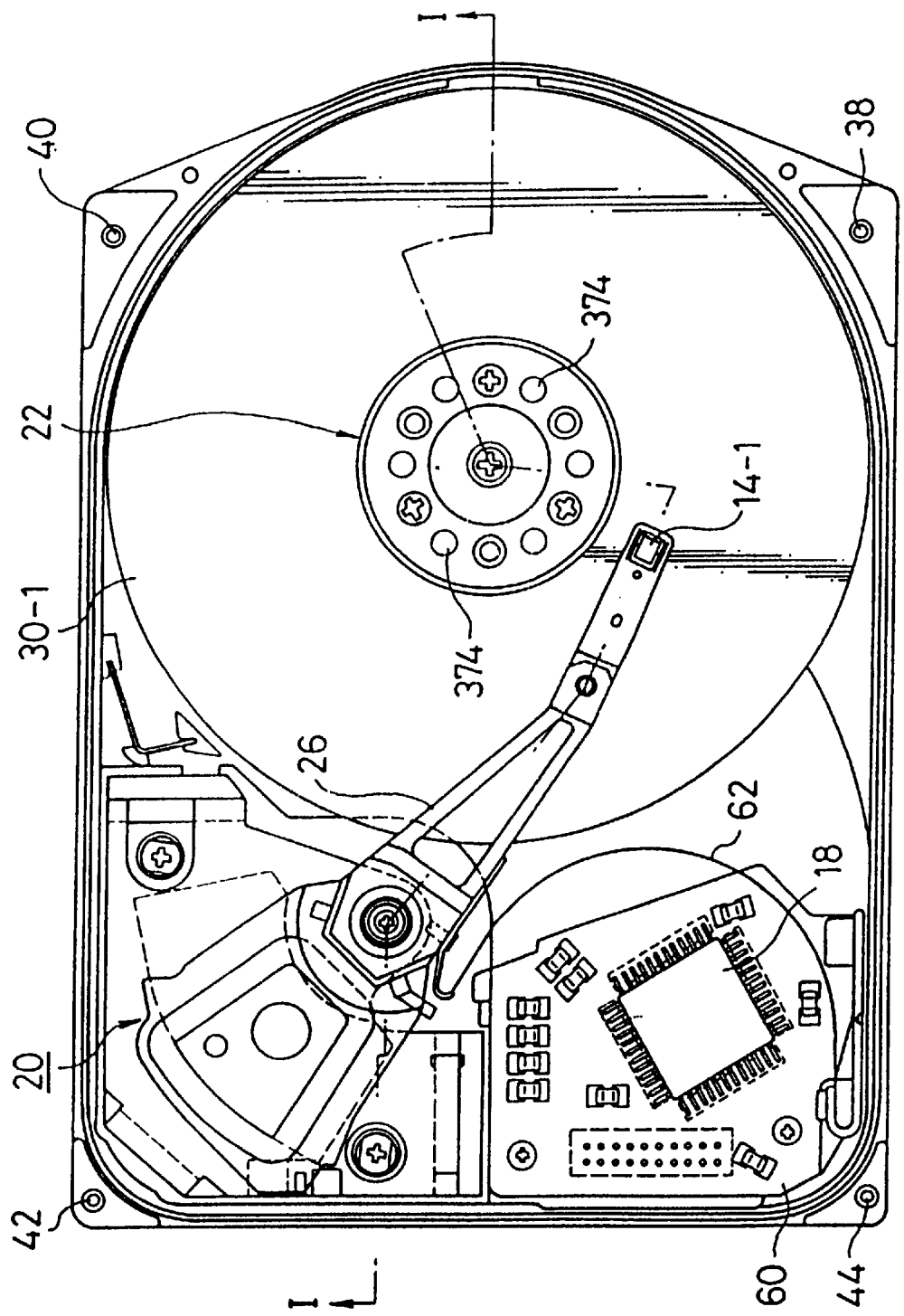
FIG. 1 is an explanatory diagram of an internal structure of a disk apparatus of the invention.
Figure 2:
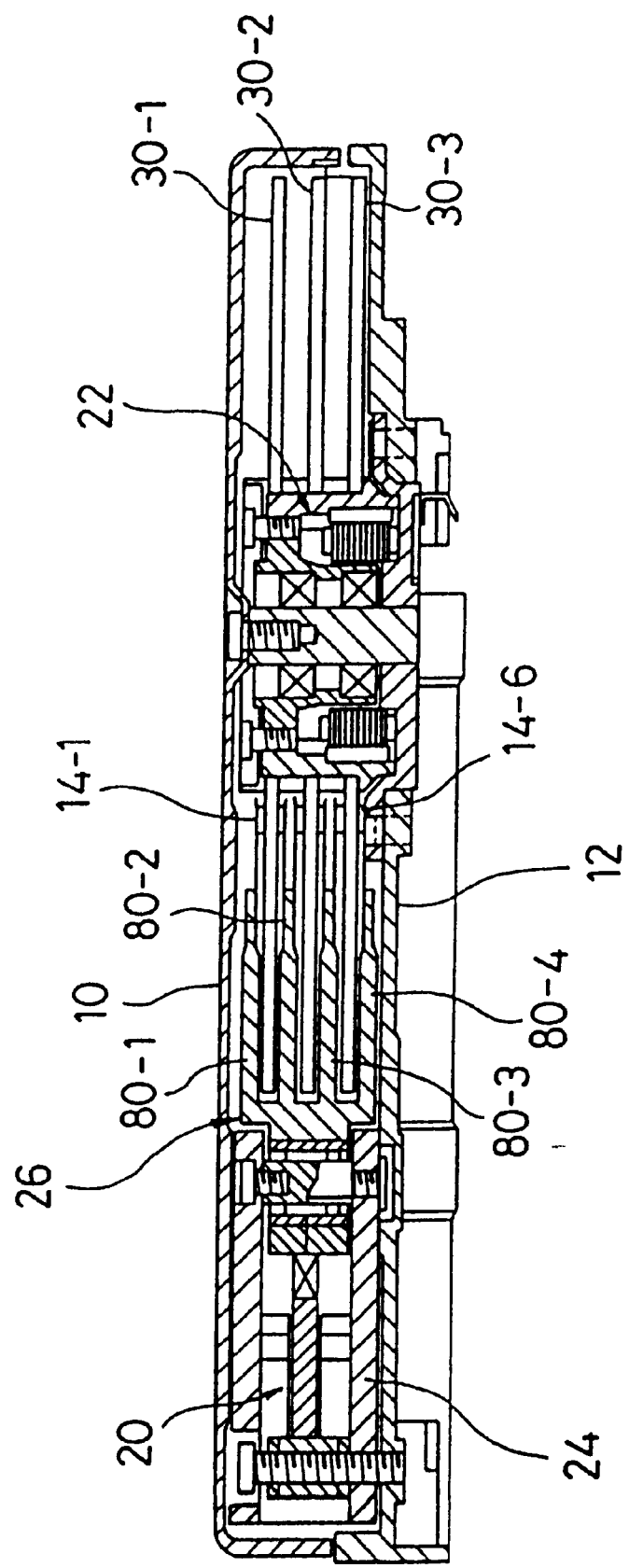
FIG. 2 is a cross sectional view taken along the line I—I in FIG. 1.

FIG. 1 is a plan view of an internal structure of a disk apparatus of the present invention. FIG. 2 shows a cross sectional view taken along the line I—I in FIG. 1. A casing of the disk apparatus of the invention has a two-split structure comprising a base plate 12 and a cover 10. An actuator 26 is rotatably provided in the corner portion of the base plate 12. The actuator 26 has a VCM 20 in the rear portion of the rotational center. A head 14-1 is attached on the front edge side of the actuator 26. A disk as a recording medium that is rotated by a spindle motor 22 is provided for the actuator 26. In the embodiment, three disks 30-1 to 30-3 are attached. Since both of the front and back surfaces of each of the three disks 30-1 to 30-3 are used as data surfaces, the total number of data surfaces is equal to 6. In correspondence to the data surfaces, six head portions 14-1 to 14-6 are supported at the front edge of the actuator 26 by independent arm portions. In FIG. 2, only the top head portion 14-1 and the lowest head portion 14-6 are shown by reference numerals and the head portions 14-2 to 14-5 are sequentially arranged between them in accordance with the order from the upper position as shown in the diagram. In the embodiment, a write head and a read head are provided for each of the head portions 14-1 to 14-6 as will be obviously explained hereinlater. A magnetic head using a coil is used as a write head. An MR head using a magnetoresistive device is used as a read head.

A circuit board 60 using FPC is arranged in the base plate 12 adjacent to the actuator 26. An FPC connecting band 62 is led out from the FPC board 60 and is fixed to the side surface of the actuator 26. Patterns to connect between an installation circuit including a head IC circuit 18 installed on the FPC board 60 and the six head portions 14-1 to 14-6 supported at the front edge of the actuator 26 are formed on the FPC connecting band 62. As patterns on the FPC connecting band 62, total four connecting patterns comprising a pair of patterns for the read head and a pair of patterns for the write head are formed per one head portion. Further, a pair of patterns for supplying a drive current to a movable coil of the VCM 20 are formed on the FPC connecting band 62. Further, a bias supply pattern to apply a bias voltage to the disks 30-1 to 30-3 through the actuator 26 is formed on the band 62. The details of each portion of the disk apparatus of the invention shown in FIGS. 1 and 2 will be obviously explained hereinlater.

Figure 3:
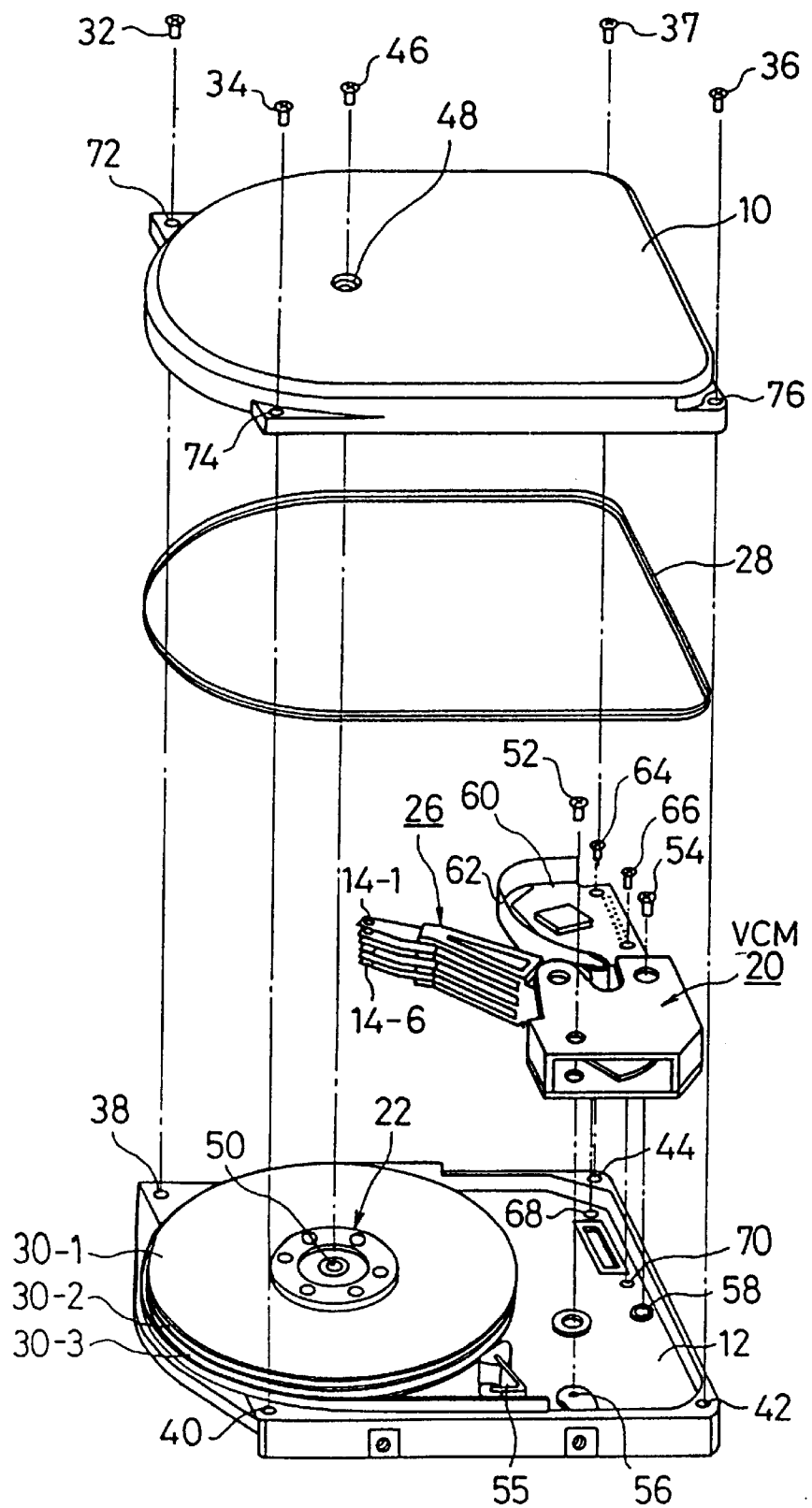
FIG. 3 is an assembly exploded diagram of the disk apparatus of the invention.

FIG. 3 is an exploded assembly diagram of the disk apparatus of the invention. The spindle motor 22 which rotatably supports the three disks 30-1 to 30-3 is assembled onto the base plate 12. A circulating filter 55 is arranged near the disks 30-1 to 30-3 and removes the dust in the air flowing in association with the rotation of the disk. For example, a paper filter is used as a circulating filter 55. The actuator 26 is assembled together with the VCM 20 and the FPC board 60 coupled by the FPC connecting band 62. The VCM 20 is fixed to screw holes 56 and 58 of the base plate 12 by screws 52 and 54. The FPC board 60 is fixed to screw holes 68 and 70 of the base plate 12 by screws 64 and 66. The cover 10 is attached to the upper portion of the base plate 12 through a packing 28. The cover 10 is fixed to screw holes 37, 40, 42, and 44 of the base plate 12 by four screws 32, 34, 36, and 38. Vis through holes 72, 74, and 76 and, further, a screw hole (not shown) at the right rear position are formed in the cover 10. A lower portion of a fixing axis of the spindle motor 22 is screwed and fixed to the base plate 12. The spindle motor 22 is attached and fixed to an upper screw hole 50 by a screw 46 inserted through a screw through hole 48 of the cover 10. Namely, the spindle motor 22 has a twin-supporting structure that is fixed on both sides of the base plate 12 and the cover 10. Owing to the twin-supporting structure of the spindle motor 22, an attaching rigidity for the base plate 12 and cover 10 is remarkably improved. When the attaching rigidity of the spindle motor 22 is improved, the oscillation of the rotary shaft of the multilayer disk to which the disks 30-1 to 30-3 are attached is prevented. An offtrack amount which causes an on-track error can be extremely reduced.

Figure 4:
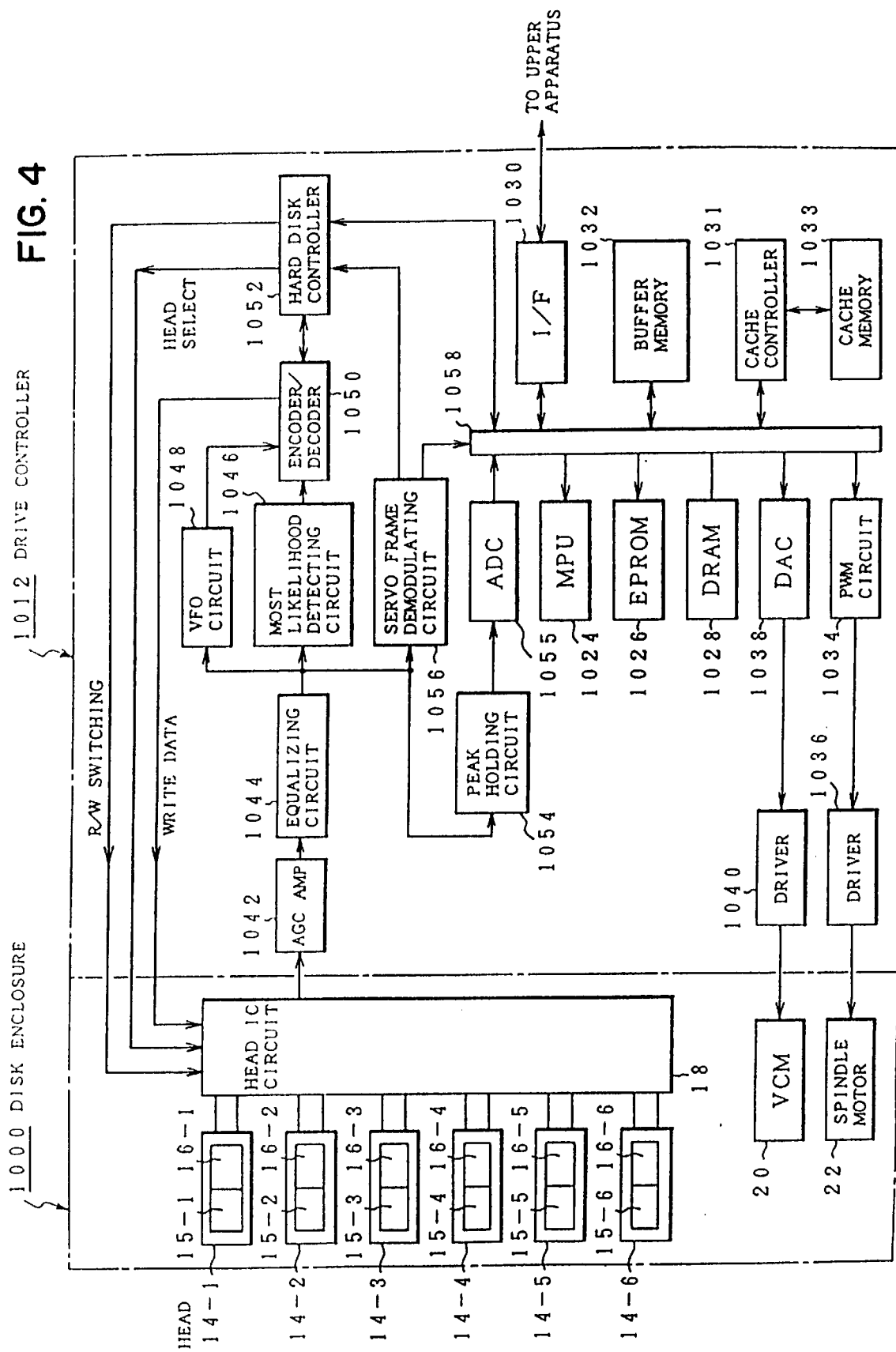
FIG. 4 is a circuit block diagram of the disk apparatus of the invention.

FIG. 4 is a whole circuit block diagram of the disk apparatus of the invention. The disk apparatus of the invention comprises: a disk enclosure 1000 having a structure shown in FIGS. 1 and 2; and a drive controller 1012 installed to the printed circuit board which is enclosed from the lower side into an opening portion of the base plate 12 of the lower portion of the disk enclosure 1000. The head portions 14-1 to 14-6 are provided in the disk enclosure 1000 in correspondence to the six data surfaces of the three disks 30-1 to 30-3.

Read heads 15-1 to 15-6 and write heads 16-1 to 16-6 are integrally provided for the head portions 14-1 to 14-6, respectively. Magnetic heads are used as write heads 16-1 to 16-6. MR heads using the magnetoresistive devices are used as read heads 15-1 to 15-6. In the MR head, it is necessary to allow a specific bias current to flow in the reading operation. The read heads 15-1 to 15-6 and write heads 16-1 to 16-6 are connected to the head IC circuit 18, by which the head switching operation and the supply of the bias voltage to the read heads 15-1 to 15-6 using the MR heads are executed. The spindle motor 22 to rotate the disk and the VCM 20 to position the head are provided in the disk enclosure 1000.

An MPU 1024 which functions as a control unit is provided for the drive controller 1012. A readable and rewritable EPROM 1026 which is used as a program memory and a writable DRAM 1028 are connected to a bus 1058 of the MPU 1024. A leading program (boot program) which is used at the time of the leading operation in association with the turn-on of the power source of the disk apparatus has fixedly been stored in the EPROM 1026. A control program (micro program) which was downloaded from the disk on the disk enclosure 1000 side after completion of the leading operation of the disk apparatus by the leading program in the EPROM 1026 is stored in the DRAM 1028.

Further, an interface circuit 1030 and a buffer memory 1032 for data transfer are connected to the bus 1058 of the MPU 1024. For instance, an SCSI is used as an interface circuit 1030. For example, a notebook type computer in which the disk apparatus of the invention has been installed is used as a host computer and commands and data which are necessary for an external memory are transmitted and received. Further, a cache controller 1031 and a cache memory 1033 are provided.

The spindle motor 22 provided in the disk enclosure 1000 is controlled by a PWM circuit 1034 and a driver 1036. A head positioning control of the VCM 20 provided in the disk enclosure 1000 is performed by a D/A converter 1038 and a driver 1040. In any of the above cases, the driving of the spindle motor 22 and the positioning control of the VCM 20 are executed by a program control by the MPU 1024.

As a read/write system, an AGC amplifier 1042, an equalizing circuit 1044, a most likelihood detecting circuit 1046, an encoder/decoder 1050, and a hard disk controller 1052 are provided for the drive controller 1012. Further, as a servo system of the head positioning control, a peak holding circuit 1054, an A/D converter 1055, and a servo frame demodulating circuit 1056 are provided. In the reading operation, the head IC circuit 18 is switched to, for example, the read head 15-1 side of the head portion 14-1 by a switching signal from the hard disk controller 1052. An analog read signal (read signal) from the read head 15-1 is supplied to the AGC amplifier 1042. The analog read signal is amplified by the AGC amplifier 1042 and, after that, it is waveform equalized by the equalizing circuit 1044 and is supplied to the most likelihood detecting circuit 1046 and a VFO circuit 1048. In the reading operation, the VFO circuit 1048 generates a reference clock synchronized with the read signal. Outputs of the most likelihood detecting circuit 1046 and VFO circuit 1048 are supplied to the encoder/decoder 1050 which has been switched to the decoder side in the reading mode. Read data is reconstructed while performing a clock synchronization and is subjected to a formatting process by the hard disk controller 1052. After that, it is transferred to the buffer memory 1032. Subsequently, the read data is transmitted to an upper apparatus through the interface circuit 1030.

In the writing operation, on the other hand, write data transferred to the buffer memory 1032 through the interface circuit 1030 is supplied through the hard disk controller 1052 to the encoder/decoder which has been switched to the encoder side in the writing operation. The encoder/decoder executes a conversion to convert, for instance, the write data to the 2-7 run length code or the like, an addition of an ECC check code, and the like and, after that, supplies the resultant data to, for example, the write head 16-1 via the head IC circuit 18. Servo information according to the sector servo system has been recorded on each of the data surfaces provided for the disk enclosure 1000.

Actuator

Figure 5:
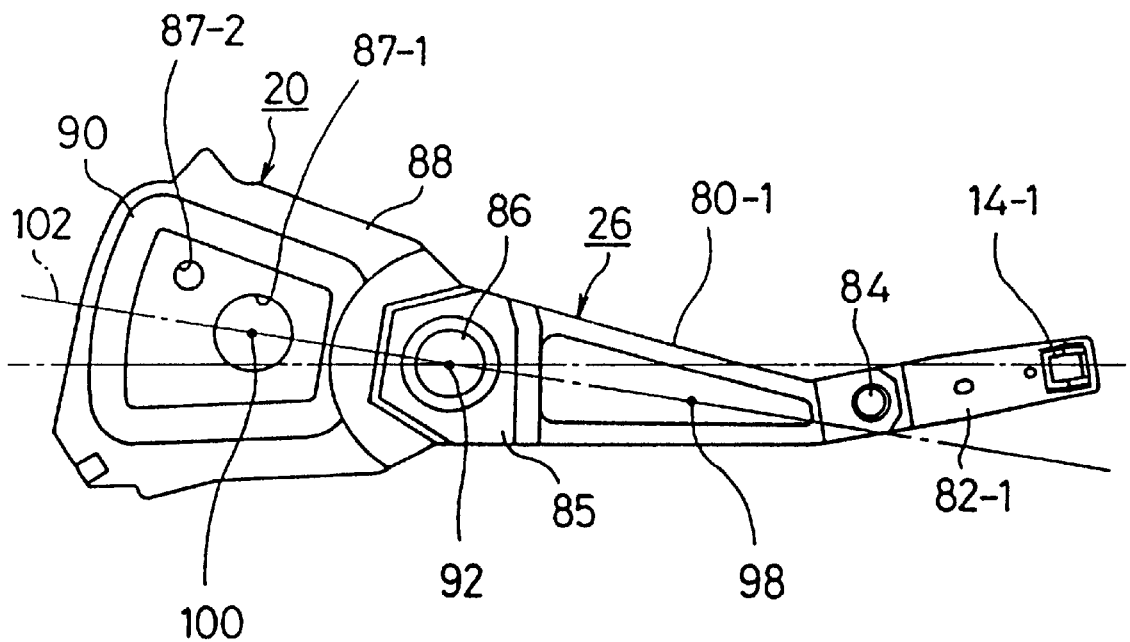
FIG. 5 is an explanatory diagram of a balance adjustment in an actuator of the invention.
Figure 6:
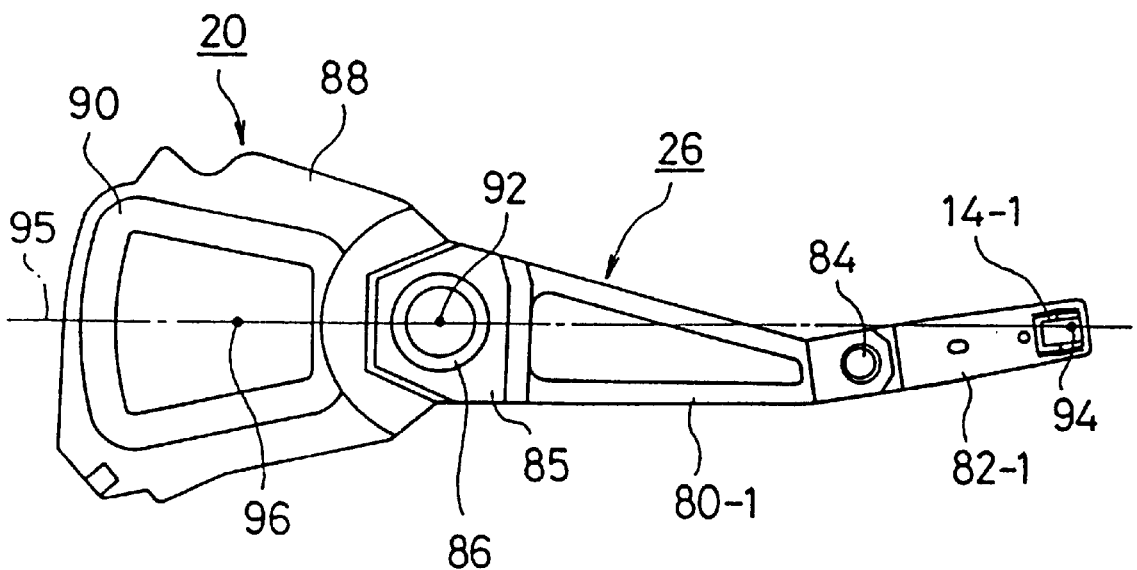
FIG. 6 is an explanatory diagram of an actuator which is balance adjusted irrespective of the invention.

FIG. 5 relates to an embodiment of the actuator which is used in the disk apparatus of the invention and has been balance adjusted to the optimum state. FIG. 6 shows the actuator before the balance adjustment of the invention is used.

In FIG. 5, the actuator 26 of the invention has an elongated arm portion 80-1 on the disk side around an axis attaching portion 85, as a center, to which a cylindrical rotary shaft 86 is attached. The head portion 14-1 is attached to the front edge of the arm portion 80-1 through a gimbal spring 82-1 coupled by a pin 84. A point 94 of the head portion 14-1 is set to a reference position (head center) which gives a head gap. A coil supporting plate 88 which integrally has a movable coil 90 of the VCM 20 is attached behind the axis attaching portion 85. In the invention, the axis attaching portion 85 and arm portion 80-1 of the actuator 26 are formed by a machine work of an aluminum extruded block. The coil supporting plate 88 attached behind the axis attaching portion 85 is molded integrally with the movable coil 90 by using liquid polymer. The arm portion 80-1 is the top arm portion in the actuator 26 in FIG. 2. The remaining three arm portions 80-2 to 80-4 are formed below the arm portion 80-1. Among them, with respect to the lowest arm portion 80-4, the head portion 14-6 is supported through a gimbal spring 82-6 in a manner similar to the top arm portion 80-1. However, with regard to the intermediate two arm portions 80-2 and 80-3, gimbal springs 82-2 and 82-3 and gimbal springs 82-4 and 82-5 are provided on both sides and the head portions 14-2 to 14-5 are attached to the front edges, respectively.

Further, in the actuator 26 of the invention of FIG. 5, in the front edge portion of the arm portion 80-1, the attaching portion of the gimbal spring 82-1 is bent to the center side of the disk 30-1, thereby providing an angle as will be obviously understood from FIG. 1. Thus, the actuator 26 has an asymmetrical shape with respect to the right and left when it is seen from the movable coil 90 side. The asymmetrical shape with an angle at the edge of the arm portion 80-1 suppresses a fall-down of the write head and read head for the track direction of the circumferential direction of the disk in association with the rotation of the actuator 26, thereby maintaining an orthogonal relation as much as possible.

As shown in FIG. 6, hitherto, the actuator 26 with such an asymmetrical shape has a shape such that a rotational center 92, a center 96 in the shape of the movable coil 90, and further the head center 94 as a head gap position of the head portion 14-1 are arranged so as to be located on a straight line 95. A balance of the actuator 26 in the conventional shape of FIG. 6 is adjusted so as to make the whole center of gravity of the actuator 26 coincide with the rotational center 92. In order to make the whole center of gravity of the actuator 26 coincide with the rotational center 92, a thick portion for providing a weight for balance adjustment is formed in each member on the head side and coil side. Thus, a weight of the whole actuator 26 increases, thereby increasing an inertia of the actuator 26 by the VCM 20.

On the other hand, in the actuator 26 of the invention of FIG. 5, a position 98 of the center of gravity on the head 14-1 side and a position 100 of the center of gravity on the movable coil 90 side are obtained around the rotational center 92 as a center. When the position 98 of the center of gravity on the head side and the position 100 of the center of gravity on the coil side are obtained as mentioned above, the position of the coil supporting plate 88 for the rotary bearing portion 85 of the actuator 26 is adjusted and positioned, for example, in a manner such that the position 100 of the center of gravity on the coil side is located on a straight line 102 connecting the rotational center 92 and the position 98 of the center of gravity on the head side.

When the actuator of FIG. 5 according to the present invention is compared with the conventional actuator of FIG. 6, it will be understood that the actuator has a shape such that the coil supporting plate 88 having the movable coil 90 is rotated in a manner such that the position 100 of the center of gravity on the coil side is located on the straight line 102 (connecting the rotational center 92 and head side center position 98) which was rotated clockwise from the position on the conventional straight line 95. Loose holes 87-1 and 87-2 are formed in the coil supporting plate 88. The loose hole 87-1 locating on the straight line 102 is provided for balance adjustment in the longitudinal direction of the actuator for the rotational center 92. Since the coil supporting plate 88 has an asymmetrical shape in the embodiment, the loose hole 87-2 is formed to adjust in a manner such that the position 100 of the center of gravity on the coil side in association with the asymmetrical shape is located on the straight line 102 passing through the center of the movable coil 90. More specifically speaking, a weight on the head side having the arm 80-1 and gimbal spring 82-2 is first decided. A weight on the coil side is subsequently set so as to be equal to the weight on the head side in a state in which the loose holes 87-1 and 87-2 are formed. The position 98 of the center of gravity on the head side and the position 100 of the center of gravity on the coil side are obtained. The above component elements are arranged so as to be located on the straight line 102 passing the rotational center 92.

As mentioned above, the conventional actuator 26 in FIG. 6 is constructed in a manner such that the head center 94 of the core of the head 14-1, the center 92 of the rotation, and the center 96 of the shape of the coil 90 are located in a line. Moreover, a balance weight is attached or cut out as necessary so that the center of gravity is located at the rotation center 92 and a balance is adjusted at the initial stage to assemble the actuator. Therefore, when the parts such as an FPC and the like are attached later, the balance is lost due to such an attachment. Another weight is further attached in order to get a proper balance. Consequently, an inertia of the actuator is large.

On the other hand, the actuator 26 of the invention in FIG. 5 is constructed such that when the parts such as an FPC and the like are attached later, a line connecting the center 100 of gravity of the coil, the rotation center 92, and the center 98 of gravity on the head side becomes the straight line 102 so that the center of gravity is located at the rotation center 92. Therefore, when the actuator is assembled, there is no need to use a weight for balance adjustment. The weight can be reduced and a high speed access can be performed. Actually, the access time can be reduced from the conventional average time 15 msec to 12 msec. The inertia and weight after the FPC and the like were attached in this case are as follows.

|  | Conventional (FIG. 6) | Invention (FIG. 5) |
| --- | --- | --- |
| Inertia | 2.39 g-cm$^2$ | 9.44 g-cm$^2$ |
| Weight (with FPC) | 5.49 g | 4.70 g |

A method of assembling the actuator 26 in FIG. 5 will now be described. First, the head portion 14-1 is mounted to a gimbal spring (suspension) 82-1 and is caulking fixed to the arm portion 80-1 having integratedly the axis attaching portion 85. The other head portions 14-2 to 14-6 are also similarly constructed. A head assembly is formed as mentioned above. Subsequently, the head assembly and the coil 90 are set into a die and the coil supporting plate 88 having the coil 90 is integratedly formed behind the axis attaching portion 85 by a insertion molding of a resin, thereby completing the actuator 26. In this case, a material which decides a specific gravity of the molding resin is selected so as to obtain a weight balance. Therefore, the adhesion of the coil supporting plate 88 and the attachment of the weight to obtain a weight balance after completion of the actuator which were executed hitherto are unnecessary. The actuator can be easily assembled.

Figure 7:
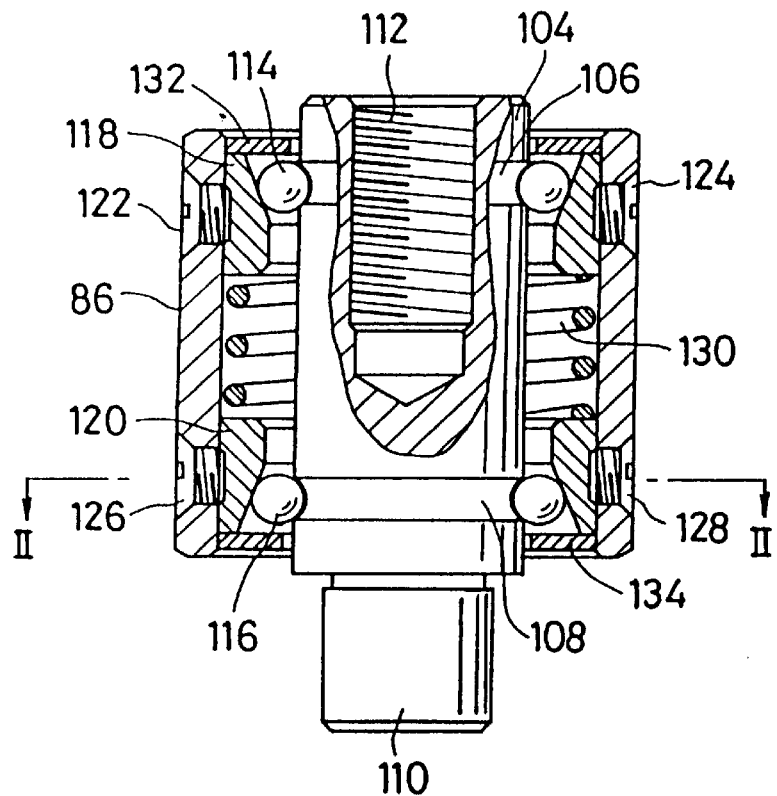
FIG. 7 is a cross sectional view of a rotary shaft of the actuator.

FIG. 7 shows an embodiment of the rotary shaft 86 provided in the axis attaching portion 85 of the actuator 26 of the invention of FIG. 5. The rotary shaft 86 is a cylindrical member and has therein a fixed axis 104. A shaft portion 110 provided in the lower portion of the fixed axis 104 is pressed and fixed into a lower yoke 24 which functions as a bottom plate shown in FIG. 2. A screw hole 112 is formed in the upper portion of the fixed axis 104 and is screwed and fixed through a yoke which forms an upper portion of the VCM 20. Grooves 106 and 108 are formed at two positions of the upper portion of the fixed axis 104. A plurality of bearings 114 and 116 are arranged in the grooves 106 and 108. An outer lace 118 is provided in the outside of the bearing 114. An outer lace 120 is provided in the outside of the bearing 116. When assembling, the outer laces 118 and 120 are fixed to the rotary shaft 86 by vises 122, 124, 126, and 128, respectively, as shown in the diagram. A spring 130 is assembled between the outer laces 118 and 120. Further, seal plates 132 and 134 are fixed to the outside of the bearings 114 and 116. In a state in which the assembly of the shaft portion shown in FIG. 7 was completed, the vises 122, 124, 126, and 128 are removed. Consequently, the outer laces 118 and 120 are pressed in the vertical direction by the spring 130, thereby pressing the inner tapered surfaces of the outer laces to the ball bearings 114 and 116 by specified preloads.

Figure 8:
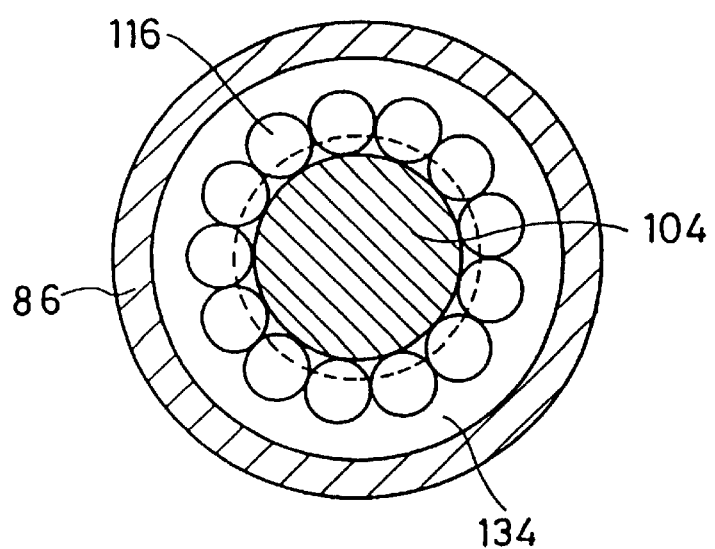
FIG. 8 is a cross sectional view taken along the line II—II in FIG. 7.

FIG. 8 is a cross sectional view taken along the line II—II in FIG. 7. The ball bearing 116 is arranged in the groove 108 of the lower portion of the fixed axis 104 like a ring without a gap, thereby constructing a full ball structure.

The bearing structure of FIG. 7 is characterized in that no inner lace is provided for the ball bearings 114 and 116. That is, in the bearing structure of the conventional disk apparatus, a bearing structure having an inner lace and an outer lace is used. However, in association with a miniaturization of the disk apparatus, the bearing structure of the actuator 26 also becomes a motor. In the bearing using both of the inner lace and the outer lace, since a diameter of ball bearing is extremely small, an abrasion resistance and a rigidity for a shock of the ball bearing deteriorate. In the invention, therefore, as shown in FIG. 7, no inner lace is provided but the grooves 106 and 108 are directly provided for the fixed axis 104 and are used in place of the inner lace. Since no inner lace is provided as mentioned above, even when the axial structure is miniaturized, ball bearings of large diameters can be used as ball bearings 114 and 116 which are used. Therefore, the abrasion resistances of the ball bearings 114 and 116 and the rigidity for a shock remarkably increase as compared with the case of using the inner lace. Further, as shown in FIG. 8, since the ball bearings 114 and 116 have the full ball structure, a load that is applied to each ball bearing is reduced and an impact resistance can be improved.

Figure 9:
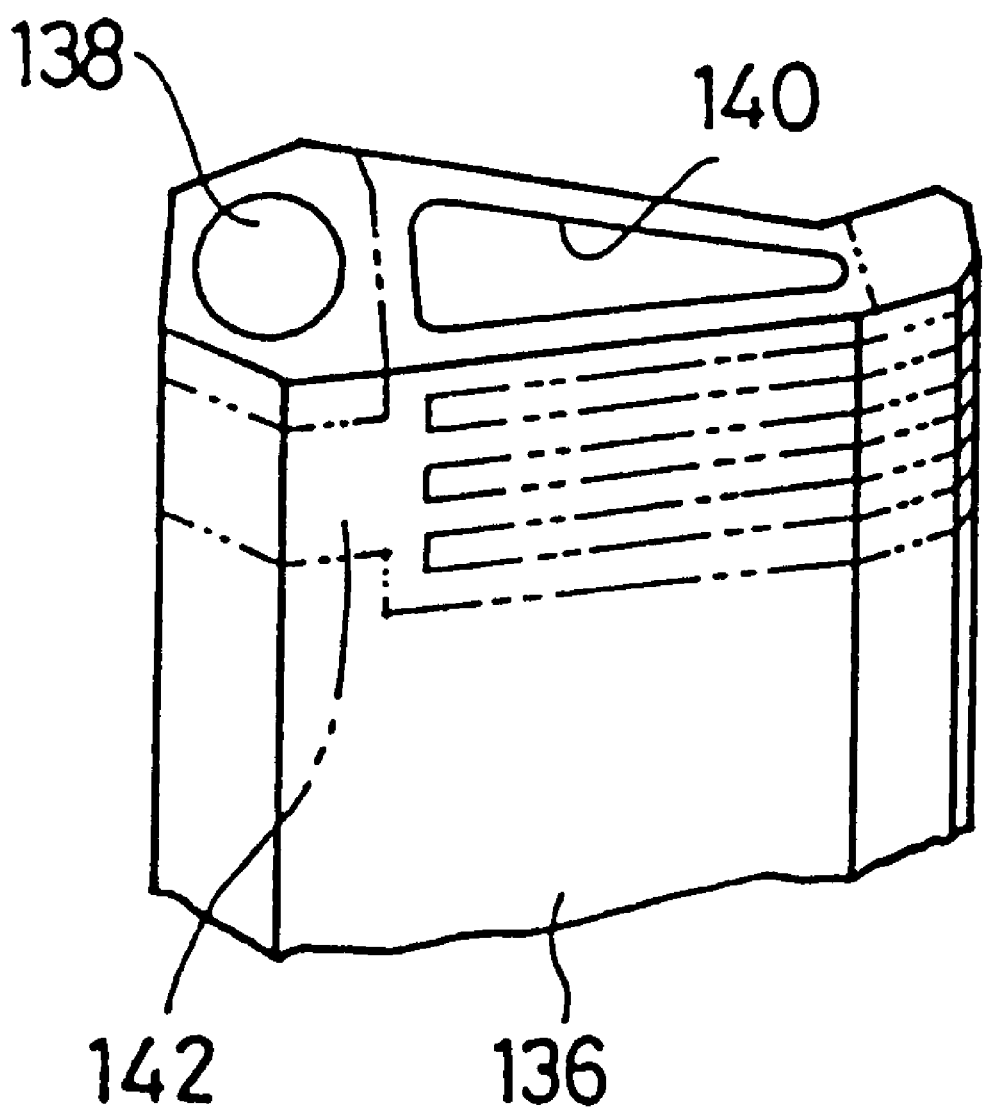
FIG. 9 is an explanatory diagram of a manufacturing of an actuator block by a pull-out work.

FIG. 9 shows a manufacturing state of an arm block having the axis attaching portion 85 and arm portions 80-1 to 80-4 in the actuator 26 of the present invention of FIG. 5. In the conventional disk apparatus, the arm block of the actuator is molded by an aluminum die-cast. Therefore, there is a problem such that a nest easily occurs in the block and a deformation occurs due to the heat by the occurrence of the nest and a deformation due to an aging change occurs and an offtrack is likely to occur. In the actuator of the disk apparatus of the invention, as shown in FIG. 9, a die material 136 having an axis hole 138 and a hollow portion 140 is derived by an extrusion molding of aluminum. After the die material was cut out as shown by imaginary lines, an arm block 142 is formed by a machine work and the actuator 26 of FIG. 5 is assembled. By using the arm block 142 by the extrusion molding as mentioned above, the offtrack depending on the thermal deformation or aging deformation by the nest which occurs in the conventional aluminum die-cast hardly occurs. In the blocks obtained by the extrusion molding and machine work, there is hardly a variation of the shape as parts, so that the stable performance of the actuator can be realized.

Assembly Structure on the Fixed Side of Voice Coil Motor

Figure 10:
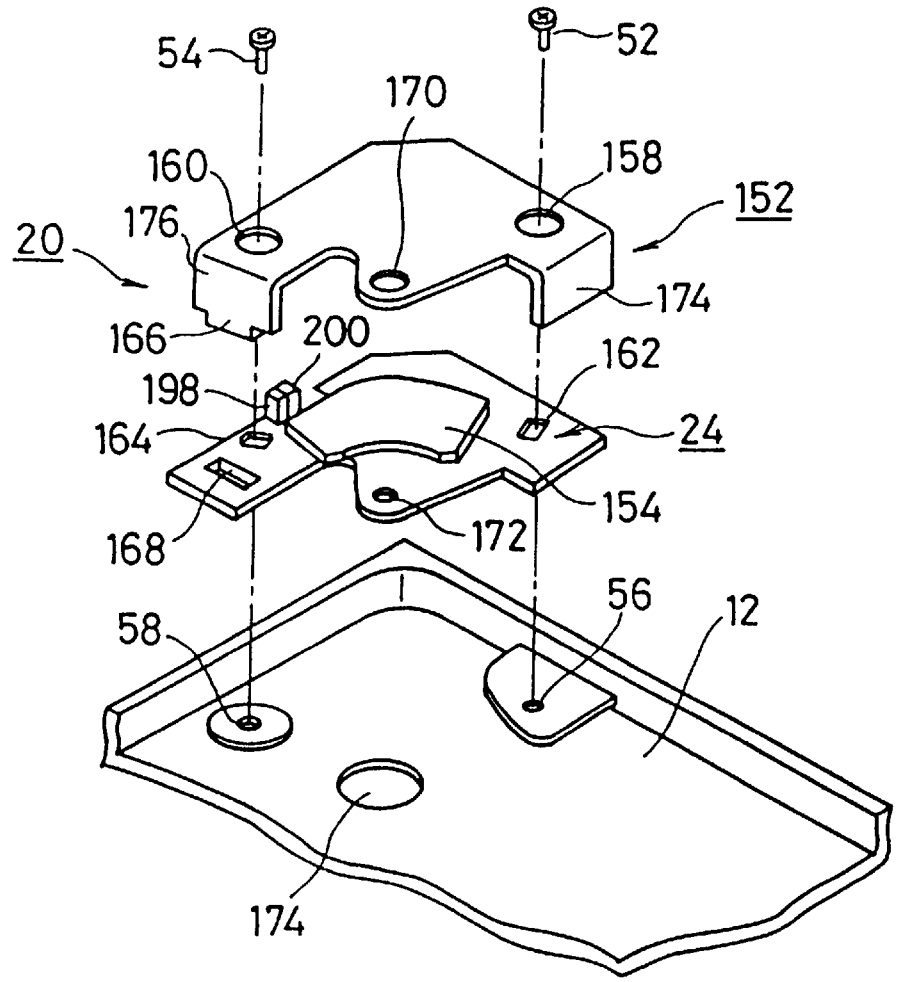
FIG. 10 is an assembly exploded diagram on the fixing side of a VCM.
Figure 11:
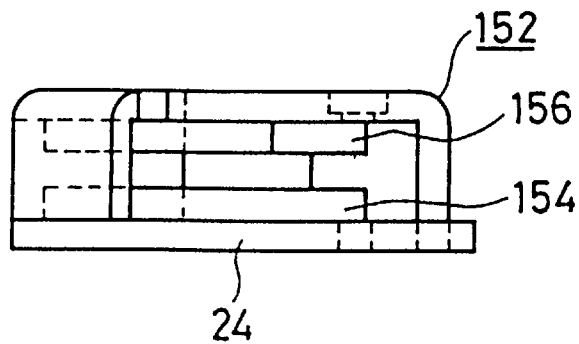
FIG. 11 is an explanatory diagram of an assembly state on the fixing side of the VCM.

FIG. 10 is an assembly exploded diagram showing the fixed parts of the VCM 20 that is used for driving the actuator. FIG. 11 shows an assembling state. The fixed parts that are used in the VCM 20 of the invention comprises: the lower yoke 24 to which a lower magnet 154 is fixed; and an upper yoke 152 to which an upper magnet 156 is fixed. As shown in FIG. 12A, the lower magnet 154 formed like a fan is adhered and fixed to the upper surface of the lower yoke 24. Through holes 162 and 164 for screws are formed at two positions of the lower yoke 24. The through holes 162 and 164 are used to attach a stopper portion and has a hole shape such that two corners are chamferred in order to prevent the rotation. A reception hole 168 for positioning by coming into engagement with the upper yoke 152 is opened by the through hole 164. Further, a latch member 200 is formed on the left side of the lower magnet 154 by bending by a cut-out of the lower yoke 24. A latch magnet 198 is attached to the inside of the latch member 200. The latch member 200 and latch magnet 198 latch the head portion provided at the front edge of the actuator to the innermost position of the disk and will be obviously explained hereinlater. FIG. 12B is a side elevational view of a lower yoke 150. FIG. 12C is a bottom view of the lower yoke 24.

Figures 13A, 13B:
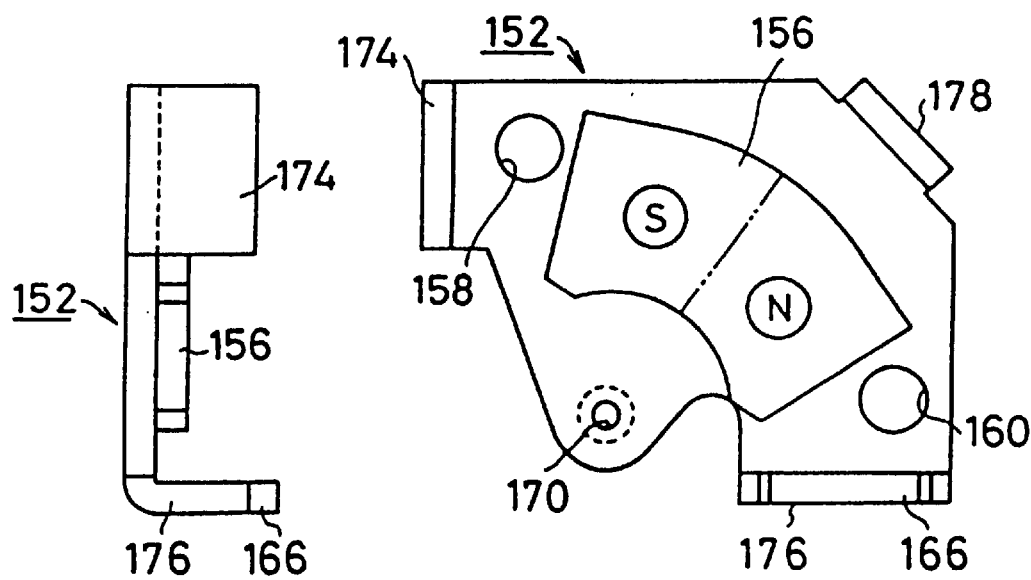
FIGS. 13A and 13B are explanatory diagrams of an upper yoke having an upper magnet.

FIG. 13A shows a bottom view of the upper yoke 152 in FIG. 10. FIG. 13B shows a side elevational view thereof. The upper magnet 156 is fixed to the lower surface of the upper yoke 152 by an adhesive agent or the like. The upper magnet 156 is arranged so as to overlap to the lower magnet 154 in FIG. 12A through a predetermined gap. Working holes 158 and 160 which are used when the lower yoke 24 locating on the lower side is fixed to the base plate 12 side by the screws are formed in the upper yoke 152 on both sides of the upper magnet 156. A through hole 170 used to allow access to a rotary shaft at the rotational center of the actuator is also formed in the upper yoke 152. Standing members 174, 176, and 178 which are bent downward are formed at three positions of the upper yoke 152. Among them, a projection 166 which is fitted into the reception hole 168 of the lower yoke 24 in FIGS. 12A to 12C is formed in the lower portion of the standing member 176. A height of the standing member 176 excluding the standing members 174 and 178 and projection 166 decides a gap interval in which the movable coil 90 on the actuator side between the lower magnet 154 and the upper magnet 156 when the upper yoke 152 is assembled to the lower yoke 24 is enclosed.

When the VCM 20 is assembled to the base plate 12 as mentioned above, first, an assembly of the lower yoke 24 and upper yoke 152 is prepared. Namely, since the lower magnet 154 is provided for the lower yoke 24 and the upper magnet 156 is provided for the upper yoke 152, as shown in FIG. 10, the projection 166 at the edge of the standing member 176 of the upper yoke 152 is positioned and fitted into the reception hole 168 of the lower yoke 24. The lower yoke 24 and upper yoke 152 are set into a state in which they are integrally assembled and fixed as shown in FIG. 11 by an adsorbing force of the lower magnet 154 and upper magnet 156. Therefore, when a magnetic circuit is formed by assembling the yoke, screws, adhesive agent, caulking, or the like as in the conventional apparatus is unnecessary. The lower yoke 24 and upper yoke 152 can be fixed into an assembling state by only an attracting force of the magnets. After the upper and lower yokes were assembled, as shown in FIG. 11, the screws 52 and 54 are inserted from the working holes 158 and 160 of the upper yoke 152 into the screw holes 56 and 58 of the base plate 12 via the through holes 162 and 164 of the lower yoke 24 and are fixed by using a driver or the like.

Enlargement of Effective Length of Coil of Voice Coil Motor

Figure 14:
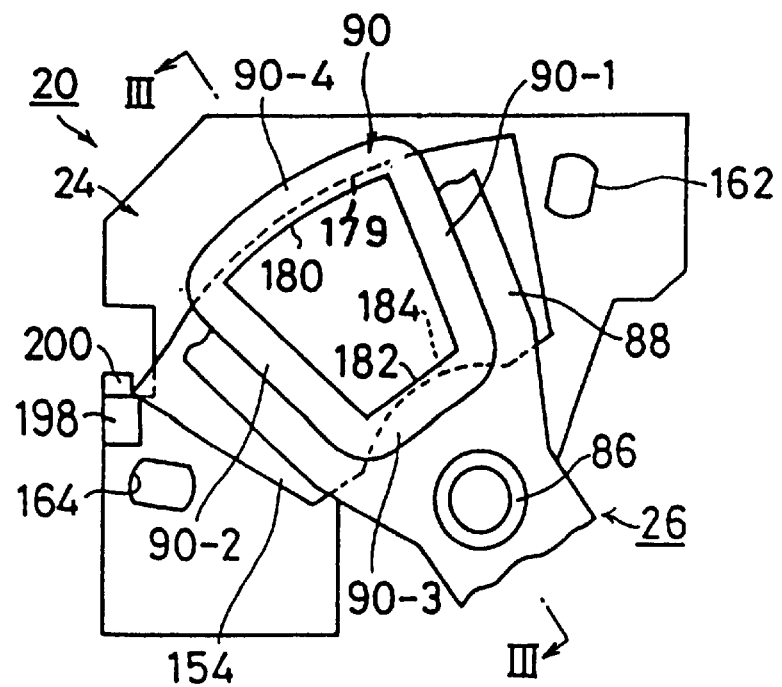
FIG. 14 is an explanatory diagram of the relation between a magnet and a movable coil.

FIG. 14 shows the arrangement relation between the magnet and the movable coil in the VCM of the present invention and shows a state in which the upper yoke in the VCM is removed. The movable coil 90 of the actuator 26 is installed to the coil supporting plate 88 provided in the rear portion of the rotary shaft 86. In the movable coil 90, right and left coil portions 90-1 and 90-2 for the longitudinal direction of the actuator 26 become the portions of the coil effective length to obtain a rotational torque for a magnetic flux which is generated between the lower magnet 154 and the upper magnet 156 locating in the upper portion. On the other hand, with respect to front and rear coil portions 90-3 and 90-4 of the movable coil 90, even if a magnetic flux passes through such portions, no rotational torque is derived and a thrust force in the longitudinal direction of the actuator 26 is generated. Therefore, the front and rear coil portions 90-3 and 90-4 become the coil portions which don't generate any rotational torque.

In the conventional VCM, magnet outer edges 179 and 184 in the front/rear direction of the lower magnet 154 and upper magnet 156 are made to coincide with coil inner edges 180 and 182 in the front/rear direction of the movable coil 90, thereby preventing the magnet from enters the coil portions 90-3 and 90-4 which don't contribute to the generation of the rotational torque. On the other hand, in the VCM 20 of the present invention, as shown in FIG. 14, as compared with the coil inner edges 180 and 182 in the front/rear direction of the movable coil 90, the magnet outer edges 179 and 184 of the lower magnet 154 and upper magnet 156 (not shown) are enlarged so as to slightly overlap to the front and rear coil portions 90-3 and 90-4 as shown by broken lines.

Figure 15:
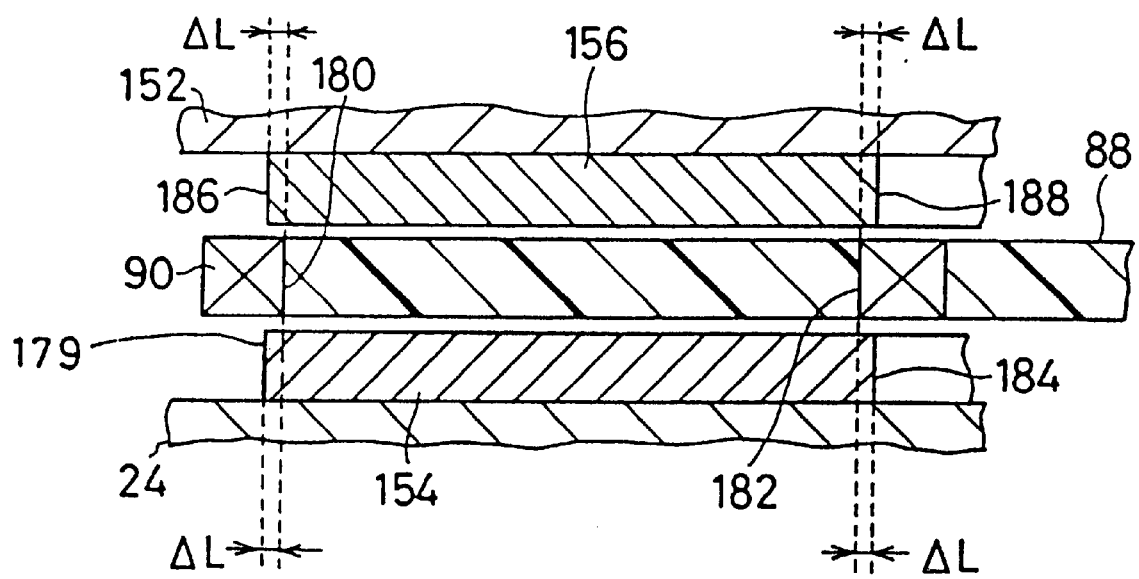
FIG. 15 is an explanatory diagram of an overlap in the front/rear direction of the magnet for the movable coil.

FIG. 15 is a cross sectional view in the longitudinal direction of the actuator in FIG. 14. As will be obviously understood from the cross sectional view, as compared with the coil inner edge 180 in the outside of the movable coil 90, the magnet outer edges 179 and 186 of the lower magnet 154 and upper magnet 156 are fitted into the front and rear coil portions by only $\Delta L$. With respect to the coil inner edge 182 on the inside, magnet outer edges 184 and 188 of the lower magnet 154 and upper magnet 156 are fitted by only $\Delta L$.

Figure 16:
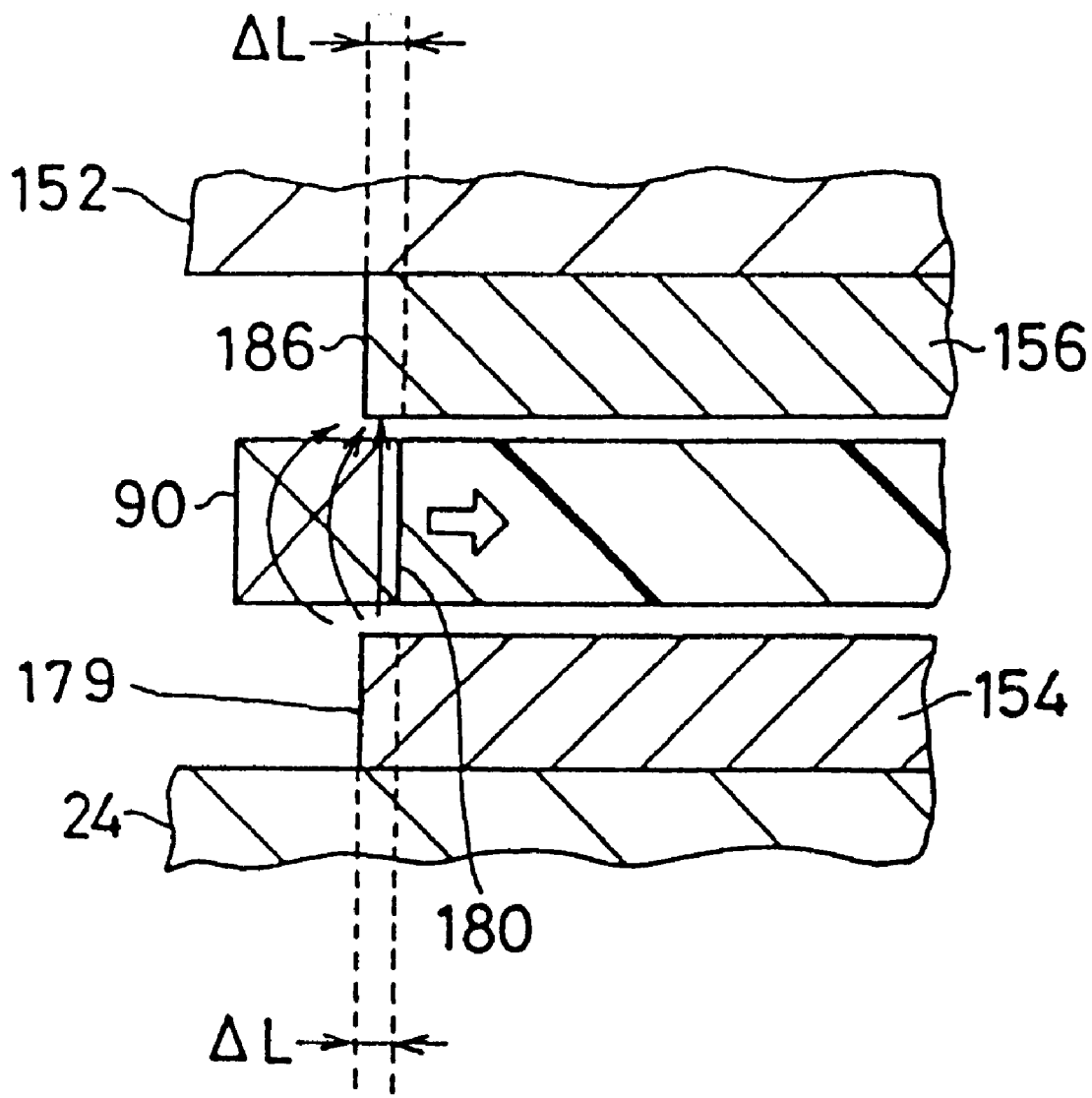
FIG. 16 is an explanatory diagram of the operation by the overlap of the magnet.

FIG. 16 shows a function in the case where the magnet edge portions are slightly overlapped to the front and rear coil portions. A magnetic flux density which is caused by the lower magnet 154 and upper magnet 156 and which passes through the right and left portions of the coil effective length of the movable coil 90 is reduced at the magnet outer edge which reaches the front and rear portions of the coil due to an external leakage magnetic flux. Thus, even if the front/rear magnet width physically coincides with the length of the right and left coil portions, the effective length is substantially reduced due to a decrease in magnetic flux density at the edge portion. On the other hand, as shown in FIG. 16, in case of enlarging the magnet outer edges 179 and 186 so as to overlap in excess of the coil inner edge 180, a magnetic flux leakage to the outside between the magnets is generated at a position outside of the coil effective length of the right and left coil portions. A uniform magnetic flux density is obtained with respect to the whole physical effective length of the right and left coil portions. Thus, the physical coil effective length almost coincides with the coil effective length at which the magnetic flux density becomes constant. The effective length of the coil can be substantially increased as compared with the conventional one. A rotational torque which is generated in the VCM can be also increased. On the other hand, an amount AL in which the magnet outer edge is overlapped to the front and rear coil portions is determined in consideration of the thrust force of the actuator which is generated when the magnetic flux passes in the front and rear coil portions.

Figure 17A:
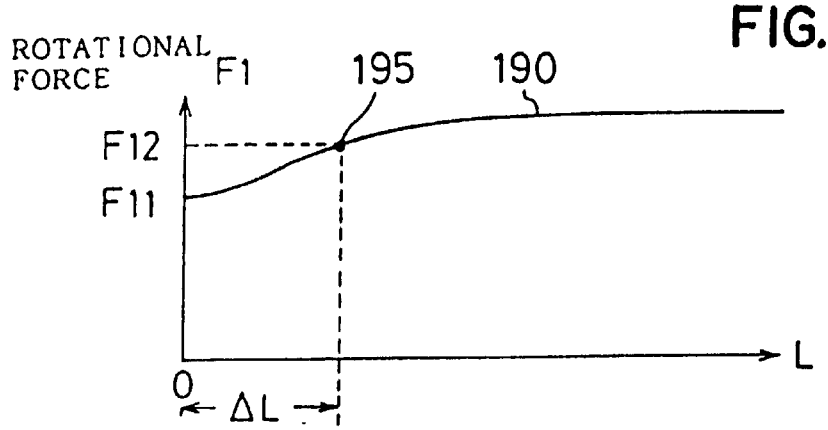
FIGS. 17A and 17B are characteristics graph showing the relation of a thrust force of a rotational force for the overlap.
Figure 17B:
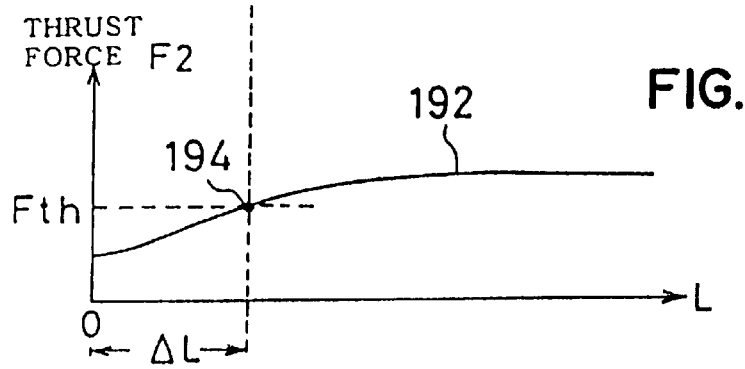

FIG. 17A shows the relation between an overlap amount (L) of the magnet outer edge for the coil portion and a rotational force F. FIG. 17B shows the relation of a thrust force F2 for the overlap amount (L). The rotational force F1 of the VCM is equal to F11 in the case where the overlap amount (L)=0, namely, in the same case as the conventional one. When the overlap amount of the magnet outer edge is increased, however, the rotational force increases and is saturated at a certain position as shown by a curve 190. On the other hand, the thrust force F2 has characteristics such that, as shown by a curve 192, when the overlap amount (L)=0 is set to an initial value, the thrust force F2 also increases in association with an increase in overlap amount (L) and is finally saturated. When the thrust force F2 is too large, a twist occurs in the rotation of the actuator 26 and an inertia increases. Therefore, the overlap amount ΔL is decided at a position such as to suppress the thrust force F2 to a specified threshold value Fth. When the thrust force F2 is suppressed to the threshold value Fth, the overlap amount ΔL that is decided at a point 194 on the curve 192 is derived. The rotational force at the overlap amount ΔL is set to F12 that is given at a point 195A on the characteristics curve 190, so that the rotational force of the VCM can be increased.

Assembling Structure with Actuator

Figure 18:
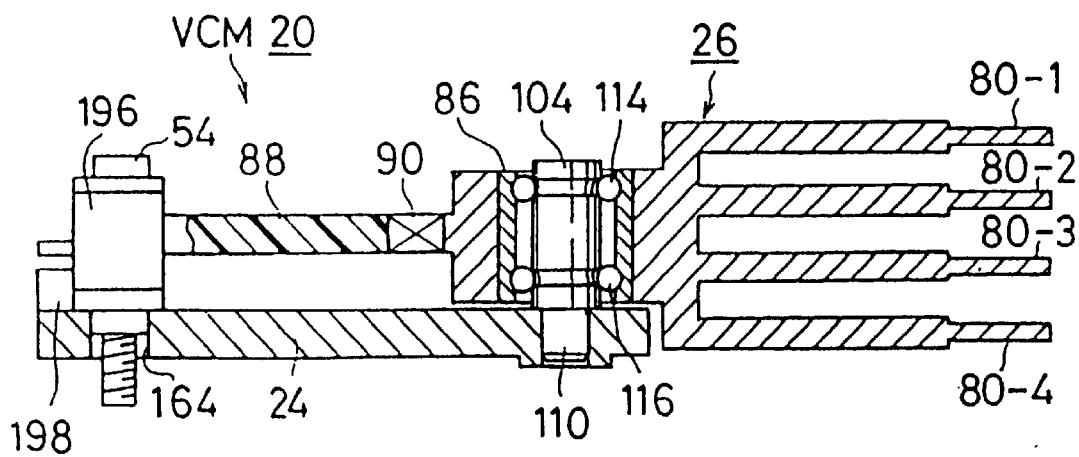
FIG. 18 is a cross sectional view of an integrated structure of the VCM and the actuator.

FIG. 18 shows an assembling structure of the actuator 26 to the lower yoke 24 which functions as a bottom plate in FIG. 2. The lower yoke 24 of the VCM 20 is extended up to the portion of the rotary shaft 86 of the actuator 26. A hole 172 is formed in such an extended portion of the lower yoke 24. The shaft portion 110 in the lower portion of the fixed axis 104 provided on the inside of the rotary shaft 86 of the actuator 26 through the ball bearings 114 and 116 is inserted and fixed into the hole 172 with a pressure. Further, a stopper 196 for positioning the coil supporting plate 88 of the movable coil 90 of the rear portion of the actuator 26 is also integrally provided by screwing on the lower yoke 24 which functions as a bottom plate. Further, the latch magnet 198 is arranged at the position of a latch member which is lifted up by cutting out a part of the lower yoke 24. The screw 54 to fix the stopper portion 196 to the lower yoke 24 passes through the through hole 164 and is screwed and fixed into the screw hole 58 of the base plate 12 in FIG. 2 that is located on the lower side. Thus, the screw 54 has a function to fix the lower yoke 24 which functions as a bottom plate to the base plate 12. By installing the actuator 26 and, further, the stopper portion 196 by using the lower yoke 24 on the fixed side of the VCM 20 as a bottom plate, a positional accuracy of the fixed side of the VCM 20 and the actuator 26 can be remarkably improved as compared with the case where the fixed side of the VCM 20 and the actuator 26 are separately formed and are individually assembled and fixed onto, for example, the base plate 12.

Locking Mechanism and Stopper Mechanism of Actuator

Figure 19:
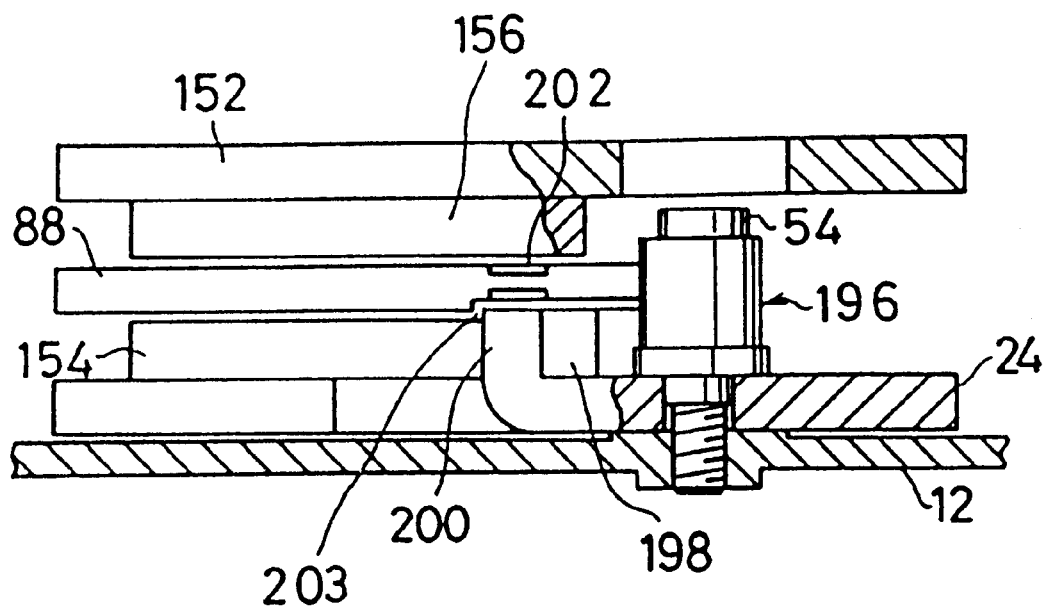
FIG. 19 is an explanatory diagram of a stopper mechanism of the actuator.
Figure 20:
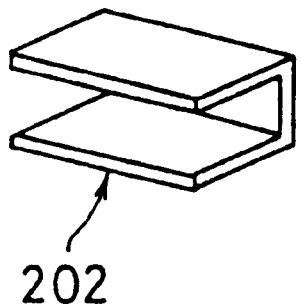
FIG. 20 is an explanatory diagram of a latch plate in FIG. 19.

FIG. 19 shows a locking mechanism and a stopper mechanism of the actuator in the invention in the case where they are seen from the rear side of the movable coil provided for the actuator. A stopper stage portion 203 is formed at the right edge of the rear portion of the coil supporting plate 88 of the actuator. A latch plate 202 is provided near the stopper stage portion 203. As shown in FIG. 20, the latch plate 202 is a member which is made of a magnetic material such as iron or the like and which is bent like a ⊐ shape and is integrally embedded and fixed when molding the coil supporting plate 88 using liquid crystal polymer. On the other hand, the latch member 200 is bent upward from the lower yoke 24. The latch magnet 198 is positioned and fixed to the inside of the latch member 200. The coil supporting plate 88 of the actuator is held by being subjected to an attracting force by the latch magnet 198 at the position where the latch plate 202 shown in the diagram faces the edge surface of the latch member 200. On the right side of the latch member 200 having the latch magnet 198, the stopper portion 196 is arranged into the screw hole 58 of the base plate 12 by screwing with the screw 54. A contact portion made of a rubber is formed on the surface of the stopper portion 196 and the coil supporting plate 88 is come into contact with the rubber portion.

The locking mechanism of the actuator using the latch magnet 198, latch member 200, and latch plate 202 in FIG. 19 locks the actuator by a magnetic attracting force during the stopping operation for returning the head to the innermost position by the VCM 20 when the disk apparatus of the invention is stopped by shutting off a power supply of the disk apparatus. In the actuator locking state, the head is located in an innermost contact start/stop region (CSS region) of the disk and is come into contact with the disk surface. When the head is held in a state in which it is in contact with the contact start/stop region for a long time, the head is adsorbed to the disk surface. When the power supply of the disk apparatus is subsequently turned on, an operation to release the adsorption of the head is necessary. To release the adsorption of the head in the stop state, in the disk apparatus of the invention, an operation to further drive the head to the inner side from the locking state at the time of turn-on of the power supply is executed. Such an operation is called a compressing operation to release the adsorption of the head. When the head is further driven to the inner side from the locking position of the actuator, since the stopper portion 196 is made of a rubber, the rubber is deformed and the actuator further moves to the inner side, so that the head in a contact state can be removed.

Figure 21B:
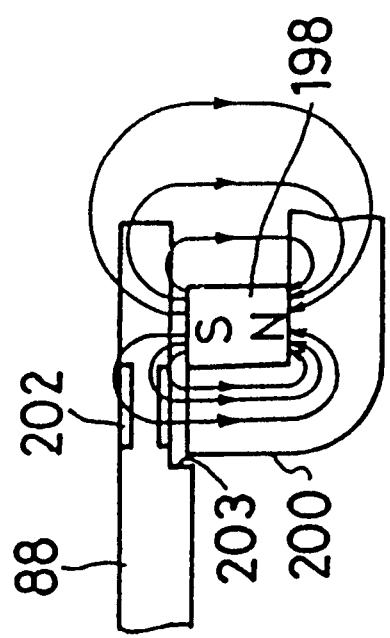
FIGS. 21A and 21B are explanatory diagrams of a latch function by a magnet attracting force.
Figure 21A:
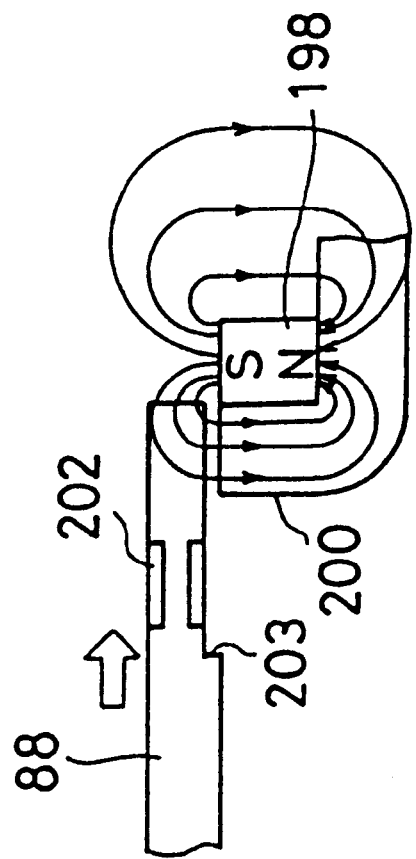

FIG. 21A shows a state in which the latch plate 202 provided to the coil supporting plate 88 of the actuator approaches the latch member 200. The latch magnet 198 provided on the right side of the latch member 200 forms a magnetic circuit shown by arrows for the edge surface of the latch member 200 by a formation of a magnetic circuit by the standing latch member 200. If the latch member 200 doesn't exist, a spatial magnetic circuit is formed as shown on the right side of the latch magnet 198 and, while the latch plate 202 approaches the latch magnet 198, the attracting force gradually increases and becomes maximum at the relative position of the latch magnet 198. Therefore, when the latch member 200 doesn't exist, the motion of the actuator when the latch plate 202 comes to the inner side by the formation of the spatial magnetic circuit from the latch magnet 198 is influenced. On the other hand, according to the invention, since the latch member 200 is provided, as shown in FIG. 21A, the motion of the actuator is not influenced by the latch magnet 198 until the latch plate 202 enters the edge surface of the latch member 200. As shown in FIG. 21B, the magnetic attracting force becomes maximum in a state in which the latch plate 202 faces the edge surface of the latch member 200. At this position, the locking state by the magnetic attracting force of the actuator by the latch magnet 198 is obtained.

Figure 22:
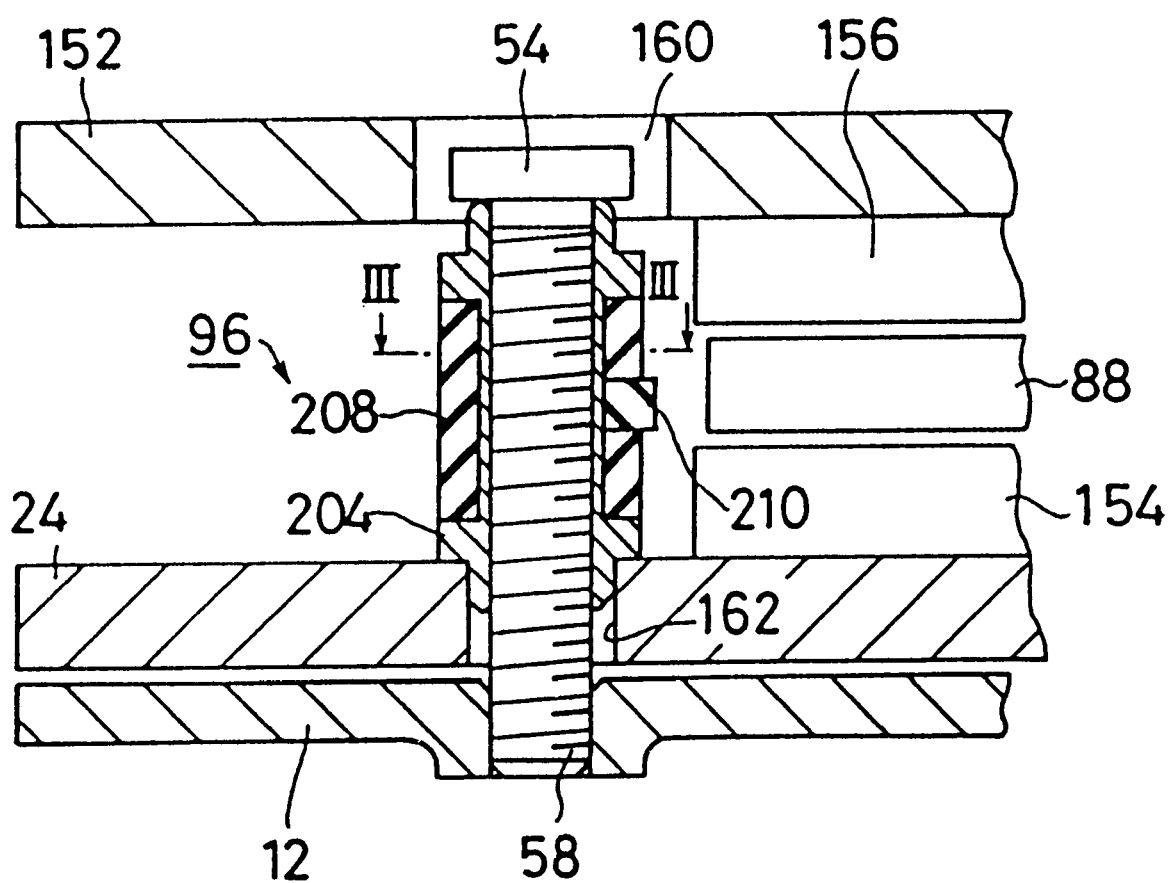
FIG. 22 is a cross sectional view of a stopper section in FIG. 19.
Figure 23:
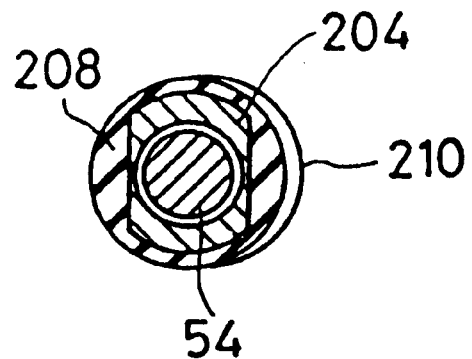
FIG. 23 is a cross sectional view taken along the line III—III in FIG. 22.

FIG. 22 shows the details of the stopper portion 196 shown in FIG. 19. The stopper portion 196 forms a hard rubber layer 208 in the outer circumference of a holder 204 made of a metal and is slightly projected than the hard rubber layer 208 on the right side with which the coil supporting plate 88 is come into contact, thereby providing a soft rubber projection 210. FIG. 23 is a cross sectional view taken along the line III—III in FIG. 22. The hard rubber layer 208 formed around the holder 204 has a circular cross section. On the other hand, the soft rubber projection 210 is formed so as to be projected in a state in which the center is deviated to the right.

Figures 24A, 24B:
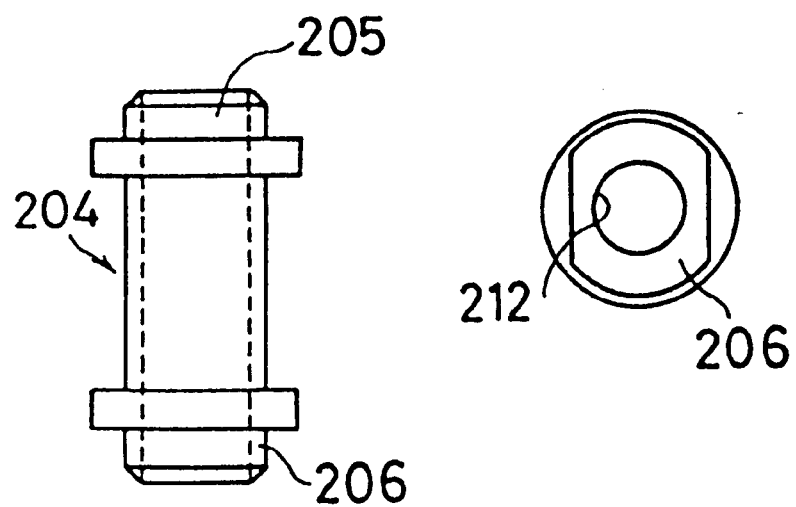
FIGS. 24A and 24B are explanatory diagrams of a holder in FIG. 22.

FIG. 24A shows the holder 204 of the stopper portion 196. Fitting portions 205 and 206 having flanges are provided in the upper and lower portions of the holder 204. For example, as shown in a bottom view of FIG. 24B, the fitting portion 206 has what is called a double-chamferred shape in which corner portions on both sides are cut out. The fitting portion 206 with such a double-chamferred shape of the holder 204 is fitted into the through hole 162 of the lower yoke 24 similarly having a double-chamferred hole in FIG. 22 in a rotation locking state. Further, a through hole 212 is formed in the holder 204 so as to pierce the inside thereof. As shown in FIG. 22, the screw 54 is inserted into the through hole 212 from the working hole 160 of the upper yoke 152 and is screwed and fixed into the screw hole 58 of the base plate 12.

As mentioned above, in the stopper portion 196, the soft rubber projection 210 and hard rubber layer 208 are provided for the contact surface of the coil supporting plate 88 of the actuator. Therefore, the stopper portion 196 is in slight contact with the soft rubber projection 210 in the locking state by the latch magnet 198, latch member 200, and latch plate 202 in FIG. 19. When the apparatus is made operative by turning on the power supply of the disk apparatus in the locking state of the actuator, by the driving in the inner direction of the VCM, the coil supporting plate 88 pushes the soft rubber projection 210 and can slightly move it to the position at which the soft rubber projection 210 is come into contact with the hard rubber layer 208. Thus, the head adsorption can be released. Further, since the stopper mechanisms are provided on both of the inner and outer sides and are fixed by screwing, there is a fear of occurrence of a loose in screw when a collision of the actuator repetitively occurs. In the invention, therefore, a colliding portion of the actuator for the stopper is allowed to have an angle for generating a force such as to fasten the screw in case of collision, thereby preventing the loose of the screw.

Figure 25:
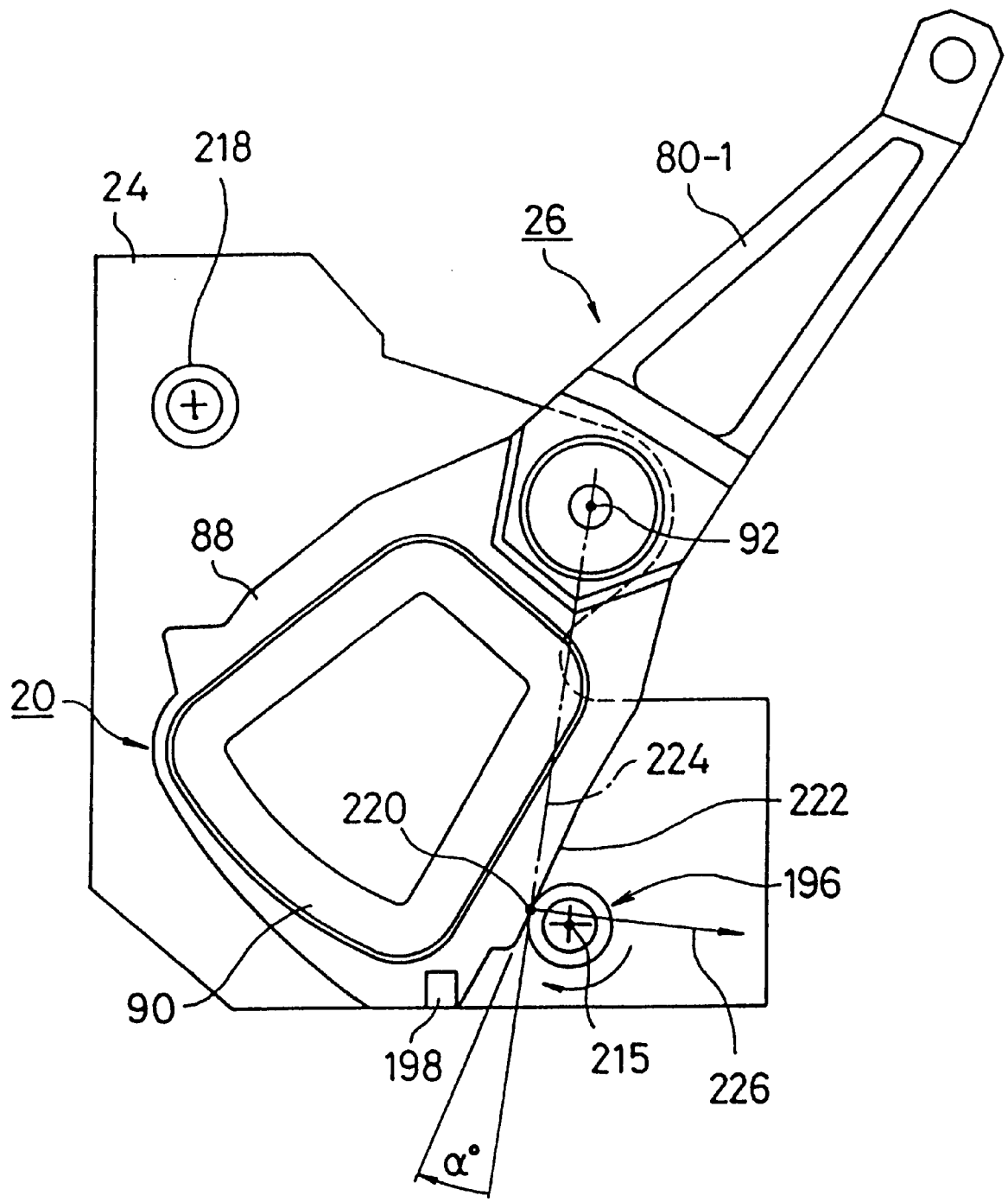
FIG. 25 is an explanatory diagram of a collision state of an inner side stopper.

FIG. 25 shows a state in which the actuator 26 is in contact with the stopper portion 196 on the inner side. In this case, the actuator 26 collides with the stopper portion 196 at a collision surface 222 on the right side of the coil supporting plate 88. Now, assuming that the contact position to the stopper portion 196 is set to 220, a force 226 in the direction perpendicular to a straight line 224 connecting the contact point 220 and the rotational center 96 is applied to the stopper portion 196. The force 226 is deviated from a rotational center 92 of the stopper portion 196 and applies a clockwise force shown by an arrow to the stopper portion 196. Since a right hand screw is used to fix the stopper portion 196, the screw is fastened by the clockwise force by the force 226 generated by the collision and is not loosened. In order to generate the force 226 to cause such a rotational force, it is sufficient that an inclination angle of the collision surface 222 to the straight line 224 passing through the rotational center 96 is set to a horizontal angle α.

Figure 26:
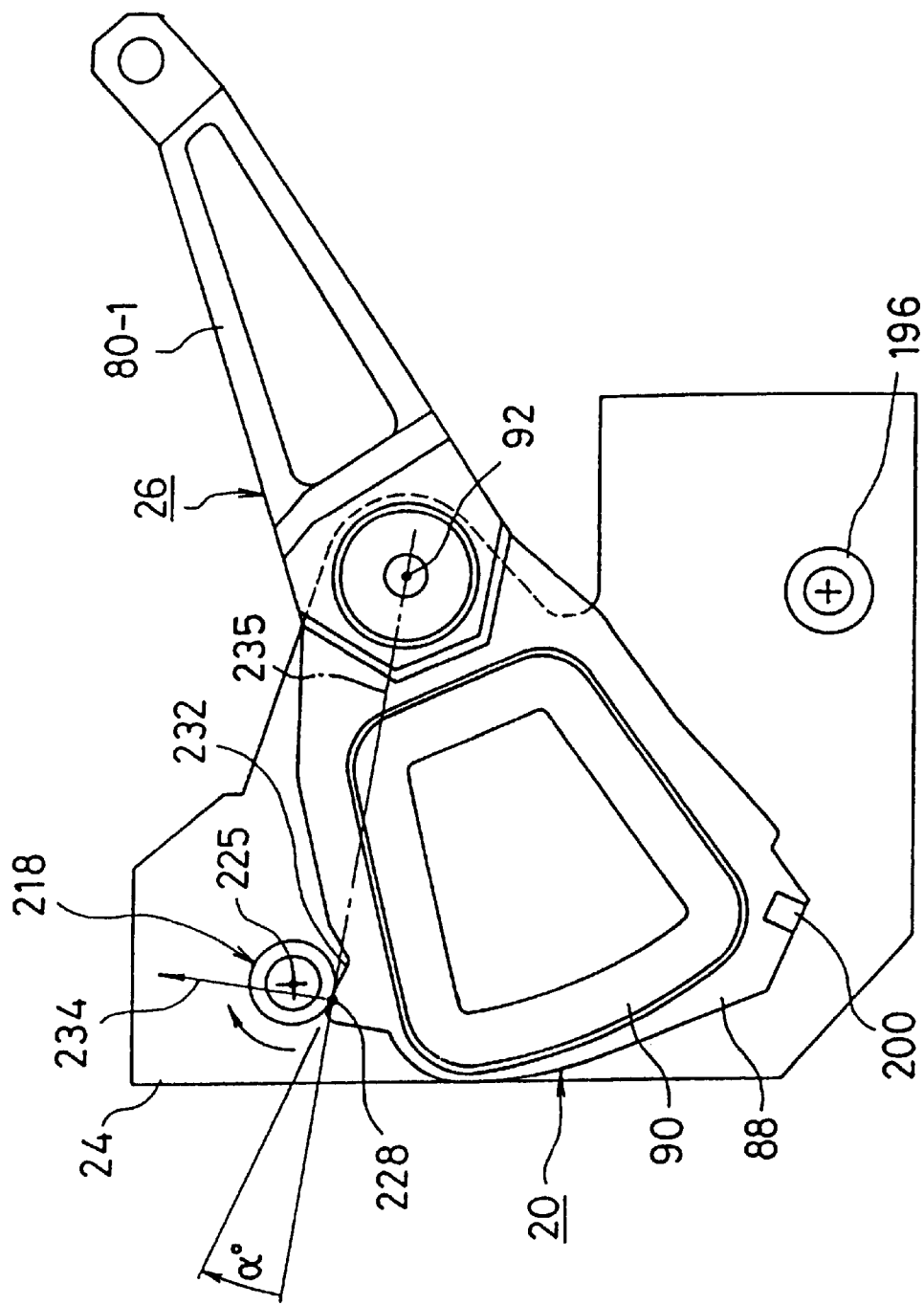
FIG. 26 is an explanatory diagram of a collision state of an outer side stopper.

FIG. 26 shows a collision state to a stopper portion 218 when the actuator 26 is moved to the outermost side. In this case as well, the direction of a collision surface 232 for the stopper portion 218 of the coil supporting plate 88 is set to the angle α shown in the diagram for a straight line 230 connecting a contact point 228 and the rotational center 96, so that a force 234 shown by an arrow can be applied to the stopper portion 218. Since the force 234 is deviated from the rotational center 92 of the stopper portion 218, it applies a clockwise force shown by an arrow. Since a right hand screw is used in the stopper portion 218, therefore, the screw is subjected to a rotational force in the fastening direction by the force 234 by the collision of the actuator and a loose of the screw can be prevented.

Positioning of the Movable Portion of FPC

In the disk apparatus of the invention in FIG. 1, with respect to the fixing of the portion of the FPC connecting band 62 serving as a movable portion which extends from the FPC board 60 that was fixedly arranged to the actuator 26, since the apparatus has a structure such that the band portion is floating with gaps in both of the height direction and the width direction, the positioning work on the fixed side in the FPC board 60 of the FPC connecting band 62 is important. When there is an error in the assembling position in the positioning work, a bending shape of the FPC connecting band 62 whose bending state changes according to the motion of the actuator 26 becomes abnormal and there is a fear such that the FPC connecting band 62 is come into contact with the parts such as IC, resistor, and the like installed on the FPC board 60. When the band 62 is incompletely fixed, the FPC connecting band 62 cannot trace the motion of the actuator 26 and shakes. Not only the band 62 is come into contact with the other parts but also an abnormal external force by a deformation is applied to the actuator 26, thereby deteriorating a response speed. The invention, therefore, intends to realize a structure such that the FPC connecting band 62 extending to the actuator 26 is positioned and fixed to the FPC board 60 side by a one-touch operation.

Figure 27:
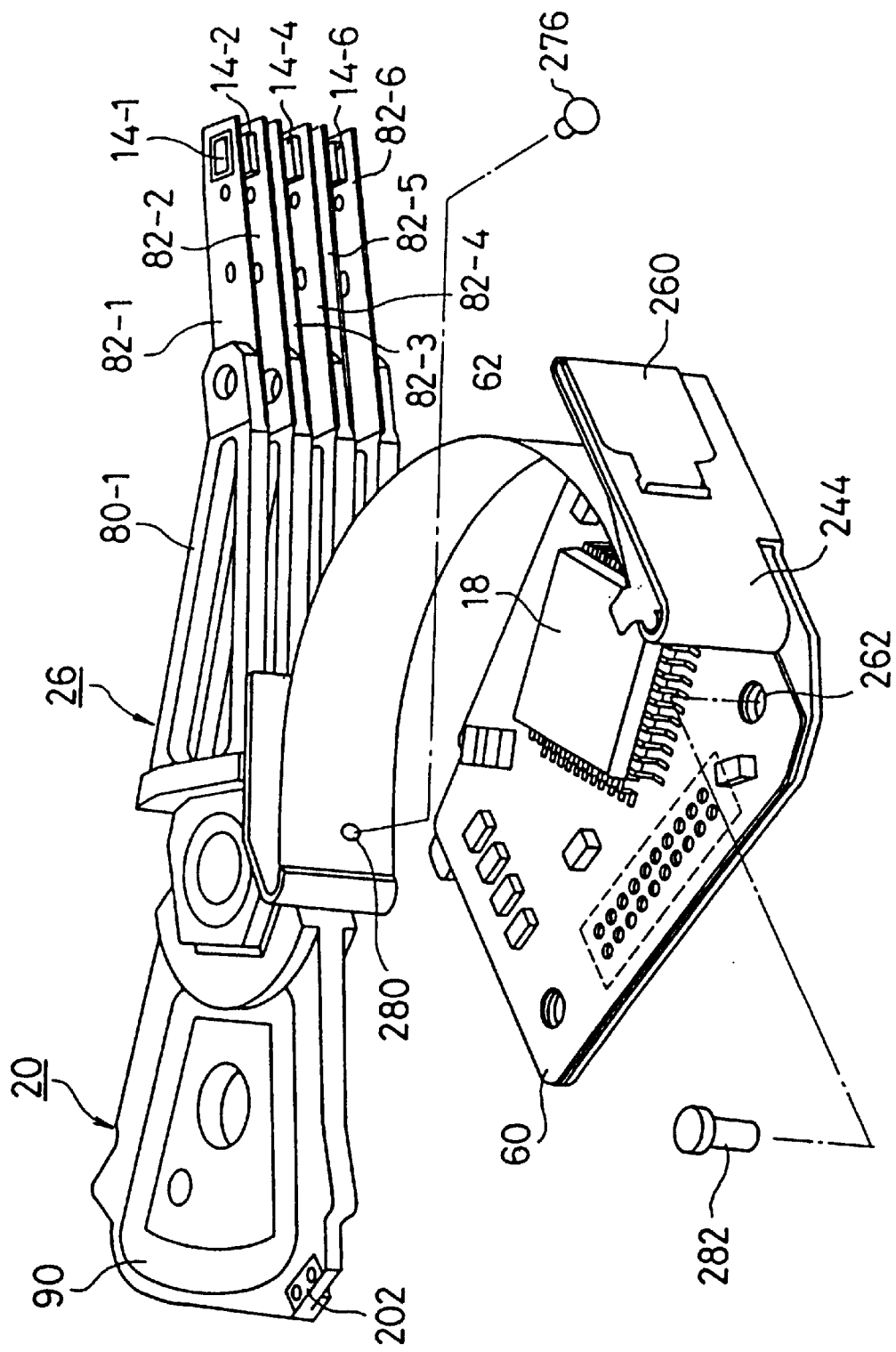
FIG. 27 is an explanatory diagram of a coupling portion of an FPC circuit board and the actuator.

FIG. 27 shows a coupling state between the FPC board 60 and the actuator 26 by the FPC connecting band 62 in the invention of FIG. 1. First, a structure on the FPC board 60 side will be described with reference to an assembly exploded diagram of FIG. 28. The FPC board 60 is adhered and fixed onto a board plate 240 made of metal by using a double-side adhesive sheet 242. Circuit parts including the head IC circuit 18 are installed on the surface of the FPC board 60. A band leading portion 265 is integrally bent upward on the side surface and integrally leading out the FPC connecting band 62 from the right edge portion. The connecting pattern to the head on the FPC board 60 is formed by printing as a circuit pattern on the FPC connecting band 62 via the band leading portion 265. A projection 267 is provided on the side surface of the band leading portion 265. Further, connector holes 265 in which a plurality of pins which are used to connect the connector are formed in the FPC board 60. The double-side adhesive sheet 242 is formed by coating an adhesive agent onto both surfaces of a thin resin film and has through holes 256 and 258 and a rectangular hole 254 for connector. The board plate 240 made of metal has a shape which faces the FPC board 60 and has through holes 250 and 252 and a rectangular hole 248 for connector. Further, a J-shaped receiving portion 249 for supporting the band leading portion 265 of the FPC board 60 is formed on the side of the plate 240. The lower side of the J-shaped receiving portion 249 is cut away by a notch 255 and, accordingly, has a cantilever spring structure. An engaging hole 246 is formed in almost the center of a supporting portion 244. Positioning members 268 and 270 (refer to FIG. 32A) provided in a plate spring portion 262 of a band pressing member 260 are inserted and positioned into upper and lower portions of the engaging hole 246.

Figure 28:
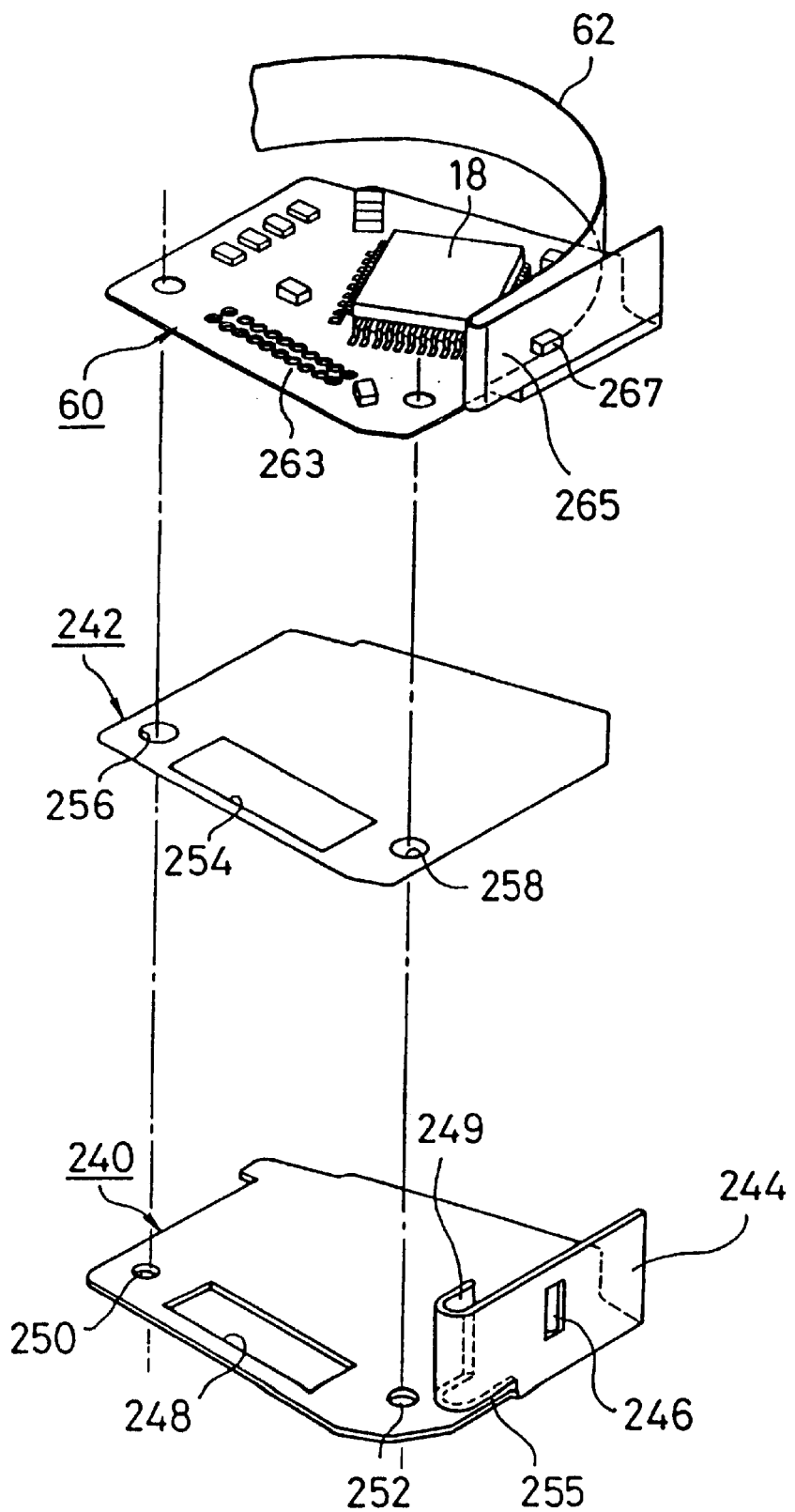
FIG. 28 is an assembly exploded diagram of the FPC board side.
Figure 29B:
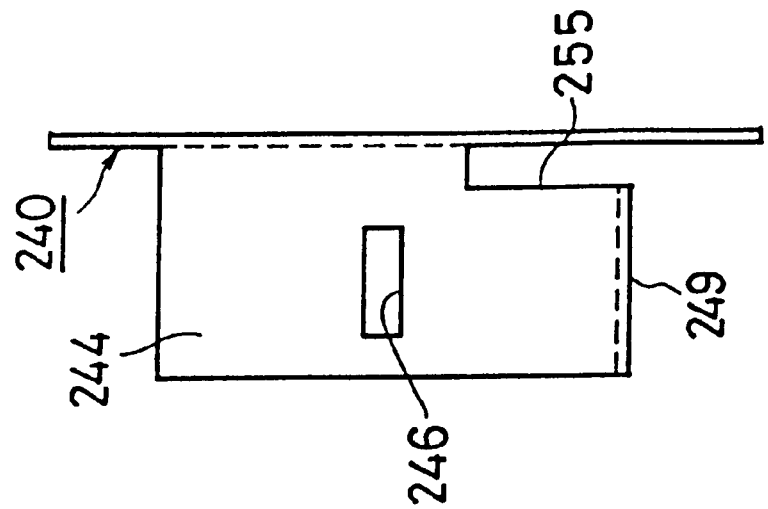
FIGS. 29A and 29B are explanatory diagrams of a board plate in FIG. 28.
Figure 29A:
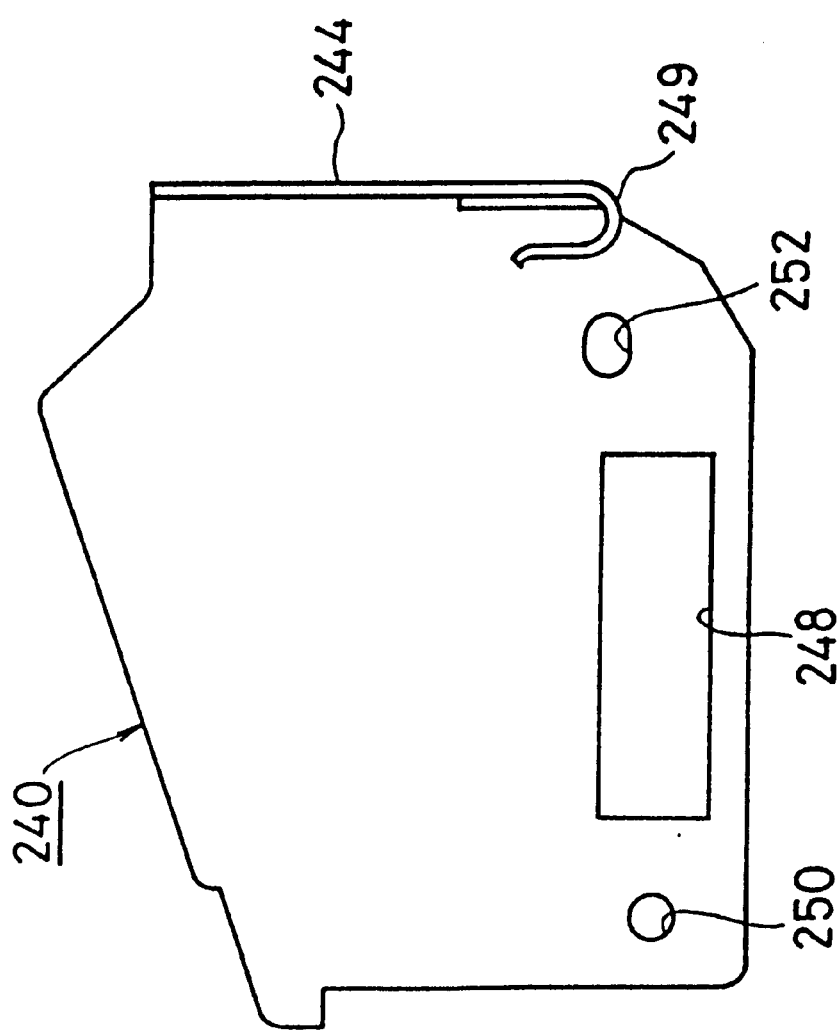
Figure 30:
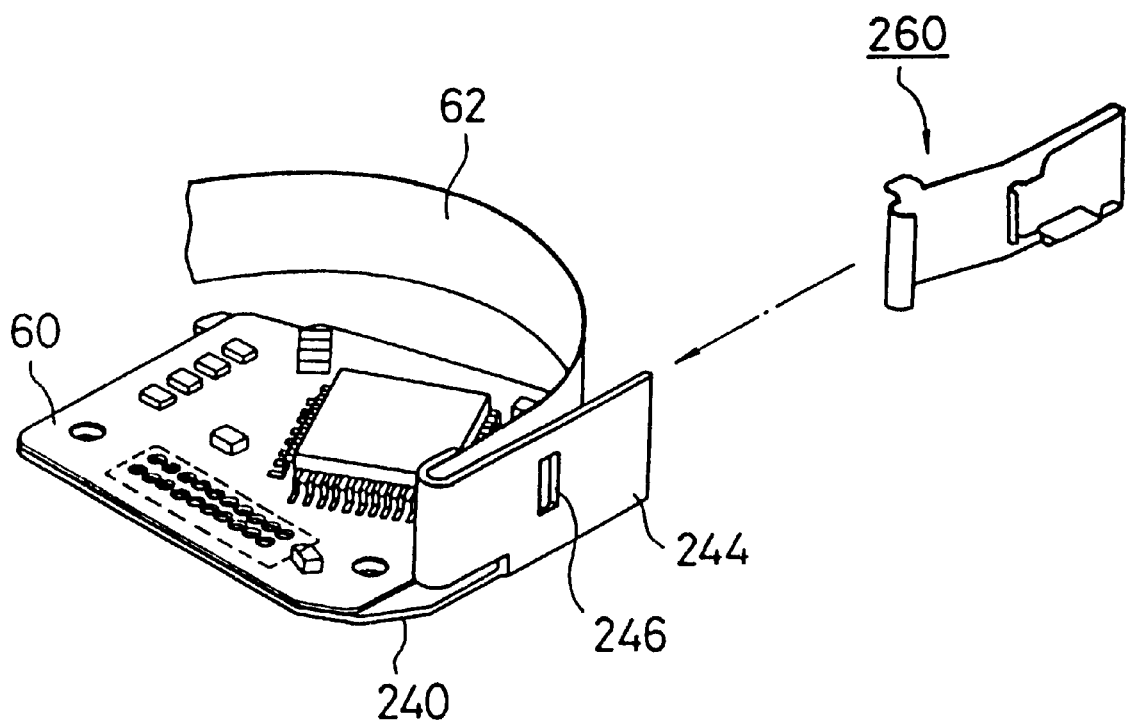
FIG. 30 is an explanatory diagram of an attachment of a band pressing member for an assembled body of the FPC board.
Figure 31A:
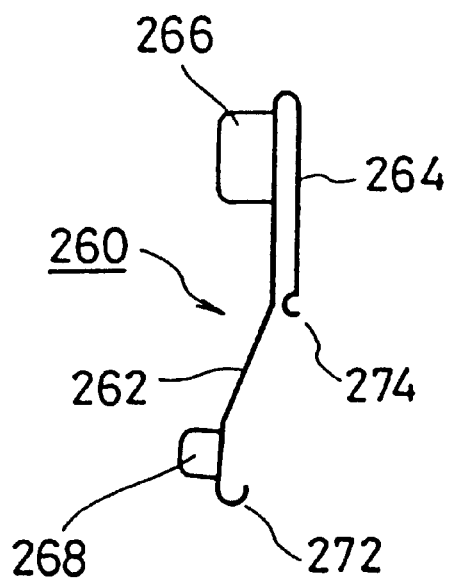
FIGS. 31A and 31B are a plan view and a side elevational view of the band pressing member.
Figure 31B:
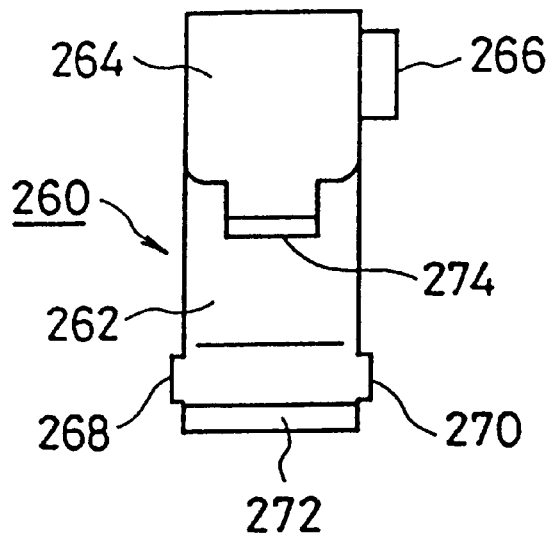
Figure 32A:
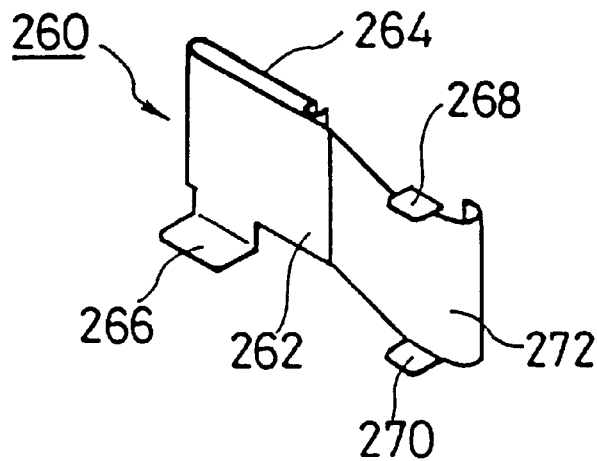
FIGS. 32A and 32B are explanatory diagrams when the band pressing member is stereoscopically shown.

FIGS. 29A and 29B show the board plate 240 made of metal in FIG. 28. FIG. 30 shows an assembling state of the band pressing member 260 for positioning and fixing the FPC connecting band 62 pulled out to the actuator side after the FPC board 60 was assembled to the board plate 240 using the double-side adhesive sheet 242 in FIG. 28. The band pressing member 260 has a structure shown in FIG. 31. FIGS. 31A and 31B are a plan view and a side elevational view of the band pressing member. Further, FIGS. 32A and 32B are perspective views on the right and left sides of the band pressing member 260.

First, the band pressing member 260 has a plate spring shape whose rear portion is folded as shown in FIG. 31A so as to have two plate portions. In the plate spring portion 262 as one of the two folded plate portions, a reverse J-shaped pressing portion 272 adapted to be fitted into the J-shaped receiving portion 249 of the band supporting portion 244 of the board plate 240 in FIG. 29 is formed at the front edge. The plate spring portion 262 which extends and reaches the reverse J-shaped pressing portion 272 at the front edge is bent with a certain angle from the parallel portion on the two folded plate portions to the outside and is formed after that. In this portion, the plate spring portion 262 has a spring performance so as to be extended to the outside. A projection 274 is formed at the front edge of the other plate spring portion 264 of the two folded plate portions. The projection 274 is formed at the position adapted to be fitted into the engaging hole 246 formed in the band supporting portion 244 of the board plate 240 in FIG. 28. FIG. 31B is a side elevational view of the band pressing member 260 when it is seen from the plate spring portion 264 side. Further, a positioning member 266 is provided on the plate spring portion 262 side of the band pressing member 260 at the lower position of the turning root portion of the two folded plate portions. Positioning members 268 and 270 are provided in the upper and lower portions of the reverse J-shaped pressing portion 272 at the front edge. The positioning member 266 in the root portion supports the lower edge surface of the FPC connecting band 62 which is led out to the outside, thereby positioning, as will be obviously understood from FIG. 32A. On the other hand, the positioning members 268 and 270 provided in the upper and lower portions on this side of the reverse J-shaped pressing portion 272 have a function for positioning the root portion of the FPC connecting band 62 between those positioning members, thereby suppressing the vertical motion. Therefore, the FPC connecting band portion 62 doesn't shake in the apparatus. The actuator driving which takes into consideration of a reaction force component of the FPC connecting band 62 can be easily controlled.

Figure 32B:
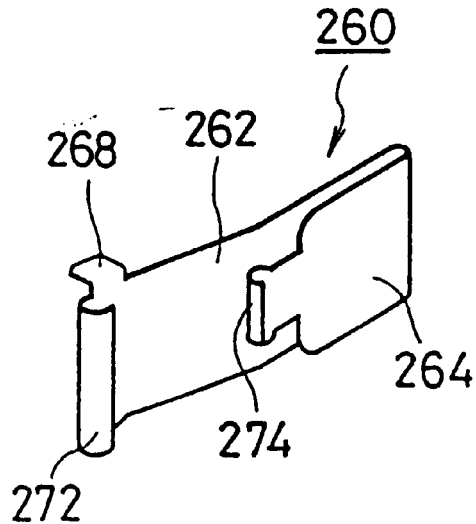

FIG. 32B clearly illustrates a state of the outside plate spring portion 264 of the two folded plate portions. A positioning to the engaging hole 246 of the board plate 240 is performed by the projection 274 at the front edge. A gap between the outside plate spring portion 264 and the plate spring portion 262 is fitted to the band supporting portion 244 of the board plate 240 and is fixed by the spring performance.

Figure 33A:
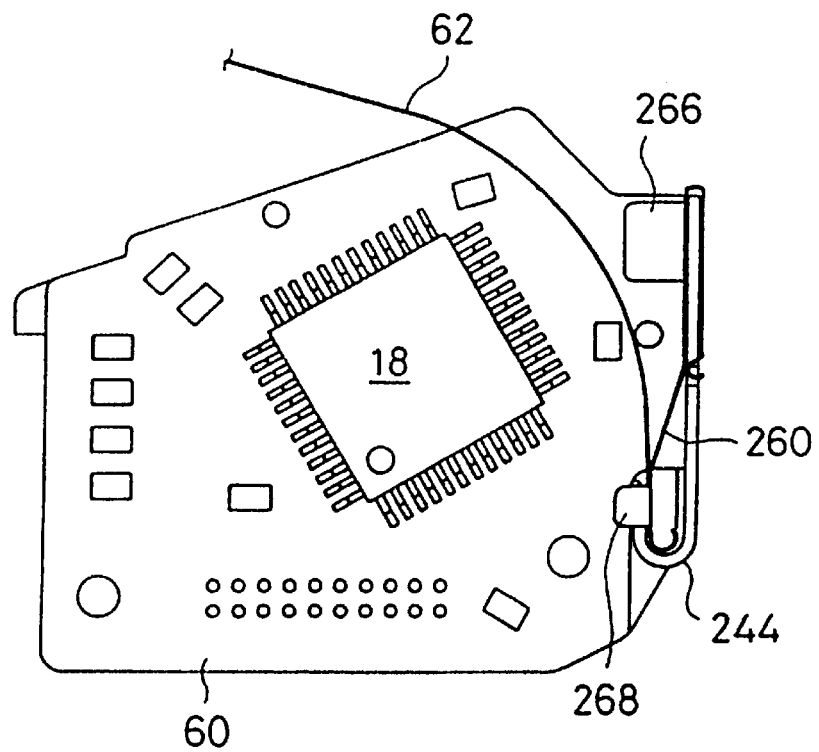
FIGS. 33A and 33B are explanatory diagrams of the FPC board when the band pressing member is attached.
Figure 33B:
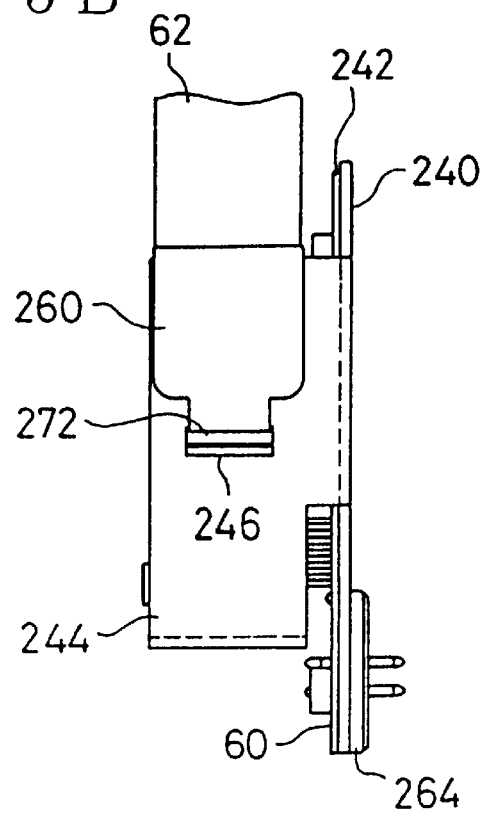

FIG. 33A is a plan view of an assembly completion state by the attaching of the band pressing member 260. FIG. 33B is a side elevational view thereof. The band pressing member 260 sandwiches therein the root portion of the FPC connecting band 62 and supports and fixes in the inside of the band supporting portion 244 as an upright portion of the board plate 240 which supports the FPC board 60 from the lower side. The band pressing member 260 allows the FPC connecting band 62 to be deformed by the motion of the actuator by setting the positioning member 268 to a fulcrum on the fixed side. As mentioned above, the FPC connecting band 62 can be positioned to the fixed side by the one-touch operation by the attaching of the band pressing member 260 and the assembling works are extremely simplified. Since the position of the fixing portion is unconditionally held at the prescribed position by the assembling of the band pressing member 260, a variation upon assembly doesn't occur.

Noise Prevention by FPC Write Pattern

Since the disk apparatus of the invention uses the MR head as a read head, it is necessary to supply a bias current to the read head in the reading operation. Therefore, a head core has a potential and, in the case where the core is come into contact with the disk medium, the current flows and there is a fear of destruction of the core. Therefore, by providing a potential to the disk side as well, the destruction by the contact with the head core is prevented. To provide a bias potential to the disk, according to the invention, by providing a bias supply pattern in the FPC connecting band 62, an exclusive-use line is made unnecessary. Further, in case of using the MR head as a read head, the read signal is very weak as compared with the conventional magnetic head. Particularly, external noises are induced for the circuit pattern of the portion of the FPC connecting band 62 and the S/N ratio largely deteriorates. In the invention, therefore, the arrangement of the connecting pattern for each head formed in the FPC is devised, thereby preventing that the noises are mixed to the read pattern. Namely, since the head portion of the invention includes the write head using the magnetic head and the read head using the MR head, four write patterns are used per one head. In the reading operation, two of the connecting patterns are not used. Therefore, by paying an attention to the write pattern which is not used in the reading mode, by allowing such a write pattern to function as a ground pattern in the reading operation, the mixture of the noises into the read pattern is prevented.

Figure 34:
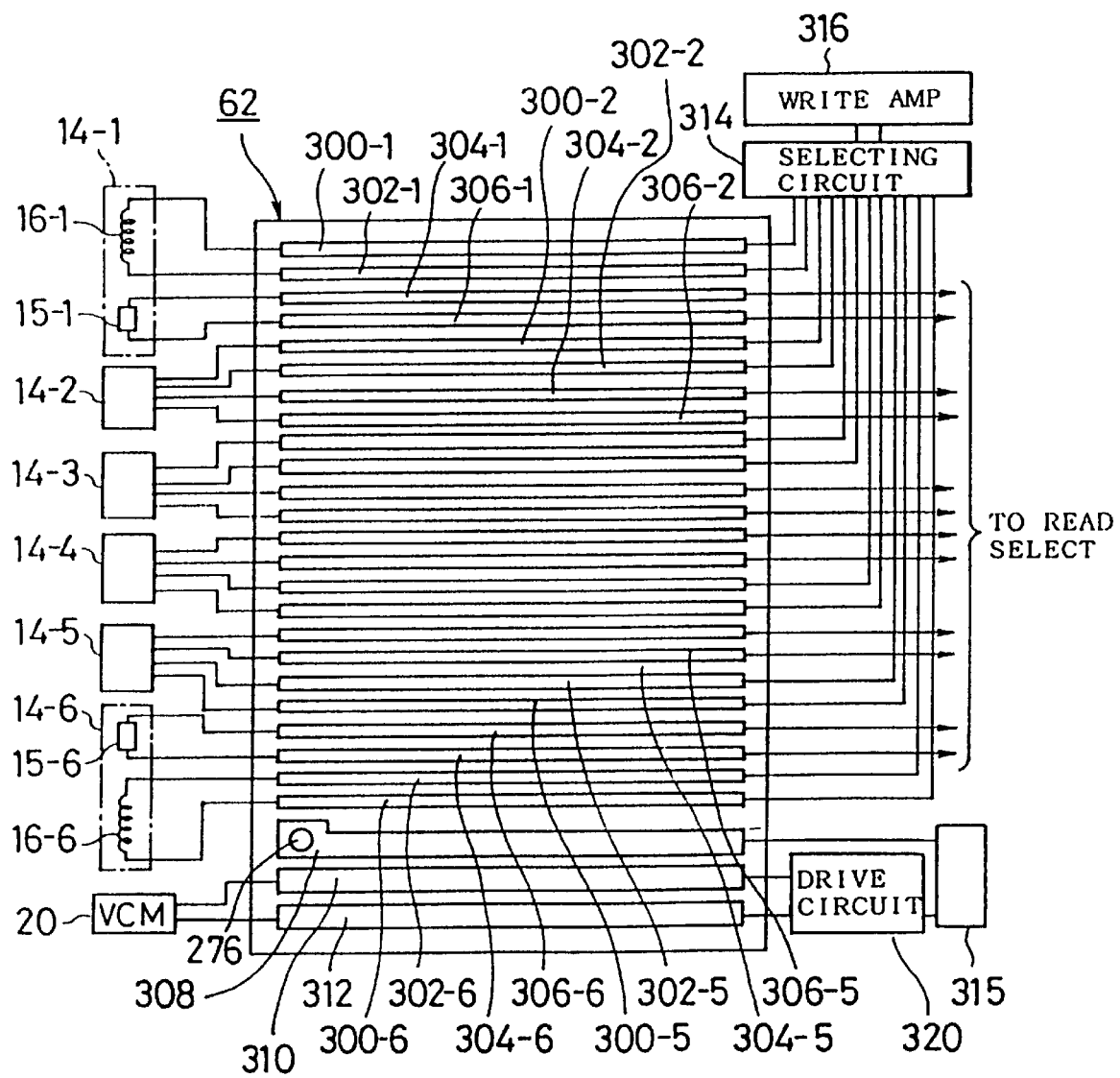
FIG. 34 is an explanatory diagram of a circuit pattern of an FPC connecting band.

FIG. 34 shows a pattern structure of the FPC connecting band 62 of the invention having an arrangement of the bias supply pattern and the write pattern for prevention of noises. The FPC connecting band 62 connects the six head portions 14-1 to 14-6 on the actuator side to the circuit section on the fixing side. As for the six head portions 14-1 to 14-6, as representatively shown in the head portions 14-1 and 14-6, they have the read heads 15-1 and 15-6 using the MR heads and the write heads 16-1 and 16-6 using the magnetic heads. In each of the head portions 14-1 to 14-6, four patterns are formed per one head. According to the invention, with respect to the patterns of the head portions 14-1 and 14-6 locating on both sides, the patterns for the write heads 16-1 and 16-6 are arranged so as to be located on the outermost side. For example, when considering the head portion 14-1, two outside patterns 300-1 and 302-1 are write patterns of the write head 16-1. Read patterns 304-1 and 306-1 for the read head 15-1 are arranged on the inside of the write patterns. This point shall also apply to the head portion 14-6 locating on the outside on the opposite side. Namely, write patterns 300-6 and 302-6 of the write head 16-6 are arranged at the outermost positions of the circuit pattern. Read patterns 304-6 and 306-6 of the read head 15-6 are arranged on the inside of the write patterns 300-6 and 302-6. With respect to the remaining head portions 14-2 to 14-5, although the read patterns and write patterns are located at any side, in the embodiment, the write patterns and read patterns are sequentially arranged in accordance with this order from the outside with respect to the head portions 14-2 and 14-3. On the other hand, the write patterns and read patterns are likewise sequentially arranged from the opposite outside with regard to the head portions 14-5 and 14-4.

Figure 35:
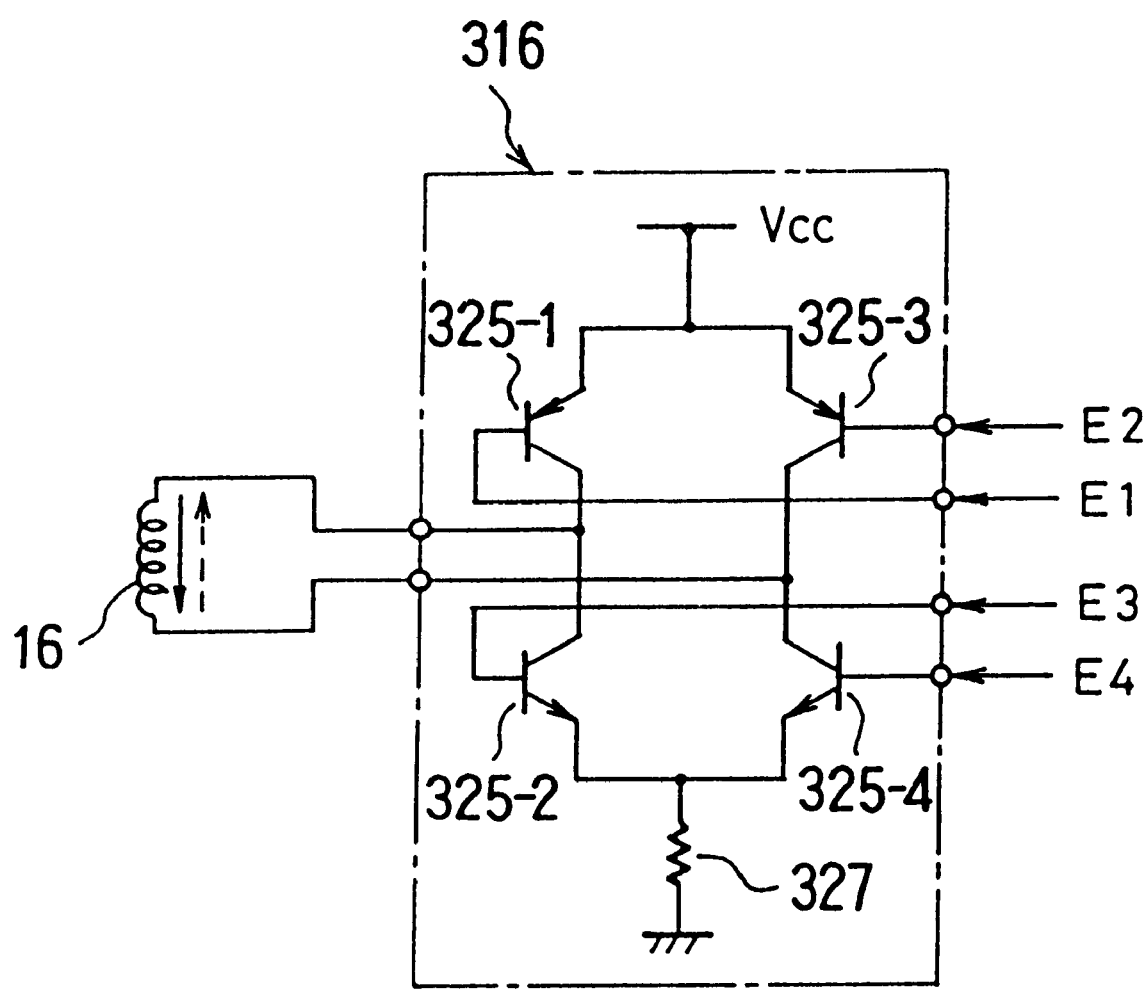
FIG. 35 is a circuit diagram of a writing amplifier in FIG. 34.

The write patterns provided in correspondence to the head portions 14-1 to 14-6 are selectively connected to a writing amplifier 316 through a selecting circuit 314 on the fixing side. The selecting circuit 314 selects the line of either one of the write heads by a head selection signal and connects the selected line to the writing amplifier 316. The writing amplifier 316 has a circuit construction of, for example, FIG. 35. The writing amplifier 316 is a bridge circuit using transistors 325-1 to 325-4. The write heads 16 are connected between the transistors 325-1 and 325-2 and between the transistors 325-3 and 325-4. The transistors 325-1 to 325-4 are turned on and off by control signals E1, E2, E3, and E4. For example, when the transistors 325-1 and 325-4 are turned on by the control signals E1 and E4, currents in the directions shown by arrows of solid lines flow in the write head 16. When the transistors 325-3 and 325-2 are turned on by the control signals E2 and E3, currents shown by arrows of broken lines can be allowed to flow in the write head 16. Further, when only the transistors 325-1 and 325-3 are turned on by the control signals E1 and E2, a power source voltage Vcc can be applied to the write head 16. When only the transistors 325-2 and 325-4 are turned on by the control signals E3 and E4, the write head 16 can be connected to the ground potential. In the embodiment of FIG. 34, in the reading operation, all of the transistors 325-1 to 325-4 of the writing amplifier 316 in FIG. 35 are turned off and the write patterns arranged on both sides are electrically set to a release state.

Figure 36:
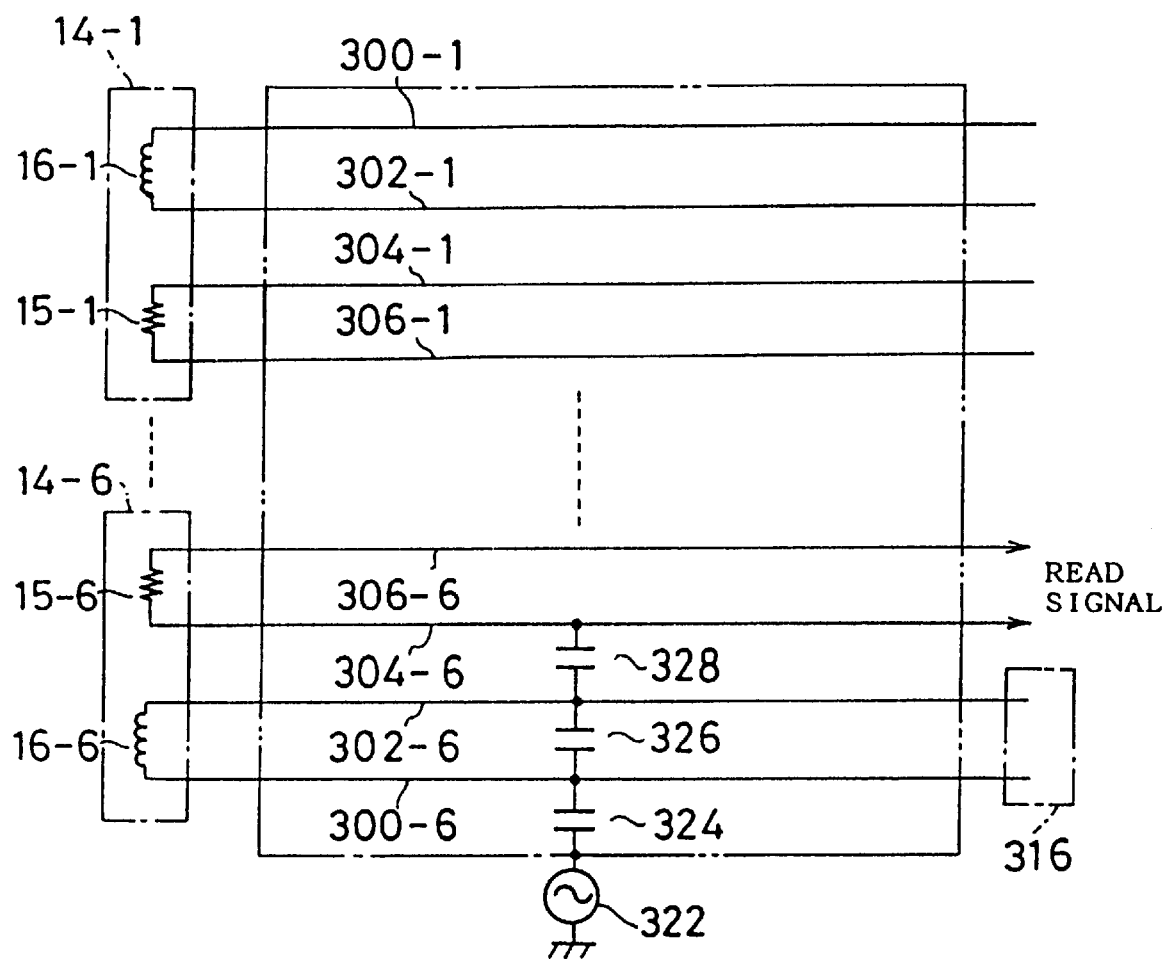
FIG. 36 is an explanatory diagram of a noise preventing function by opening write patterns.
Figure 37A:
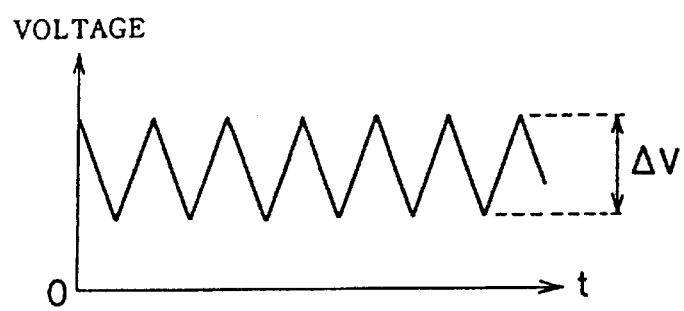
FIGS. 37A and 37B are explanatory diagrams of an external noise voltage and a read pattern noise voltage in FIG. 36.
Figure 37B:
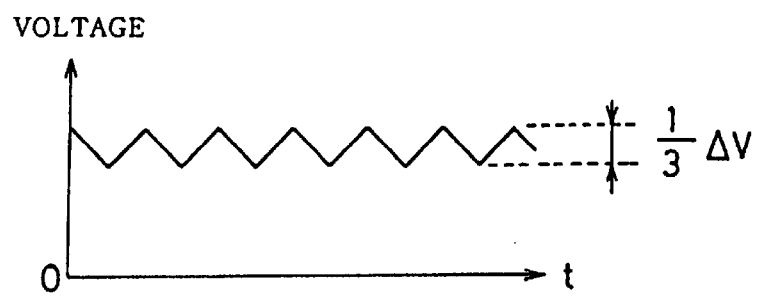

FIG. 36 shows a noise preventing function in the reading operation when the write patterns on both sides are set to the release state. When it is now assumed that the reading operation of the read head 15-6 of the head portion 14-6 on the lower side was executed, the write patterns 300-6 and 302-6 of the write head 16-6 are held in the release state by the writing amplifier 316. In this instance, assuming that noises by an external noise source 322 were applied, capacitors 324, 326, and 328 by floating capacitors are formed between the noise source 322 and the read pattern 304-6 as shown in the diagram. Therefore, a noise voltage from the external noise source 322 is divided into three capacitors 324, 326, and 328. Namely, for a change of a noise voltage $\Delta V$ of the externalnoise source 322 in FIG. 37A, the noise voltage to be applied to the read pattern 304-6 due to the voltage division by the capacitors 324, 326, and 328 is equal to $(1/3) \cdot \Delta V$ in FIG. 37B. The noise voltage can be reduced to $1/3$.

Figure 38:
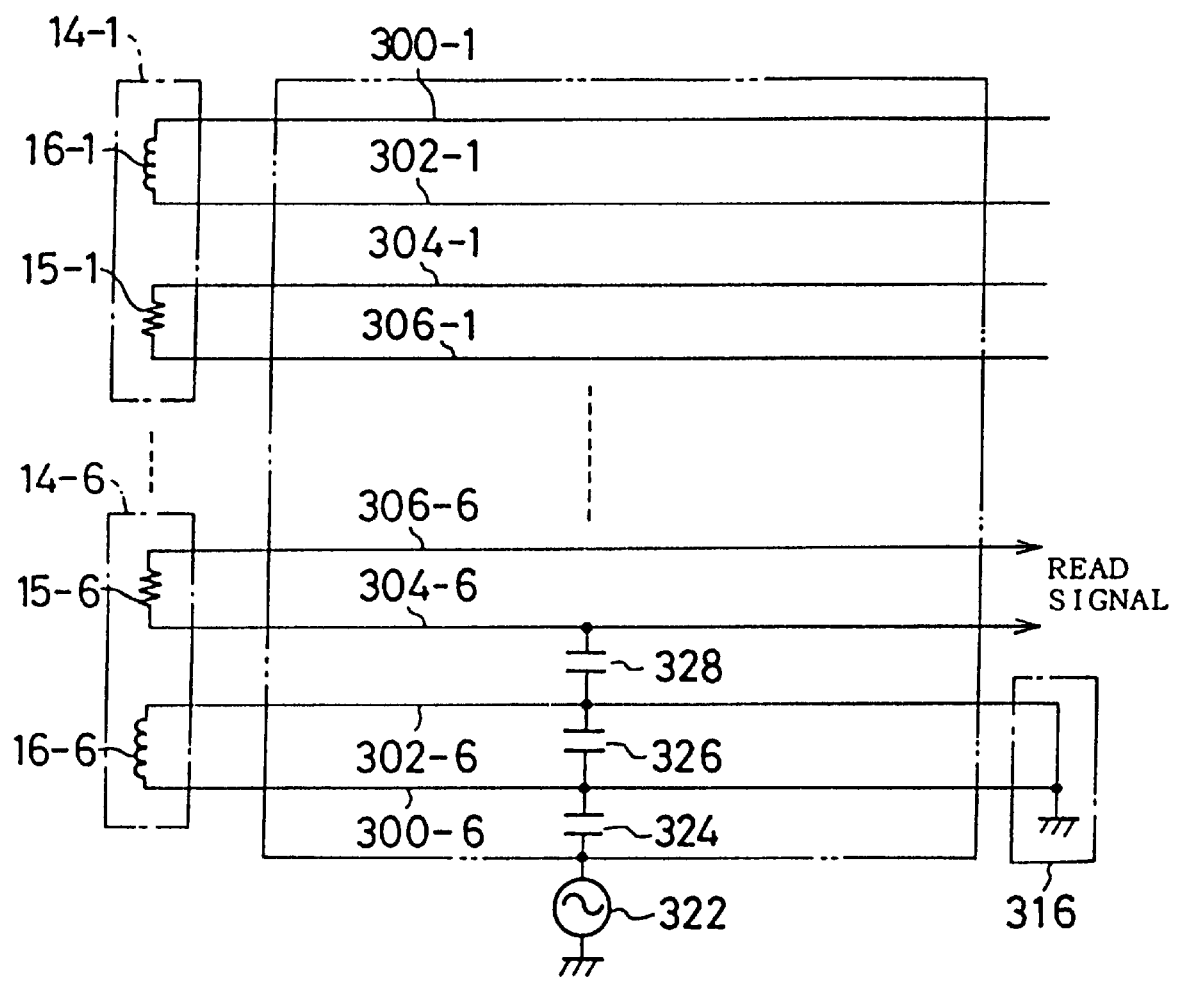
FIG. 38 is an explanatory diagram of the noise preventing function by a connection of the write patterns to the ground.

FIG. 38 shows another embodiment for noise prevention. According to the embodiment, in the reading operation, only the transistors 325-1 and 325-4 of the writing amplifier 316 in FIG. 35 are turned on and the write patterns are connected to the ground. It is now assumed that the reading operation of the read head 15-6 of the head portion 14-6 locating on the lower side was performed. In this instance, the writing amplifier 316 connects the write patterns 300-6 and 302-6 to the ground. Therefore, with respect to the capacitors 324, 326, and 328 by the three floating capacitors formed for the external noise source 322, the write pattern 300-6 side of the first capacitor 324 is connected to the ground by the writing amplifier 316, so that the noises are not transferred to the next capacitor 326. Since the next write pattern 302-6 is also connected to the ground, the noises are also not transferred to the next capacitor 328. In this case, two ground patterns which were falsely formed by the write patterns 300-6 and 302-6 are located between the external noise source 322 and the read pattern 304-6, so that an almost perfect shielding effect can be realized for the external noise source 322. Namely, the noise voltage of the write pattern 304-6 is constant as shown in FIG. 39B for the noise voltage $\Delta V$ from the external noise source 322 in FIG. 39A and no noise voltage is superimposed.

Referring again to FIG. 34, subsequent to the connecting pattern to the head, a bias supply pattern 308 for supplying a bias voltage to the disk through the actuator is formed on the FPC connecting band 62. The head side of the bias supply pattern 308 is connected to the actuator side by a screw 276. Namely, as shown in FIG. 27, the screw 276 is inserted into a through hole 280 formed in the portion of the bias supply pattern 308 of the FPC connecting band 62 and is screwed into the screw hole on the actuator 26 side, so that the bias supply pattern 308 is electrically connected to the actuator 26. As shown in FIG. 2, since the actuator 26 is mounted on the base plate 12, a bias voltage can be applied to the disks 30-1 to 30-3 of the spindle motor 22 similarly attached to the base plate 12. Further, connection patterns 310 and 312 for the VCM movable coil 90 are provided for the FPC connecting band 62 in FIG. 34. The connecting patterns 310 and 312 are connected to a drive circuit 320 on the fixed side. The bias supply pattern 308 is connected to a bias voltage supplying circuit 315 on the fixing side. Since ground sides of a bias voltage supplying circuit 318 and the drive circuit 320 are commonly connected, it is sufficient to use only one bias voltage supply pattern 308.

Spindle Motor

Figure 40:
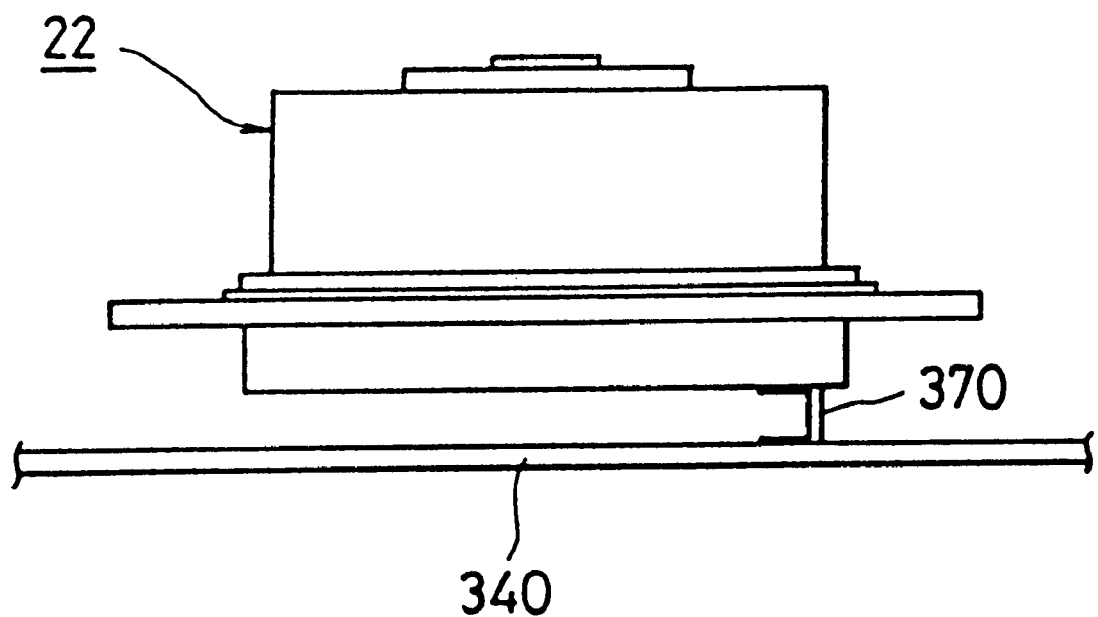
FIG. 40 is an explanatory diagram showing a connecting structure of a printed board of a spindle motor.

FIG. 40 shows a connecting structure of the spindle motor 22 that is used in the disk apparatus of the invention to a printed board 340. In the conventional disk apparatus, the spindle motor 22 is connected to the printed board 340 via a connector. Therefore, the number of parts is large and a structure of the apparatus is also complicated. In the invention, conductive pins 370 having a spring performance of the number as many as the number of connecting signal lines are provided in the lower portion of the spindle motor 22. By assembling the spindle motor 22 and printed board 340 to a base cover, the pins 370 are come into contact with the connection patterns of the printed board 340, thereby electrically connecting. The number of pins 370 provided in the lower portion of the spindle motor 22 and its arrangement will be obviously understood from a bottom view of the base plate 12 in FIG. 45, which will be explained hereinlater.

Figure 41:
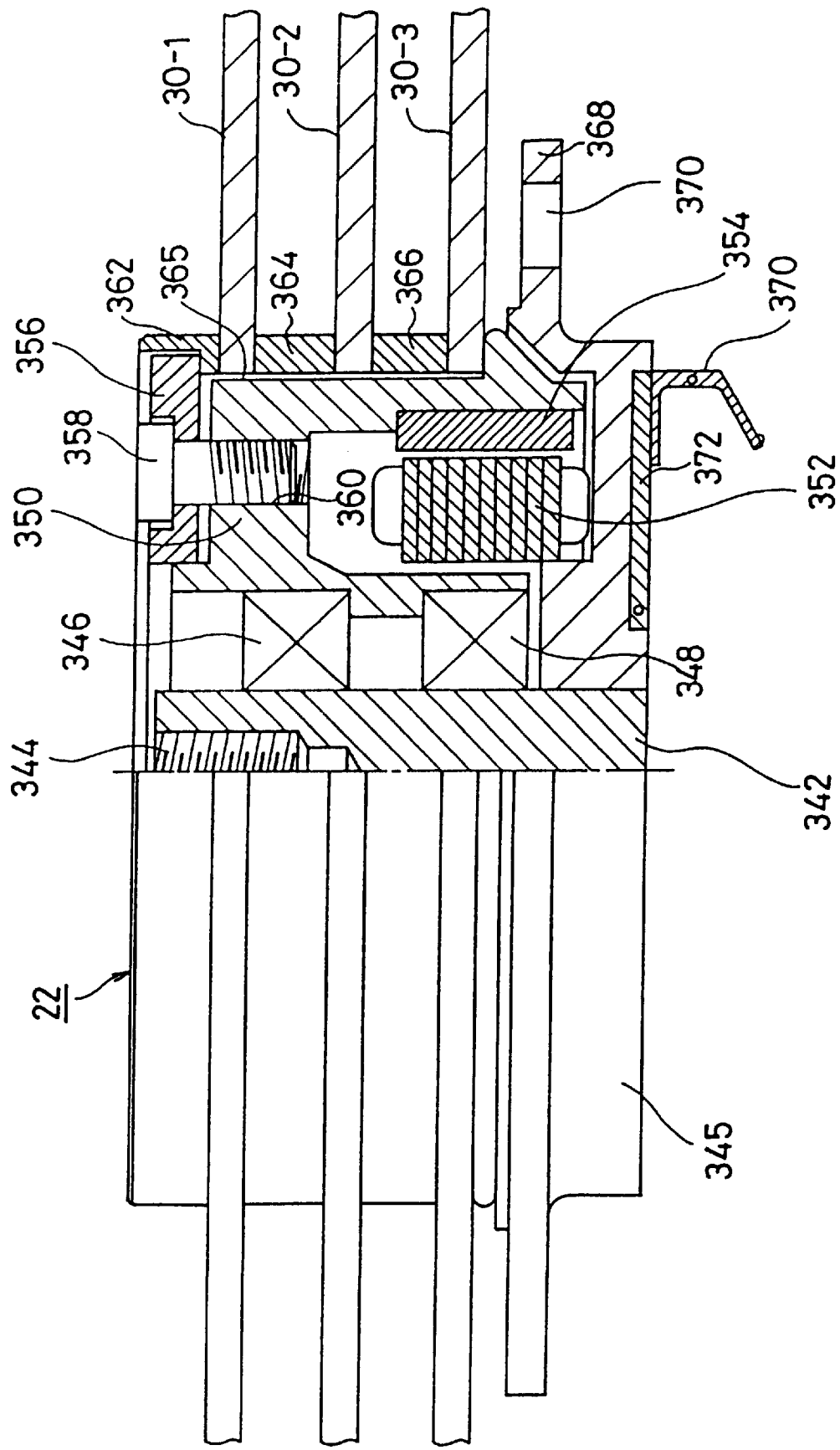
FIG. 41 is an explanatory diagram with a cross section of the spindle motor.

FIG. 41 shows an internal structure of the spindle motor of the invention with the half cut away. A fixed axis 342 is arranged at the center of the spindle motor 22. The fixed axis 342 is inserted with a pressure and is fixed into a motor base 345 arranged in the lower portion. The motor base 345 has a flange 368 for attaching. A screw hole 344 for screwing and fixing to the cover 10 side is formed in the upper portion of the fixed axis 342. A hub 350 made of stainless steel is rotatably provided around the outer periphery of the fixed axis 342 through two sets of bearings 346 and 348 with seals. Magnetic seals are used as bearings 346 and 348 with seals. That is, a magnetic fluid is interposed between the ring-shaped magnet member and the inside fixed axis 342. In the invention, a conductive magnetic fluid is used as a magnetic fluid that is used for the magnetic seal. By using the conductive magnetic fluid of the magnetic seal as mentioned above, the fixed axis 342 side is electrically connected to the hub 350 on the rotational side. The bias voltage which is supplied to the base plate attached with the spindle motor 22 via the actuator is supplied to each of the disks 30-1, 30-2, and 30-3 attached to the spindle motor 22, respectively. Thus, the disks 30-1, 30-2, and 30-3 can be held at the same potential as that of the head.

Stainless steel as a magnetic material has been used as a hub 350 of the spindle motor 22 of the invention. In the hub of the conventional disk apparatus, however, nonmagnetic aluminum is used from a viewpoint of the costs and the yoke forming the magnetic circuit is separately formed by a magnetic material such as iron or the like and is assembled to the hub. In the invention, since the portion in the disk is made small and thin, the miniaturization of the spindle motor 22 is also requested. Further, to improve a rotational speed, it is required to rotate the motor at a high speed. Therefore, in case of the conventional hub made of aluminum, an activation torque suitable for the small and thin size and the high rotational speed cannot be obtained. In the spindle motor 22 of the invention, therefore, the hub 350 is made of, for example, stainless steel of the iron system. Since it is a magnetic material, another yoke member is not additionally necessary. It is sufficient to merely attach a magnet 354. By forming the hub 350 by a magnetic material such as stainless steel or the like as mentioned above, the hub 350 itself has a function as a yoke and the installing space of the yoke which has conventionally been separately assembled becomes unnecessary, so that a large internal volume of the motor can be obtained. Thus, a stator core 352 which is fixed to the motor base 345 and is enclosed and the magnet 354 which is provided for the hub 350 on the rotating side can be enlarged. Even if the spindle motor 22 is made small and thin, an enough activation torque can be obtained.

The disks 30-1 to 30-3 are fixed to the outer periphery of the hub 350 of the spindle motor 22. Namely, the disk 30-3 is put into the lowest position, the next disk 30-2 is subsequently inserted through a spacer ring 366, and further the top disk 30-1 is inserted through a spacer ring 364. A clamp ring 362 is attached to the top portion. A clamp plate 356 provided on the inside is fastened to a screw hole 360 of the hub 350 by a screw 358, the clamp ring 362 is pressed, thereby fixing the disks 30-1 to 30-3.

In the spindle motor of the invention, with respect to the clamp of the disks 30-1 to 30-3, what is called a two piece clamp structure divided into the clamp ring 362 and clamp plate 356 is used. Hitherto, the clamp ring 362 and clamp plate 356 are an integral member and when they are fastened and fixed by the screw 358, the clamp portion on the disk side is curved due to a deformation and is not uniform and there is a possibility such that a deviation due to an aging change of the disk occurs. In the invention, therefore, by using the two piece clamp structure divided into the clamp ring 362 and clamp plate 356, in the case where the clamp plate 356 is pressed by the screw 358, the deformation of the clamp plate 356 is not propagated to the clamp ring 362. Even if the clamp plate 356 is deformed, a force in the vertical direction is merely applied to the clamp ring 362. Therefore, the disks 30-1 to 30-3 can be uniformly pressed by the clamp ring 362.

Although the hub 350 of the spindle motor 22 of the invention is made of stainless steel, the disks 30-1 to 30-3 which are fixed to the outer periphery of the hub 350 and the spacer rings 364 and 366 provided among them are made of the aluminum material. Therefore, coefficients of linear expansion of the disks 30-1 to 30-3 and spacer rings 364 and 366 for a thermal change differ from that of the hub 350. Therefore, a gap 365 to prevent a mutual interference by a difference of the coefficients of linear expansion is formed between the outer periphery of the hub 350 and the disks 30-1 to 30-3 which were laminated through the spacer rings 364 and 366. Therefore, even if the coefficients of linear expansion differ, since the gap 365 exists, a deviation of the disks 30-1 to 30-3 can be certainly prevented.

Figure 42:
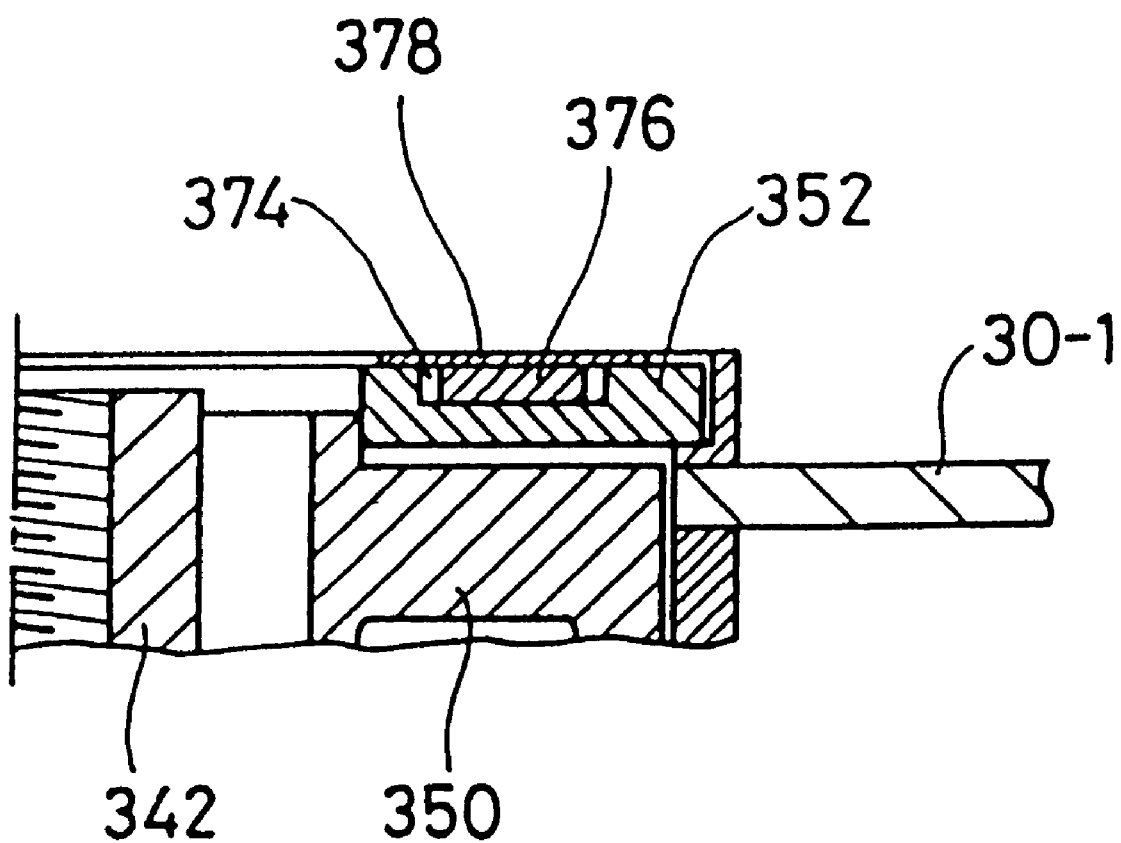
FIG. 42 is an explanatory diagram showing a balance adjustment of the spindle motor.

Further, after the disks 30-1 to 30-3 were assembled to the spindle motor 22, an adjustment to keep a rotational balance is performed. Hitherto, a weight for balance adjustment is fixed to the upper portion of the clamp plate 356 by an adhesive agent. On the other hand, according to the invention, as shown in FIG. 1, in addition to three screw holes, uniform balance adjusting holes 374 are further formed at nine positions in the upper portion of the clamp plate 356. For example, as shown in FIG. 42, a weight 376 for adjustment is fixed by an adhesive agent into the balance adjusting hole 374 which needs the adjustment. An upper portion of the weight is sealed by a seal 378. Thus, the weight for balance adjustment can be easily and certainly set to the clamp plate 356.

Base and Cover

In the disk apparatus of the invention, since the MR head is used as a read head, the bias voltage is applied to prevent a destruction of the MR head due to an inflow of a current larger than the read current. Thus, the base and cover which construct the apparatus casing have potentials. The disk apparatus of the invention is assembled and fixed as an external memory apparatus of another system unit of a notebook type computer or the like. Therefore, if the base and cover have potentials, there is a possibility such that a short-circuit occurs between the base and cover and the assembled unit on the system side. In the disk apparatus of the invention, therefore, an insulating structure is provided for the assembling structure of the unit on the system side.

Figure 43:
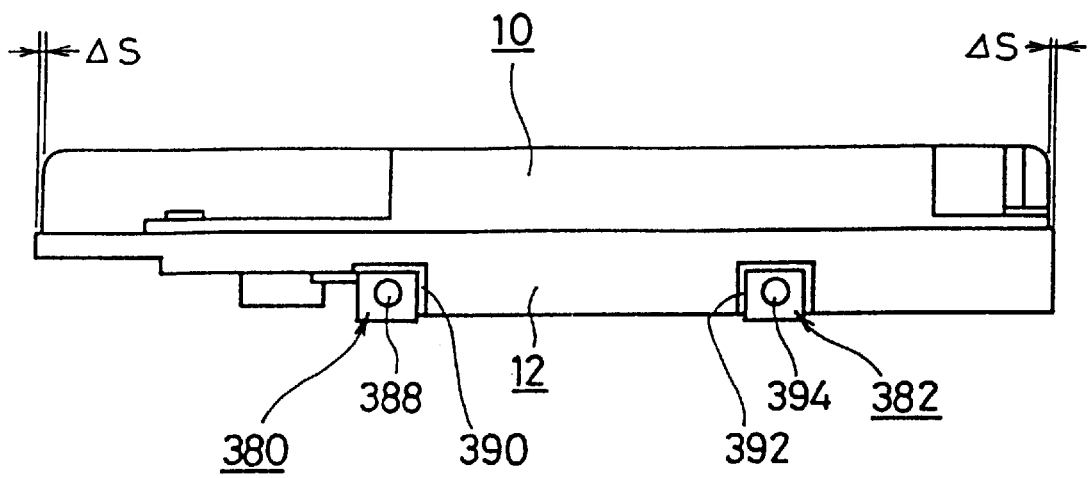
FIG. 43 is a front view of the disk apparatus.
Figure 44:
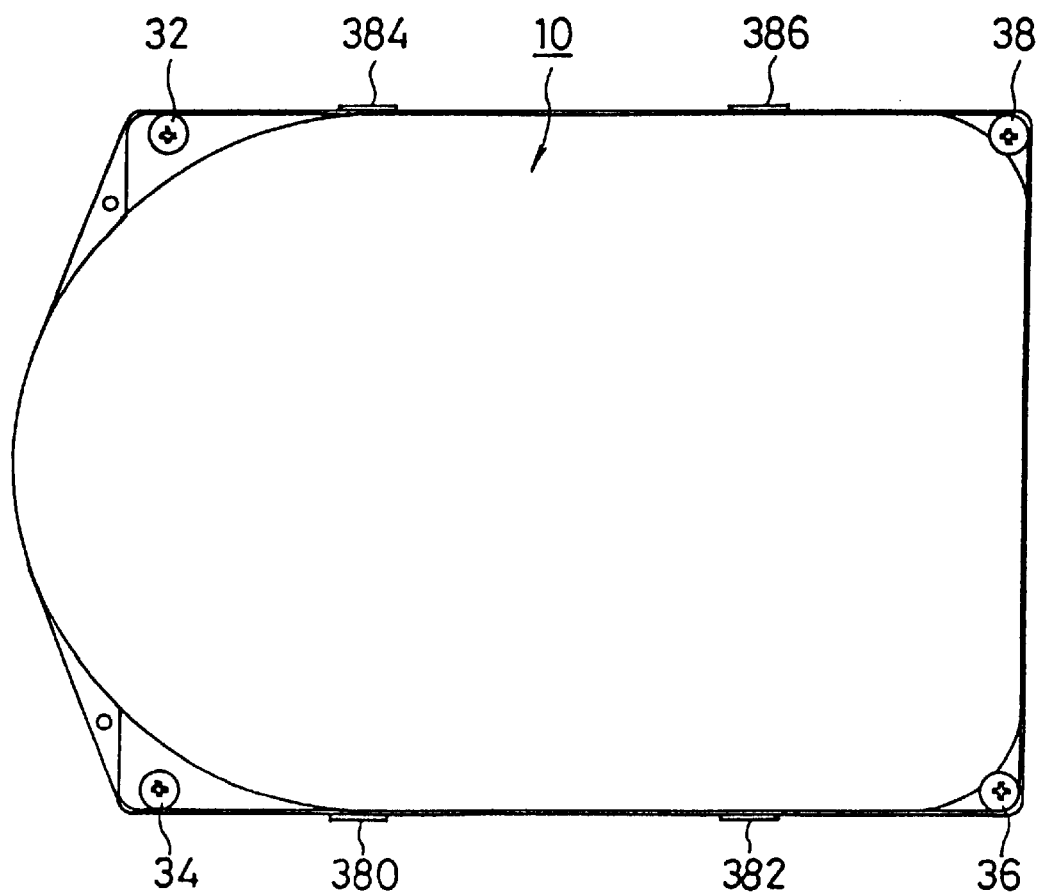
FIG. 44 is a plan view of the disk apparatus.
Figure 45:
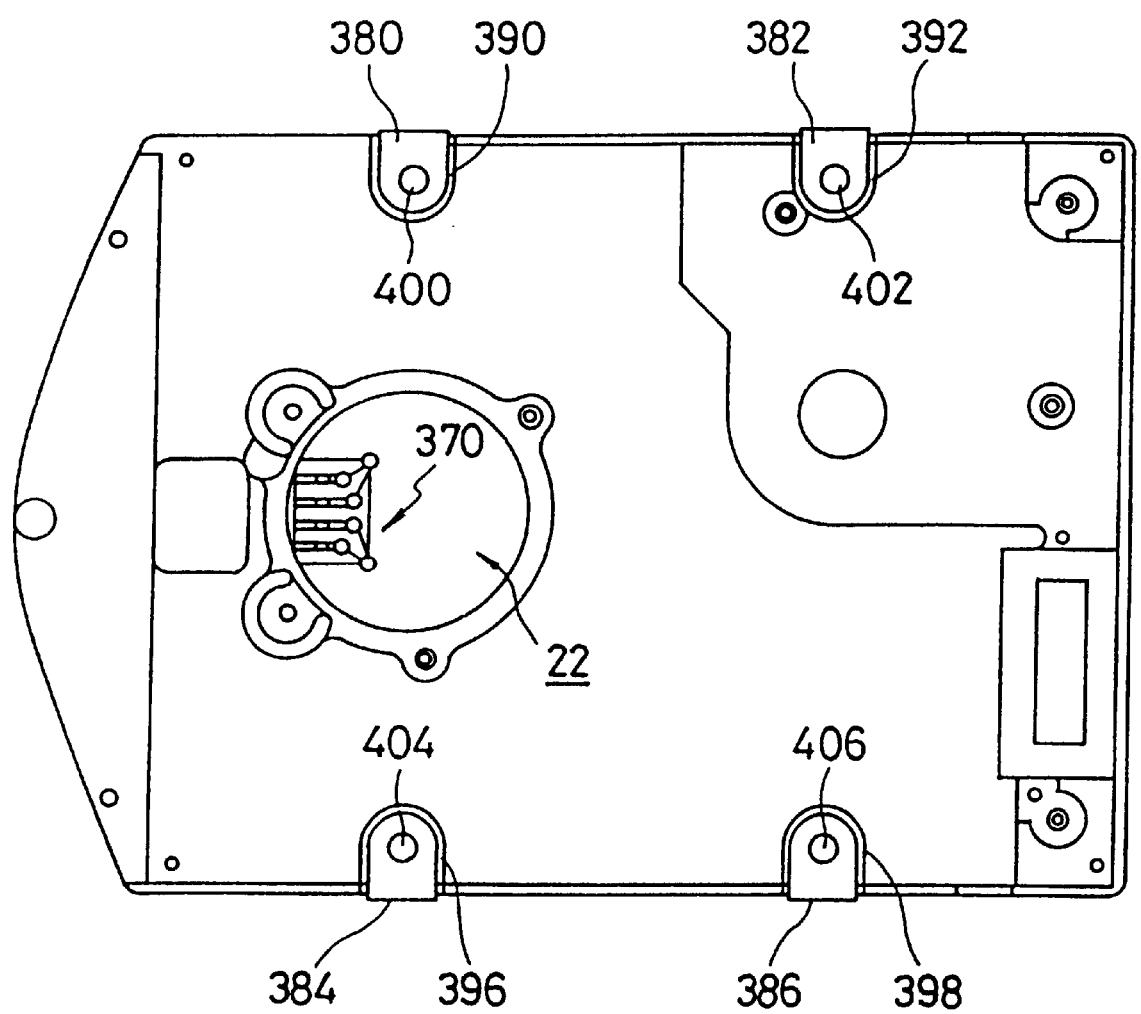
FIG. 45 is a bottom view of the disk apparatus.

FIG. 43 is an external view of the disk apparatus of the invention. FIG. 44 is a plan view. FIG. 45 is a bottom view.

In FIG. 43, the apparatus casing has a two-split structure of the cover 10 and base plate 12. Since the base plate 12 side is attached to the system side unit, attaching blocks 380 and 382 are provided in the bottom portion of the base plate 12. As will be also obviously understood from FIG. 45, attaching blocks 384 and 386 are also provided on the opposite side.

Attaching blocks 380, 382, 384, and 386 have an insulating structure such that rubber linings 390, 392, 396, and 398 are provided between those attaching blocks and the base plate 12, respectively. The attaching blocks 380, 382, 384, and 386 are made of aluminum blocks and attaching holes are formed in the side and lower surfaces, respectively. For instance, as shown in FIG. 43, attaching screw holes 388 and 394 are formed in the side surfaces of the attaching blocks 380 and 382. As shown in FIG. 45, attaching screw holes 400, 402, 404, and 406 are formed in the lower surfaces of the attaching blocks 380, 382, 384, and 386, respectively.

Figure 46:
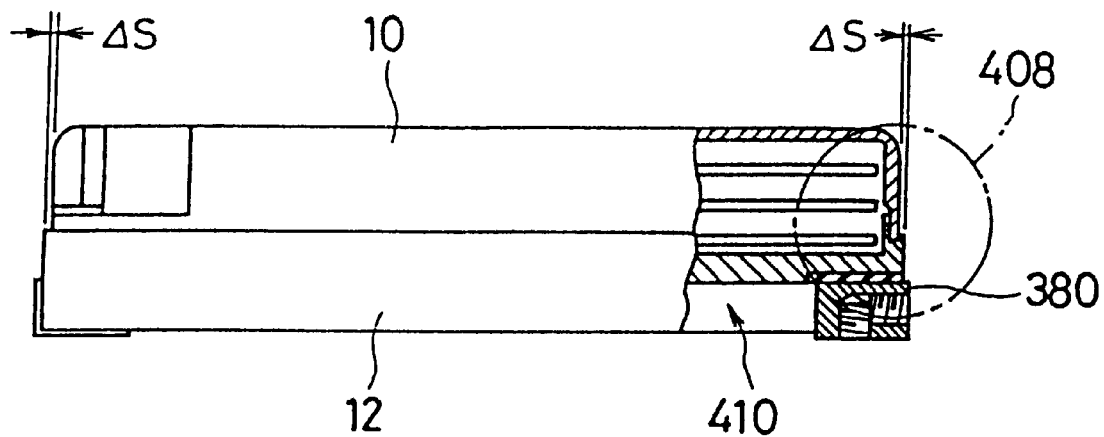
FIG. 46 is a rear view of the disk apparatus.
Figure 47:
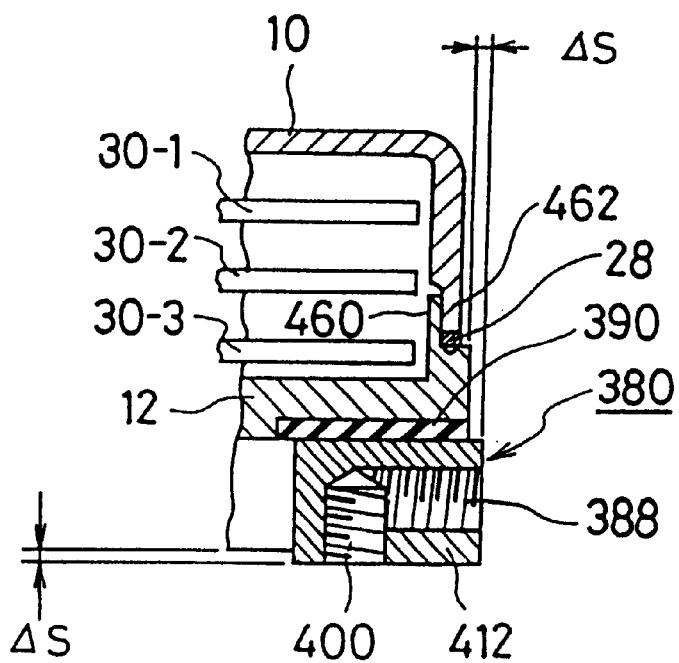
FIG. 47 is a partial enlarged diagram of FIG. 46.

FIG. 46 is a right side elevational view with a part cut away of FIG. 43. FIG. 47 is an enlarged diagram of a portion 408 in FIG. 46. As will be obviously understood from FIG. 47, for example, the attaching block 380 is attached to the base plate 12 through the rubber lining 390, thereby insulating from the base plate 12. The screw hole 388 is formed from the side in the attaching block 380. The screw hole 400 is also provided from the lower side. The attaching block main body is constructed by an aluminum block 412.

Figure 48:
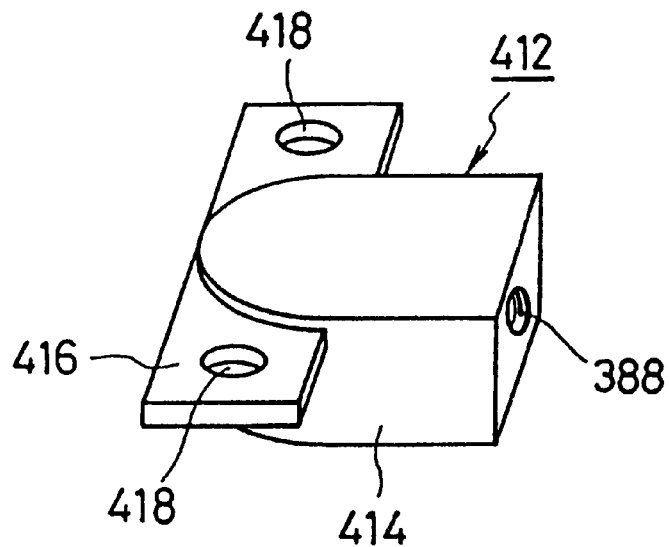
FIG. 48 is an explanatory diagram of an attaching block in FIG. 46.

FIG. 48 shows the aluminum block 412 in FIG. 47. In the aluminum block 412, a semicylindrical rear portion is integrally constructed behind a rectangular main body 414 on the screw hole 388 side. An attaching member 416 which is opened to both sides is provided in the upper portion of the aluminum block. A pair of through holes 418 are formed in the attaching member 416. The rubber lining 390 is arranged so as to cover the upper portion including the attaching member 416 of the aluminum block 412. Further, the lining process is also performed to the side surface of the main body 414 as necessary. The lining can be executed to the block attaching portion on the base plate 12 side or can be also performed to the aluminum block 412.

Figure 49:
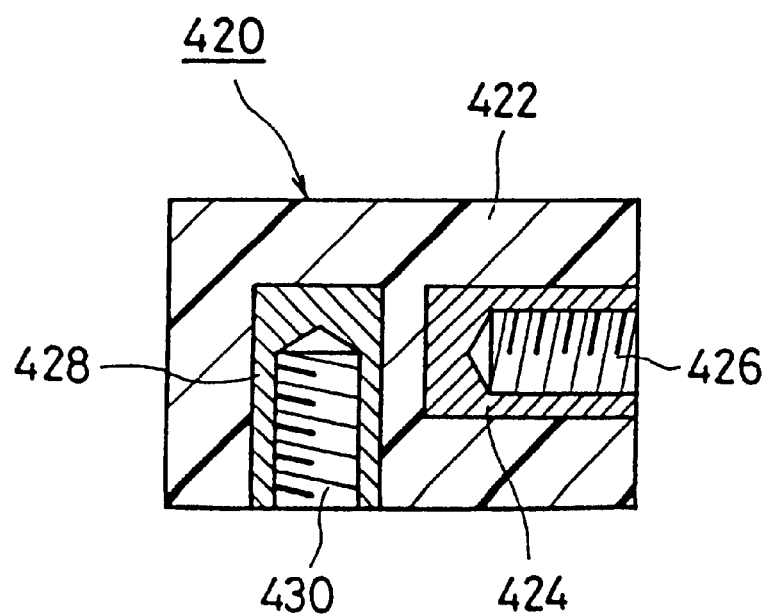
FIG. 49 is a cross sectional view of another embodiment of the attaching block.

FIG. 49 shows another attaching block 420 which is used in the invention. In the attaching block 420, embedding metal fittings 424 and 428 having screw holes 426 and 430 are integrally molded in a resin main body 422. Since the resin main body 422 is used, the attaching block 420 itself has an insulating performance, so that the rubber lining is unnecessary.

In addition to the insulating structure of the attaching block for the system side unit, the disk apparatus of the invention further has a structure such that the attaching surface of the attaching block is slightly projected from the base plate 12. Namely, as shown in FIG. 47, the side attaching portion and the lower attaching portion of the attaching block 380 are projected from the side and bottom surfaces of the base plate 12 by only ΔS, respectively. By such a projection of the attaching block 380, when the block is attached to the system side unit, a gap of AS is certainly held between the block and the base plate 12. A contact with the system side unit is prevented, thereby assuring an insulation. In addition to it, an electro deposition is performed to each of the base plate 12 and cover 10 in order to form an insulating coating, respectively.

For the base plate 12 that is attached to the system side unit having an insulating structure, as shown in FIGS. 43 and 46, the size of cover 10 is decided so that a termination is located on the inside by only AS than a termination of the base plate 12. By setting the outer shape of the cover 10 side to be smaller than that of the base plate 12, it is possible to certainly prevent a short-circuit such that the cover 10 is projected from the base plate 12 and is come into contact with the system unit.

Further, as shown in an enlarged cross sectional view of FIG. 47, the cover 10 is fitted to the base plate 12 through the packing 28. However, a wall is formed in such a fitting portion in a manner such that a base side edge portion 460 and a cover side edge portion 462 are overlapped. Owing to such an overlapped wall structure in the fitting portion of the cover 10 and base plate 12, even if the packing 28 is provided, no gap is formed between them and a shielding structure to certainly block that the external noises enter the inside is realized.

According to the invention, further, a space portion on the lower side of the base plate 12 forms a circuit enclosing portion 410 in the assembling state of FIG. 2. The printed board on which the drive controller 1012 in FIG. 4 was installed is built in the circuit enclosing portion 410. A dip switch to set parameters which are peculiar to the disk apparatus is installed on the printed board that is built in the circuit enclosing section 410 in the lower portion of the base plate 12. Ordinarily, since the dip switch is put on the printed board, the circuit unit becomes thick by only an amount corresponding to such a dip switch. To avoid such a situation, according to the disk apparatus of the invention, as shown in FIG. 50, the dip switch having a structure such that it is embedded into the printed board is installed, thereby making the circuit unit thin.

Figure 50:
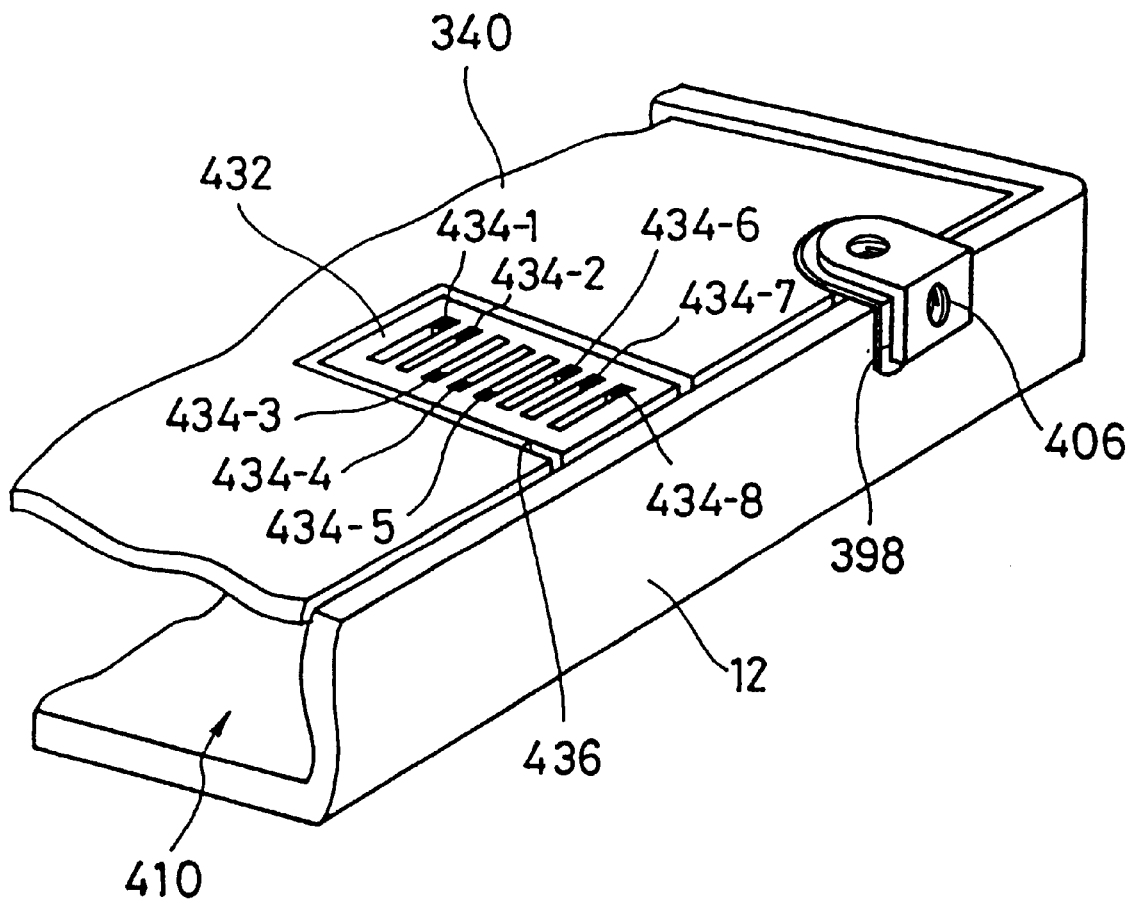
FIG. 50 is an explanatory diagram of a circuit installation by embedding a dip switch.
Figure 51:
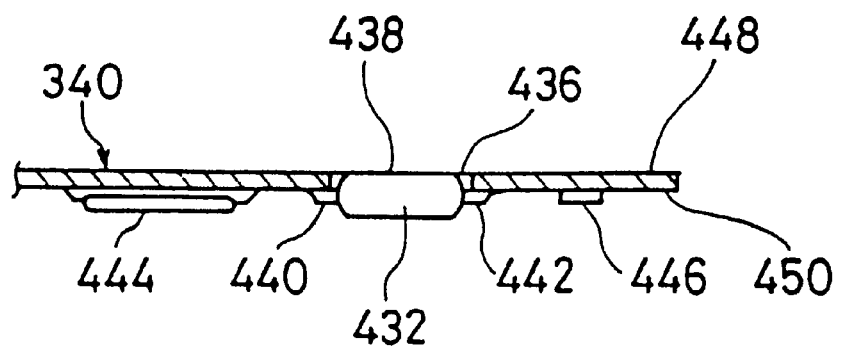
FIG. 51 is a cross sectional view of a printed board in FIG. 50.

In FIG. 50, the printed board 340 is built in the circuit enclosing section 410 on the rear side of the base plate 12. For the printed board 340, a dip switch 432 with a structure in which a switch knob is provided on the rear side is built in a notch 436. FIG. 51 shows a portion of the printed board 340 in which the dip switch 432 is built. The lower side of the printed board 340 in the state shown in the diagram is set to a parts installation surface. A circuit pattern is formed on the parts installation surface. Parts 444 and 446 are installed on the surface of the circuit pattern. The notch 436 is formed at the installing position of the dip switch 432. Lead terminals 440 and 442 are led out from the side surface of the dip switch 432 and can be installed to the surface in a manner similar to the other parts 444 and 446. In the surface installation state of the lead terminals 440 and 442 of the dip switch 432, the surface locating in the upper portion on the opposite side becomes a switch surface 438. As shown in FIG. 50, for example, eight slide grooves are formed on the switch surface 438. Switch knobs 434-1 to 434-8 are provided in the slide grooves. An internal switch structure itself is the same as that of the conventional dip switch. It is desirable that the switch surface 438 is depressed to the inside so as to slightly project the switch knobs 434-1 to 434-8. With such an installing structure of the dip switch 432, the height of dip switch 432 can be reduced by only a thickness of printed board 340, so that the circuit unit installed to the printed board 340 can be made thin. Since the switch knobs 434-1 to 434-8 of the dip switch 432 are opened to the bottom surface side, the setting operation of the dip switch which is executed at the time of the shipping or adjustment from/in the factory can be also extremely easily performed.

Although the embodiments of FIGS. 1 to 51 have been described with respect to the disk apparatus using the disk medium of the 2.5 inch size as an example, the invention is not limited to such an apparatus. The invention can be also applied as it is to a small disk apparatus using a disk medium of a proper size. The invention is not limited by the numerical values shown in the embodiment.

Servo Frame

Figure 52:
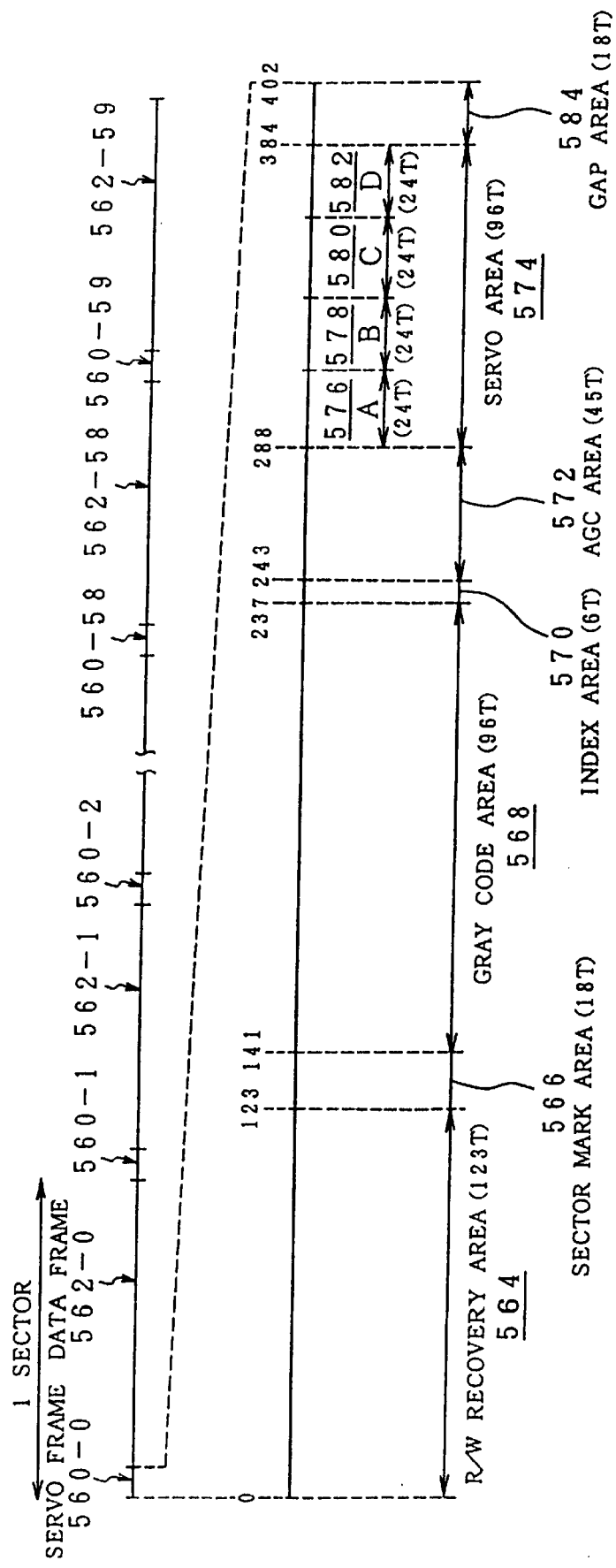
FIG. 52 is an explanatory diagram of a format of a servo frame of the invention.

FIG. 52 shows a format of one cylinder in the disk medium of the invention. A recording area of one cylinder which is shown by extending on a straight line is divided into, for example, sixty sectors. Servo frames 560-0 to 560-59 are provided at the head of each sector and data frames 562-0 to 562-59 are subsequently provided. A length of one cylinder divided into 60 sectors is fixedly defined by a predetermined number of clocks by using a reference clock and is set to, for instance, 216000T.

As enlargedly shown on the lower side, the servo frame 560-0 comprises: an R/W recovery area 564; a sector mark area 566; a gray code area 568; an index area 570; an AGC area 572; a servo area 574; and a gap area (pad area) 584. A length of each area can be expressed by using a reference clock period (T). Namely, the R/W recovery area 564 has a length of 123T. The sector mark area 566 has a length of 18T. They are sufficiently shorter than the case of 54T in the conventional format.

The index area 570 is set to a length of 6T. An index pattern is recorded with respect to only the head servo frame 560-0 among the servo frames 560-0 to 560-59. The AGC area 572 has a length of 45T. The servo area 574 has a length of 96T. In the sector servo of the invention, for example, since a 2-phase servo system is used, the servo area 574 is divided into a first field 576, a second field 578, a third field 580, and a fourth field 582 each having a length of 24T and servo patterns are recorded in those fields. The last gap area 584 has a length of 18T. Therefore, it is sufficient that the servo frame 560-0 has a length of 402T and a recording length can be remarkably reduced as compared with the conventional one. Such a reduction of the recording length is realized because not only the peak but also the polarity is detected from a read signal, which will be obviously explained hereinlater. The other remaining servo frames 560-1 to 560-59 also have a construction similar to that mentioned above except that the magnetic recording is executed to the index area 570.

Figure 53:
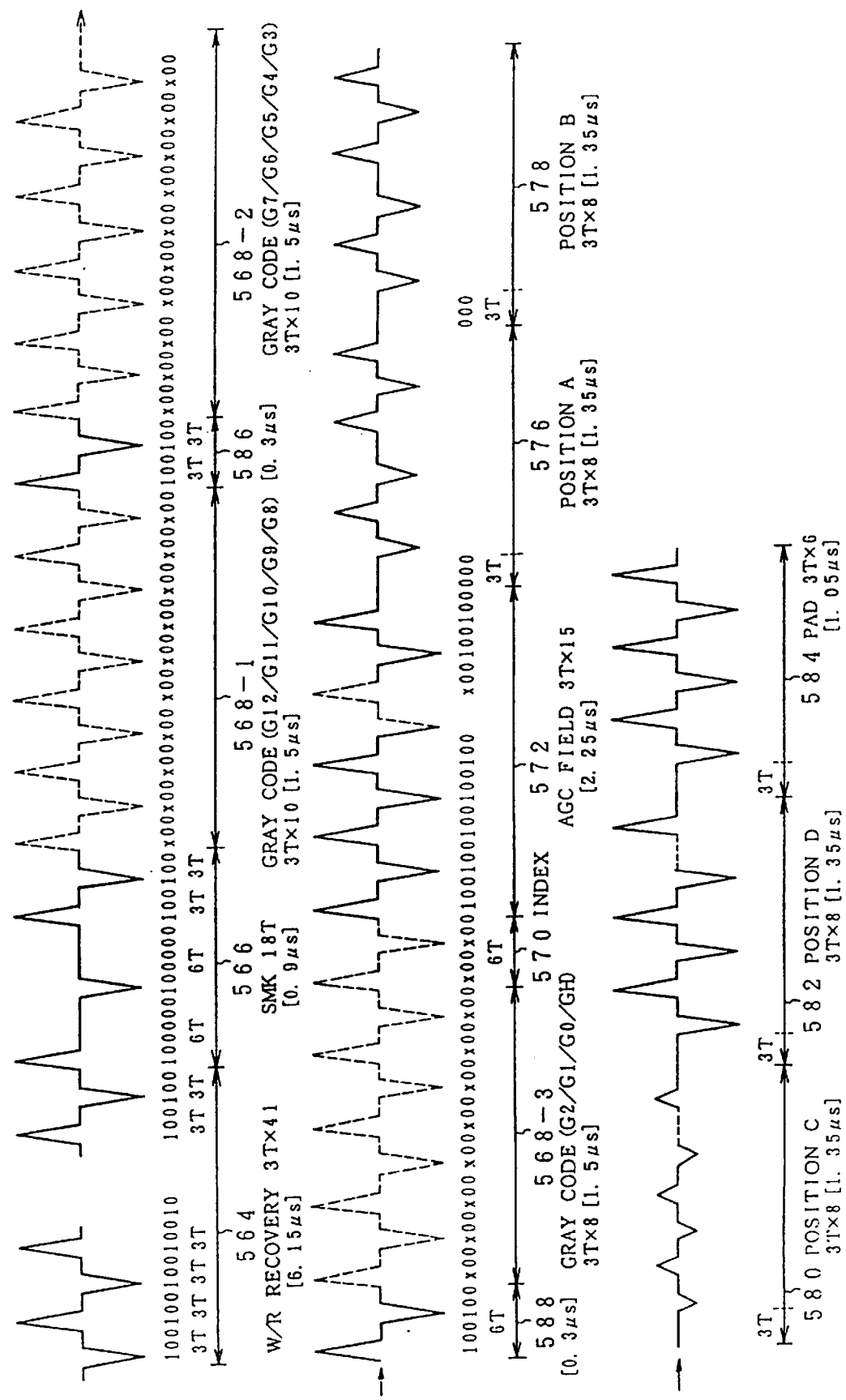
FIG. 53 is an explanatory diagram of a read signal of the servo frame in FIG. 52.

FIG. 53 shows the read signal of the servo frame 560-0 shown in FIG. 52. The magnetic recording of the N pole and the magnetic recording of the S pole are alternately executed at an interval of 3T in the head R/W recovery area 564. Thus, as for the read signal, the read signal of the N pole becomes the read signal having the polarity of the minus side and the read signal of the N pole becomes the read signal having the polarity of the plus side. Namely, with respect to the R/W recovery area 564, 41 magnetic recording operations are executed on a 3T unit basis. In the magnetic recording of the next sector mark area 566, a pattern of "N, S, N, S" is magnetically recorded by 6T, 6T, 3T, and 3T. Now, assuming that a frequency of reference clock is set to 20 MHz, a clock period (T)=0.05 μsec, so that a time of the sector mark area 566 of 18T is equal to 0.9 μsec.

In the embodiment, the next gray code area 568 is divided into three fields of a first field 568-1, a second field 568-2, and a third field 568-3. In the embodiment, the gray code is constructed by 14 bits in which a half bit GH is added to code bits G12 to G0. The gray code of one bit, for example, the gray code G12 is recorded by 6T. Therefore, in case of a gray code Gn of one bit, "100100" is recorded for 6T. It will be obviously understood that in case of the bit 0, "000000" is magnetically recorded. Five gray codes G12 to G8 are recorded in the first field 568-1 of the gray code area. A dummy field 586 having a length of 6T in which a pseudo gray code "100100" corresponding to the bit 1 has been recorded is provided between the first field 568-1 and the second field 568-2. The dummy field 586 has a function for forcedly executing a preset synchronization when the bit 0 continues for a status counter that is used in a gray code detecting circuit, which will be obviously described hereinlater. Similarly, five gray codes G7 to G3 are recorded in the second field 568-2 of the gray code area at an interval of 6T. Subsequently, remaining four gray codes G2 to GH are recorded in the third field 568-3 through a dummy area 588 in which a dummy code has been recorded.

The index area 570 has a length of 6T. As shown in FIG. 52, a pattern of "100100" is recorded by 6T with regard to only the servo frame 560-0 of the head sector. A pattern of "000000" is recorded with respect to the sectors other than the head sector. The next AGC area 572 relates to a pattern which is used to decide a reference level of the AGC amplifier 1042 shown in the drive controller 1012. Patterns each of which is "100" are recorded on a 3T unit basis, thereby obtaining amplitude information. The servo area follows. The servo area is divided into the first field 576, second field 578, third field 580, and fourth field 582. The magnetic recording of "100" for 3T are repeated every eight recordings. The pattern of the servo area is also the magnetic recording to obtain amplitude information. The gap area 584 is finally provided and six patterns of "100" are recorded every 3T as a pad pattern which gives a gap between the gap area 584 and the subsequent data frame.

Figure 54:
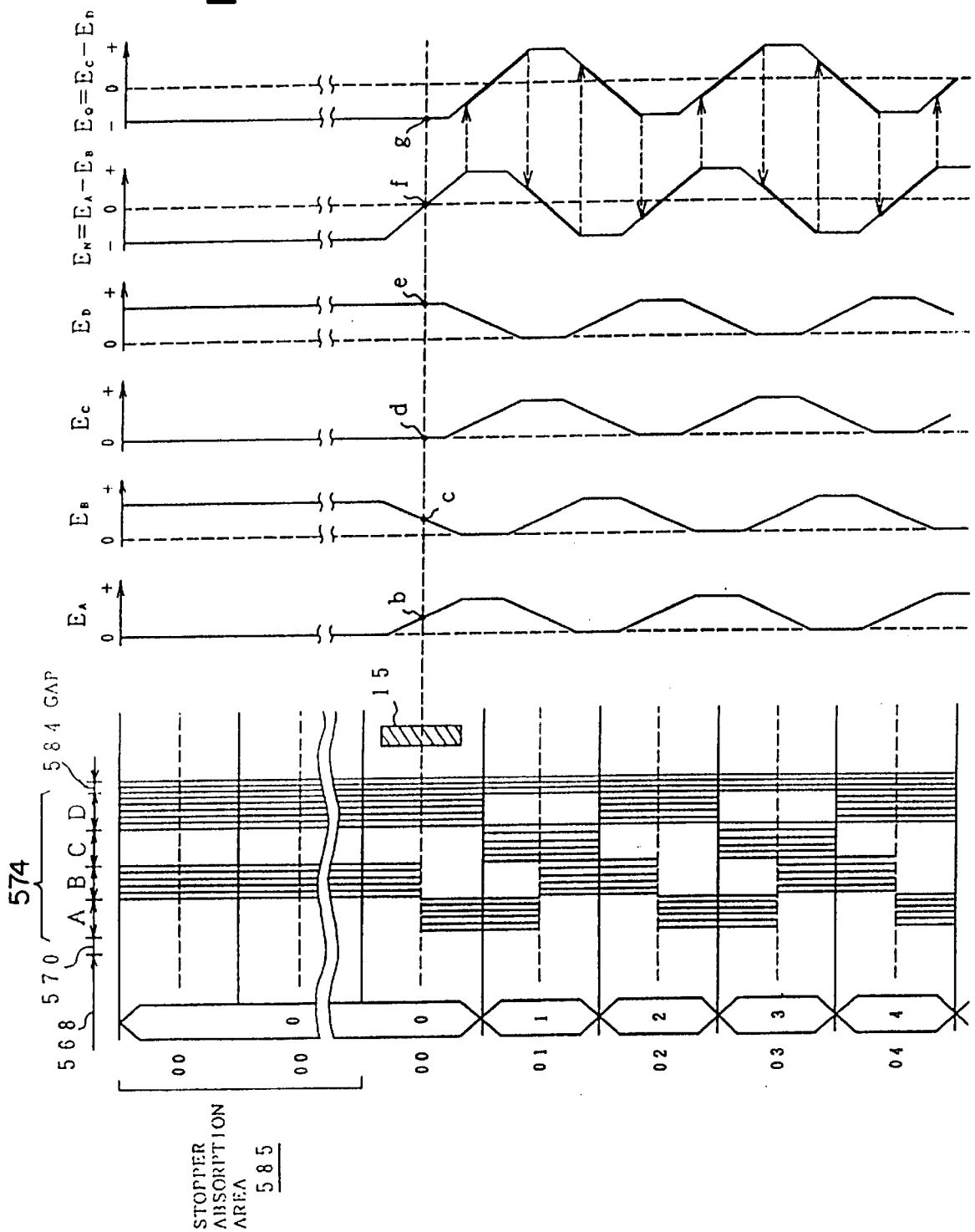
FIG. 54 is an explanatory diagram of a recording state of a servo area in FIG. 52 and a detection of a head position signal.

FIG. 54 shows a recording state of servo information in the servo area 574 in FIGS. 52 and 53 and the production of a position detection signal based on a read signal. Physical cylinders shown by extracting a plurality of servo frames on the innermost side of the disk medium in the radial direction increase such as 00, 01, 02, 03, . . . from the inner side as the position approaches the outer side. A predetermined number of cylinders on the inner side are allocated to a stop absorption area 585. All of physical cylinder addresses are equal to 0. The next physical cylinder address 00 of the stop absorption area 585 becomes the inherent head cylinder address.

The servo area 574 subsequent to the gray code area 568 and AGC area 570 is divided into first to fourth fields shown by A, B, C, and D and the gap area 584 is finally provided. The servo information is divided into the first and second fields A and B and the third and fourth fields C and D. The first field A and the second field B are alternately recorded on a cylinder unit basis of each track boundary shown by a broken line. On the other hand, the third and fourth fields C and D are also similarly alternately recorded around the track center shown by a solid line as a boundary. Further, a deviation of 0.5 cylinder in the disk radial direction exists between the first field A and the third field C. Likewise, a positional deviation of 0.5 cylinder in the radial direction also exists between the second field B and the fourth field D. For example, as shown in the diagram, the read head 15 is on-track controlled around the track shown by a broken line of cylinder address 00 as a center.

Read signals $E_A$ to $E_D$ which are obtained from the read head 15 in a state in which the read head was on-track controlled to cylinder address 00 are set to voltages shown at points b to e, respectively. Those voltages can be obtained by holding the peaks of the read signals of the read head 15. A head position signal which is obtained from the read signals of the first field A and second field B is set to $E_N$. A head position signal which is obtained from the third and fourth fields C and D is set to $E_Q$. The head position signal $E_N$ is obtained by subtracting the read signal $E_B$ of the second field B from the read signal $E_A$ of the first field A. The head position signal $E_Q$ is obtained by subtracting the detection signal $E_D$ of the fourth field D from the detection signal $E_C$ of the third field C. In a state in which the read head 15 was on-track controlled to cylinder address 00 as shown in the diagram, the detection signals $E_A$ and $E_B$ of the first and second fields A and B are obtained as shown in points b and c. On the other hand, the detection signals $E_C$ and $E_D$ of the third and fourth fields C and D are set to predetermined levels as shown in points d and e. For the movement in the radial direction (upper/lower direction in the diagram) of the read head around the track center of cylinder address 00 as a center, only the detection signals $E_A$ and $E_B$ of the first and second fields A and B change and the head position signal $E_N$ changes. On the other hand, the detection signals $E_C$ and $E_D$ of the third and fourth fields C and D are constant and the head position signal $E_Q$ is also constant.

Therefore, the head detection signal $E_N$ is used in a range of the head width of the read head 15 around cylinder address 00 as a center. When the read head 15 enters, for instance, the boundary of cylinder addresses 00 and 01, on the other hand, the head position detection signal $E_Q$ based on the third and fourth fields C and D is made valid. By switching and using the two head position signals $E_N$ and $E_Q$ in accordance with the position of the read head 15, a head position detection signal without a dead zone which changes in accordance with the head position can be obtained for the movement of the read head 15. The above operations relate to the recording of the patterns and the detection of the head position according to the two-phase servo system. The servo information of the invention is not limited to the 2-phase servo but a proper recording format of the servo information can be obtained.

Detection of Sector Mark

Figure 55:
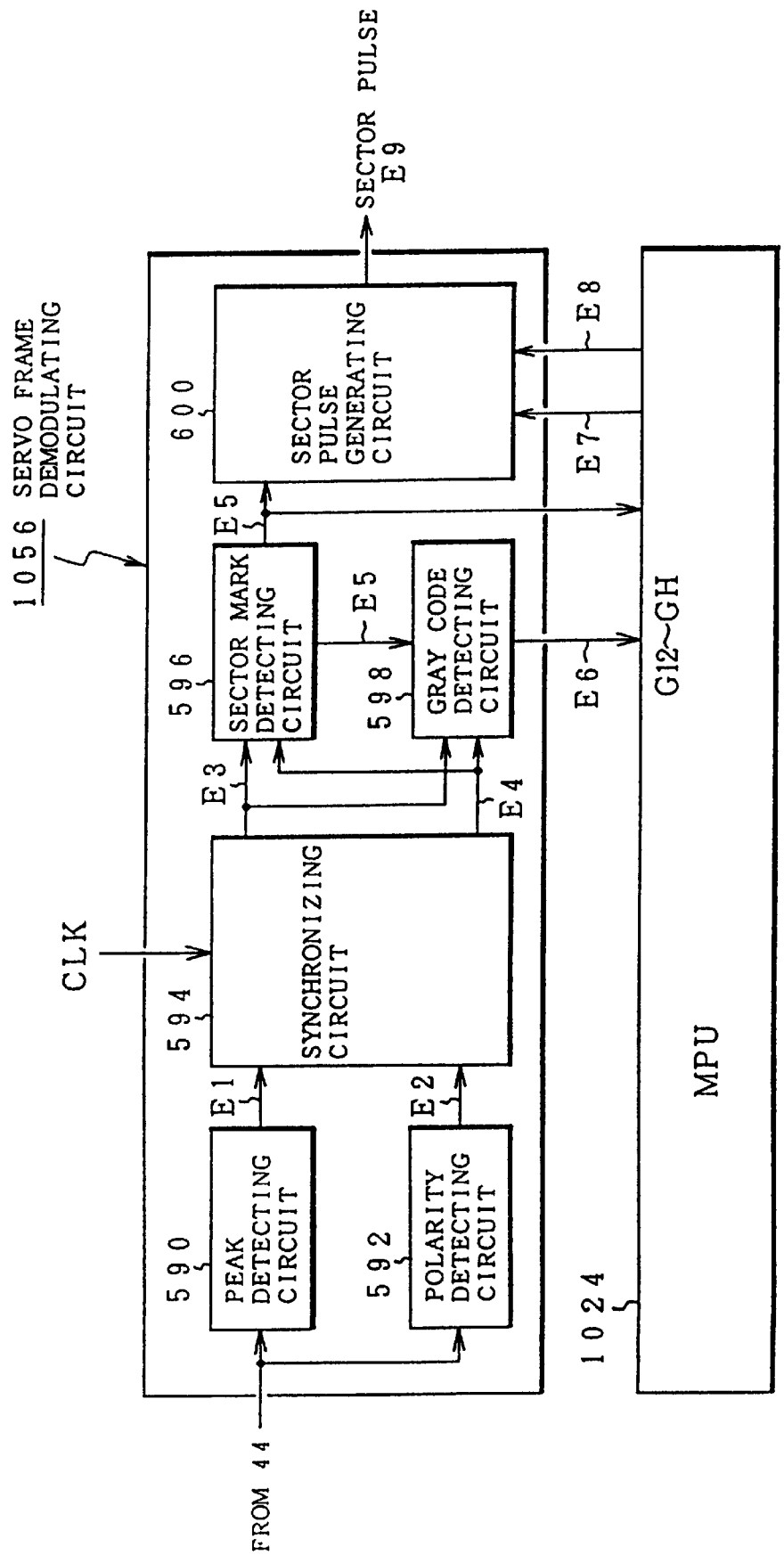
FIG. 55 is a block diagram of an embodiment of a servo frame demodulating circuit in FIG. 4.

FIG. 55 shows an embodiment of the servo frame demodulating circuit 1056 provided for the drive controller 1012 in FIG. 4. A peak detecting circuit 590 and a polarity detecting circuit 592 are provided for the servo frame demodulating circuit 1056. The read signal from equalizing circuit 1044 in FIG. 4 is inputted to the peak detecting circuit 590 and polarity detecting circuit 592. The peak detecting circuit 590 detects a peak timing of a read waveform of a servo frame as shown in FIG. 55, thereby detecting a peak detection pulse E1. The polarity detecting circuit 592 detects the polarity of the read signal in FIG. 55 and generates a polarity signal E2. The polarity signal E2 is a pulse signal that is set to the logical level 1 for the plus polarity and to the logical level 0 for the minus polarity. A synchronizing circuit 594 performs a synchronization with respect to each of the peak detection pulse E1 and the polarity signal E2 by using a reference clock CLK obtained from the VFO circuit (or oscillator) 1048 in FIG. 4. A peak detection pulse E3 which has already been synchronized is sent to a sector mark detecting circuit 596 and a detecting process of a sector mark is executed. At the same time, a polarity signal E4 which has already been synchronized is sent to a gray code detecting circuit 598 and gray code detecting process for demodulating a bit string of the cylinder address from the gray code is executed. A sector mark detection signal E5 of the sector mark detecting circuit 596 is sent to the gray code detecting circuit 598 and informs a start timing of the servo frame. Similarly, the sector mark detection signal E5 is also supplied to the MPU 1024. The MPU 1024 resets a counter that is used to manage each area of the servo frame and starts to count the number of reference clocks and checks a count value of the counter, thereby enabling each area of the servo frame shown in FIG. 52 to be recognized. Further, the sector mark detection signal E5 is supplied to a sector pulse generating circuit 600, from which a sector pulse E9 is generated at an arbitrary timing while setting a detection time point of the sector mark to a reference. The gray code detecting circuit 598 generates a gray code detection signal E6 indicative of the gray codes G12 to GH as a detection result to the MPU 1024. A time set signal E7 to decide a generation timing of the sector pulse for a built-in control register and a selection signal E8 to select either one of a plurality of set times are inputted to the sector pulse generating circuit 600.

Figure 56:
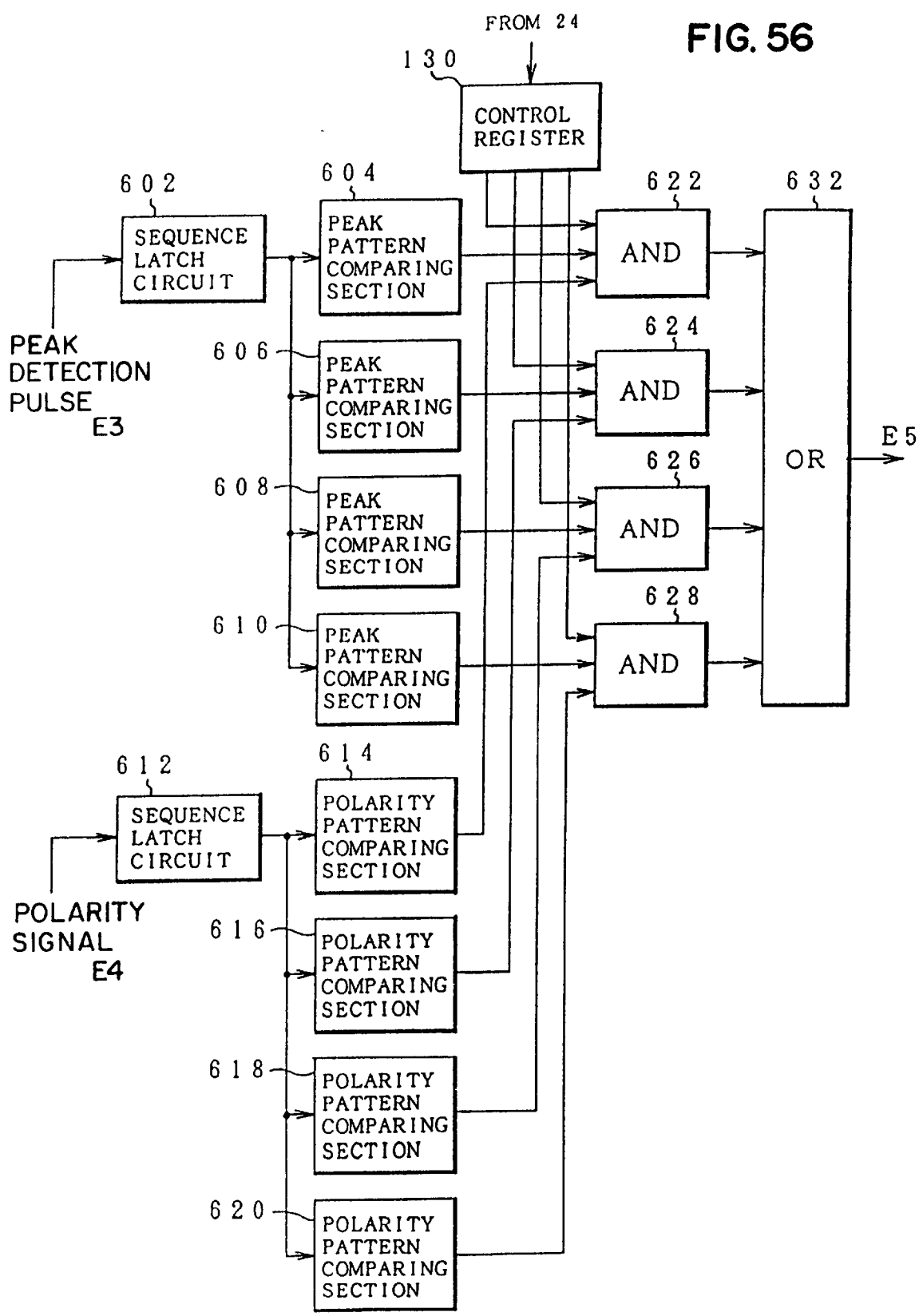
FIG. 56 is a block diagram of an embodiment of a sector mark detecting circuit in FIG. 55.

FIG. 56 shows an embodiment of the sector mark detecting circuit 596 in FIG. 55. The peak detection pulse E3 is supplied to a sequence latch circuit 602, by which pulse sequences as time sequences of the peak detection pulse E3 for a sector mark reading period of time of 18T are latched.

Figure 57:
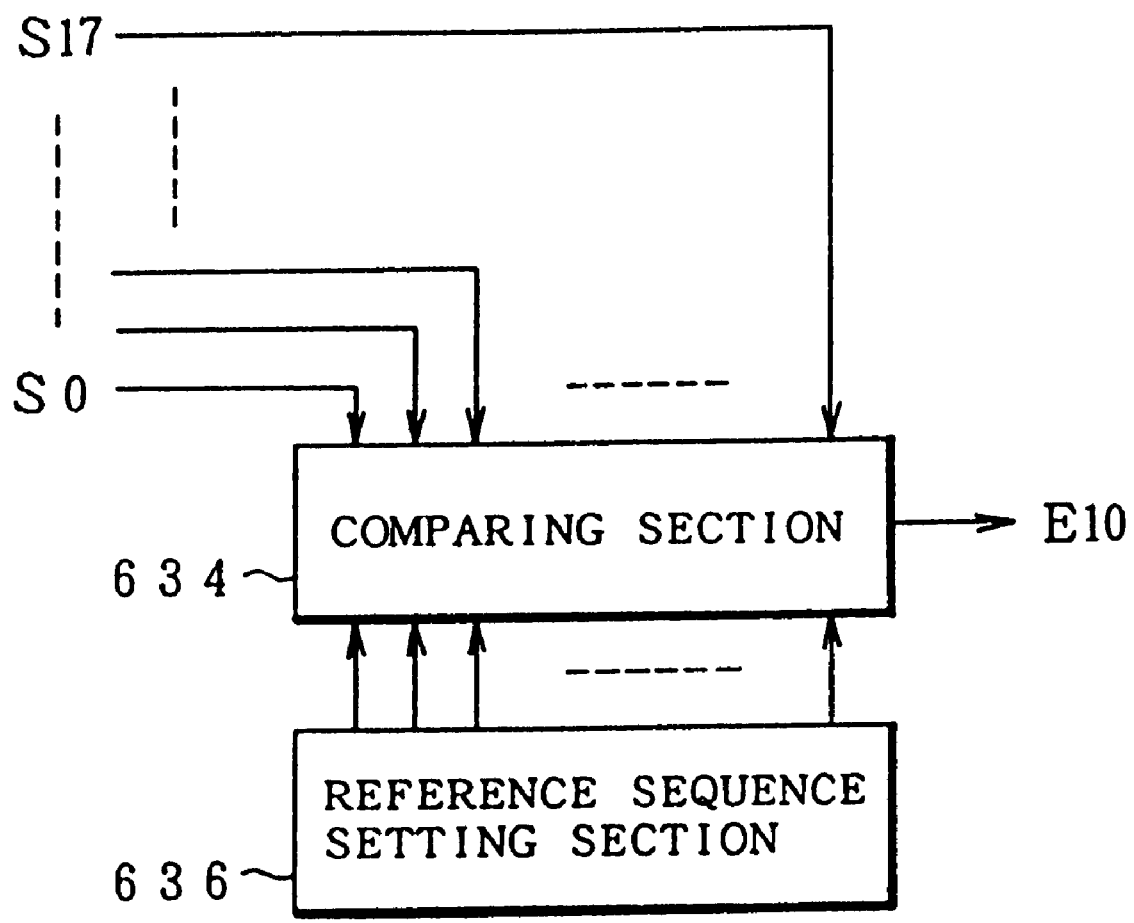
FIG. 57 is a block diagram of an embodiment of a peak pattern comparing section in FIG. 56.

FIG. 57 shows the details of a peak pattern comparing section 604 in FIG. 56. The peak pattern comparing section 604 is constructed by a comparing section 634 and a reference sequence setting section 636. The pulse sequences S0 to S17 latched for 18T by the sequence latch circuit 602 at the front stage are inputted in parallel to the comparing section 634. A reference sequence "100000100000100100" corresponding to 18T shown in the sector mark area 566 in FIG. 53 has been preset in the reference sequence setting section 636. The comparing section 634 compares the detected sequences S0 to S17 from the sequence latch circuit 602 and the reference sequence of the reference sequence setting section 636 at a reading end timing of the sector mark. When they coincide, the comparing section 634 outputs a sector mark detection signal E10. Each of other remaining peak pattern comparing sections 606, 608, and 610 shown in FIG. 56 also operates in a manner similar to the comparing section 604. However, a reference sequence having a redundancy such that even if either one of the read signals among the four magnetic recordings "N, S, N, S" of 18T drops out, it can be regarded as a sector mark and can be detected has been stored in the reference sequence setting section 636.

FIG. 58A shows reference sequences stored in the peak pattern comparing sections 604, 606, 608, and 610. As shown in FIG. 52, the sector mark is formed by total 18T comprising 6T, 6T, 3T, and 3T. In order to provide a redundancy for the peak shift, for example, a change of ±1T is included in the pulse of 6T. Such a pulse results in a pattern C in FIG. 58A and lies within a range of 5T to 7T. 3T corresponds to 2T to 4T of the pattern B of 3T±1T in FIG. 58B. Further, the pattern A denotes 1T, the pattern D denotes 9T±1T, the pattern E denotes 12T±1T, and the pattern F denotes 14T or more. Therefore, the reference sequences in FIG. 58 become a combination of the patterns having the redundancy in FIG. 58B.

Referring again to FIG. 56, the polarity signal E4 is sent to a sequence latch circuit 612, by which pulse sequences of the polarity signal for 18T as a reading period of time of the sector mark are latched in a manner similar to the case of the peak detection. An output of the sequence latch circuit 612 is supplied to polarity pattern comparing sections 614, 616, 618, and 620, respectively. Each of the polarity pattern comparing sections 614 to 620 is also constructed by the comparing section 634 and reference sequence setting section 636 similar to those shown in FIG. 57.

Reference sequences having polarity patterns in FIG. 59 have been stored in the polarity pattern comparing sections 614, 616, 618, and 620. Namely, four polarity patterns (+), (−), (+), and (−) corresponding to 6T, 6T, 3T, and 3T corresponding to normal pulses are stored as reference sequences in the polarity pattern comparing section 614. Reference sequences of the polarity patterns corresponding to the drop-out of the peak pulses are stored in the other remaining polarity pattern comparing sections 616, 618, and 620. Outputs of the peak pattern comparing sections 604, 606, 608, and 610 and polarity pattern comparing sections 614, 616, 618, and 620 are respectively inputted to corresponding AND circuits 622, 624, 626, and 628. For example, a coincidence signal from the peak pattern comparing section 604 in which the reference sequences of the normal pulse have been set and a coincidence signal from the polarity pattern comparing section 614 in which the reference sequences of the normal pulse have likely been stored are inputted to the AND circuit 622. When the pulse sequences of both of the peak detection pulse and the polarity signal coincide with the reference sequence, the AND circuit 622 generates a sector mark detection signal and outputs as a sector mark detection signal E5 through an OR circuit 632. The sector mark detecting circuit in the invention can fundamentally be constructed by only the peak pattern comparing sections 604 and 614 and AND circuit 622. However, in order to provide a redundancy for the detection pattern, the peak pattern comparing sections 606, 608, and 610, polarity pattern comparing sections 616, 618, and 620, and AND circuits 624, 626, and 628 are provided. As shown in FIG. 59, each of the AND circuits 624, 626, and 628 outputs a sector mark detection signal in the case where the pulse sequences coincide with the reference sequences of the peak detection and polarity detection when the first, second, third, or fourth pulse of the normal pulses is dropped out. The AND circuits 622, 624, 626, and 628 are controlled by a control register 630. The control register 630 is a 4-bit register and can make all or either one of the AND circuits 622, 624, 626, and 628 valid by setting an arbitrary 4-bit code by the MPU 1024 shown in FIG. 55.

In the invention, at the time of the detection of the first sector mark when the head portion 14 is moved to a target cylinder position and is switched to the on-track control, "1000" has been set to the control register 630, so that only the AND circuit 622 is made valid. Therefore, only when the detection sequence coincides with the reference sequences which become the peak pattern and polarity pattern of the normal pulses in FIGS. 58 and 59, the sector mark detection signal E5 is outputted through the OR circuit 632. After completion of the detection of the sector mark of the first time, with respect to the subsequent detection of the sector marks, the MPU 1024 switches the control register 630 to "1111" and makes all of the AND circuits 622, 624, 626, and 628 valid. Therefore, in the detection of the sector mark of the second and subsequent times, even if one of the read signals is dropped out, the detecting operation of the sector mark can be normally executed.

Figure 60:
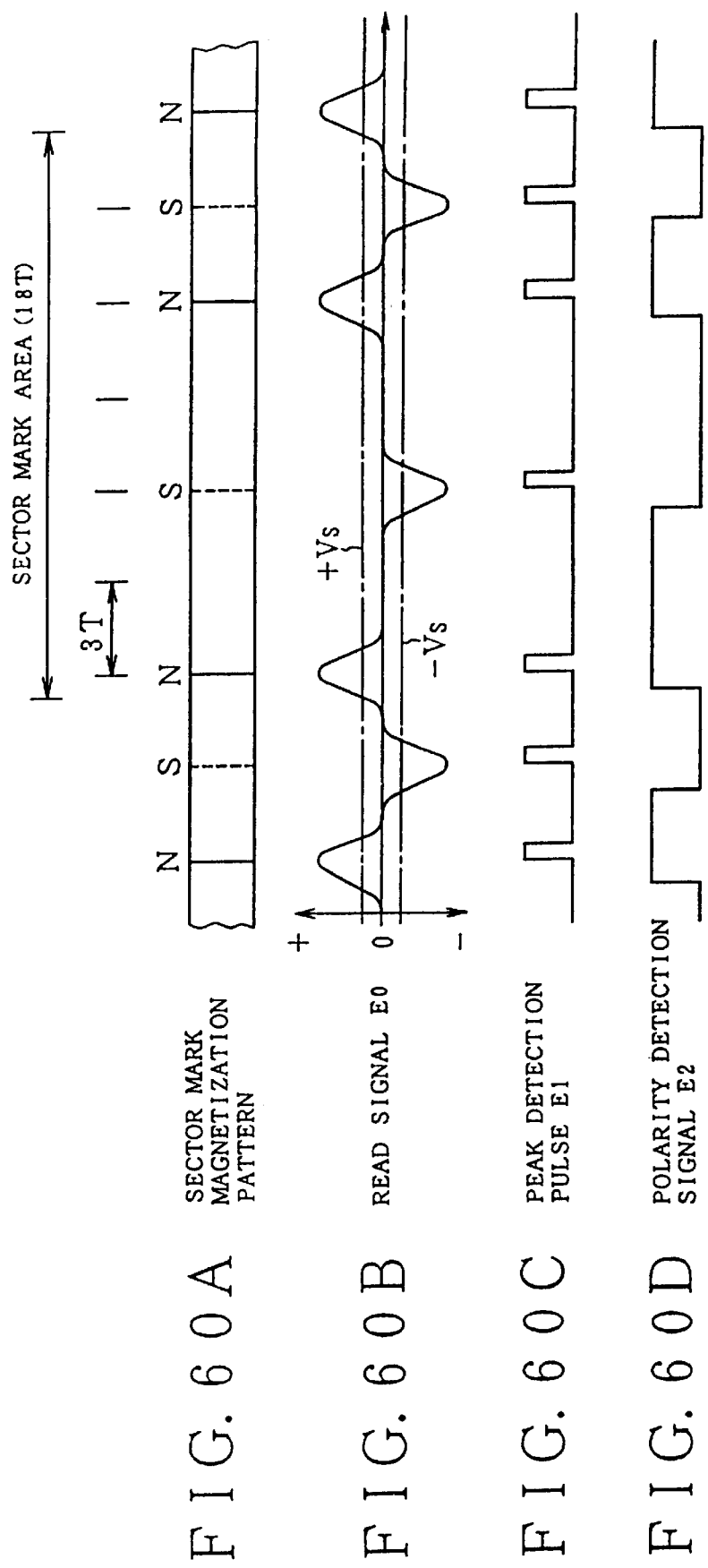
FIGS. 60A to 60D are timing charts showing a peak detection pulse and a polarity signal which are detected from a sector mark read signal in FIG. 55.

FIGS. 60A to 60D show the operations by the peak detecting circuit 590, polarity detecting circuit 592, and synchronizing circuit 594 in FIG. 55. FIG. 60A shows a magnetization pattern of the sector mark in a specific cylinder. A solid line indicates a magnetization state of the N pole. A broken line shows a magnetization state of the S pole. When the sector mark in FIG. 60A is read by the read head 15, a read signal E0 in FIG. 60B is obtained. The peak detecting circuit 590 detects positive and negative peak timings of the read signal E0 in FIG. 60B and generates the peak detection pulse E1 in FIG. 60C. Such a peak detecting process can be performed by, for example, detecting a zero-cross point after the read signal E0 was differentiated. The polarity signal in FIG. 60D sets positive and negative slice levels +Vs and −Vs for the read signal E0. When exceeding +Vs, the polarity signal is set to the logical level 1. When the read signal E0 is lower than −Vs, the polarity signal is reset to logical level 0. In this way, the polarity signal E2 is outputted.

Figure 61:
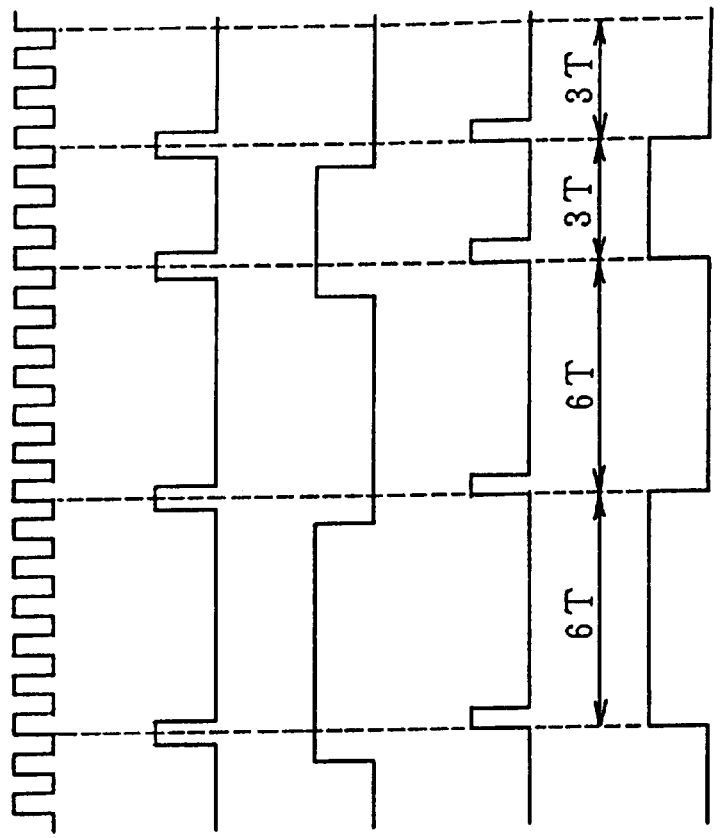
FIGS. 61A to 61E are timing charts showing a synchronization of the peak detection pulse and polarity signal for the sector mark read signal in FIG. 55.

FIGS. 61A to 61E show the synchronization of the peak detection pulse and the polarity signal by the synchronizing circuit 594 in FIG. 55. FIG. 61A shows a reference clock having a period (T) which is set to, for example, 20 Mhz. The peak detection pulse E1 in FIG. 61B and the polarity signal E2 in FIG. 61C are synchronized in response to a leading edge of the reference clock. Thus, the synchronized peak detection pulse E3 in FIG. 61D and the synchronized polarity signal E4 of FIG. 61E can be obtained and the intervals of 6T, 6T, 3T, and 3T are set.

Detection of Gray Code

Figure 62:
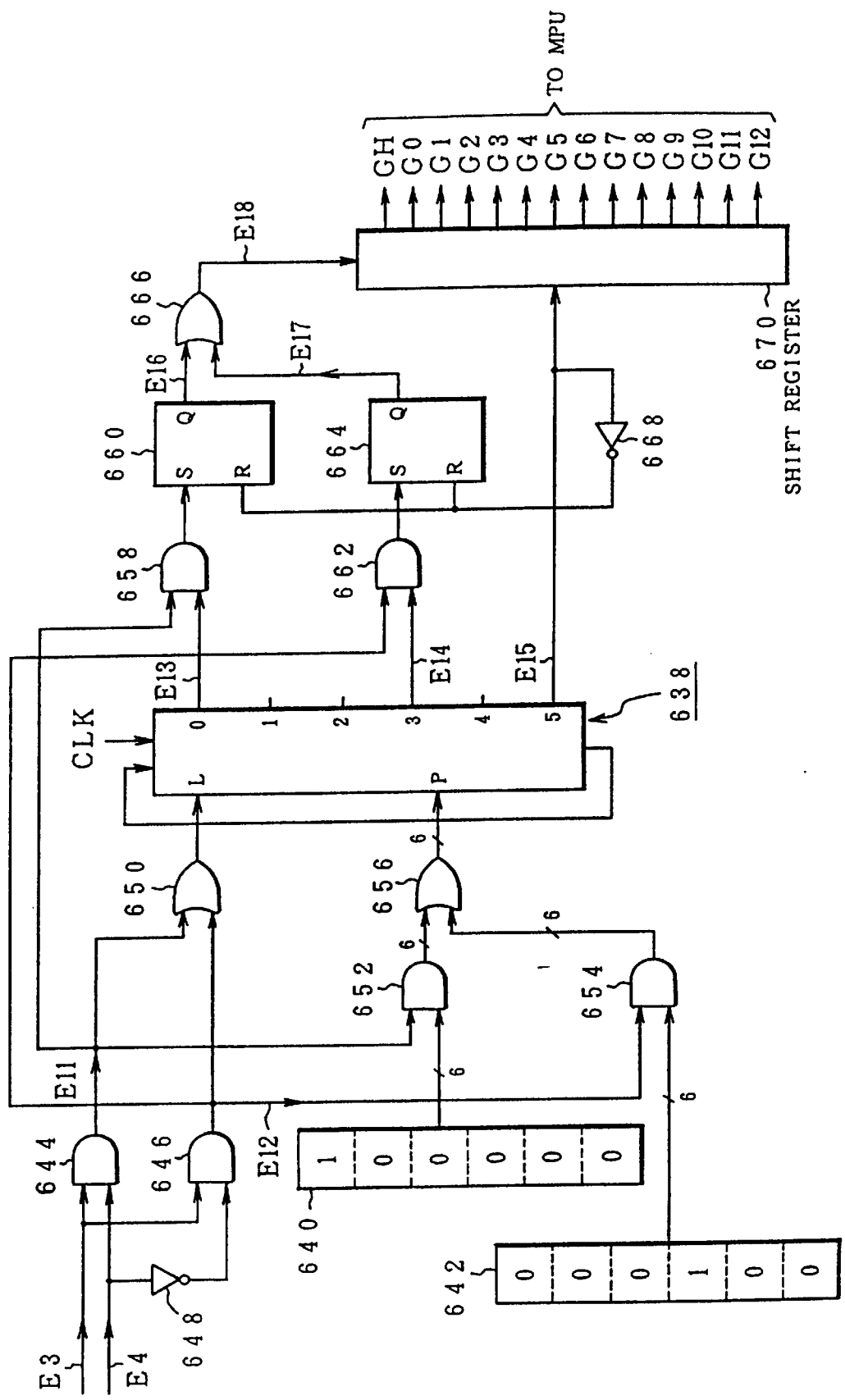
FIG. 62 is a block diagram of an embodiment of a gray code detecting circuit in FIG. 55.

FIG. 62 shows an embodiment of the gray code detecting circuit 598 provided for the servo frame demodulating circuit 1056 in FIG. 55. A status counter 638 is provided for the gray code detecting circuit 598. The status counter 638 is constructed by a shift register and can forcedly preset data from a preset terminal (P) by a control signal to a load terminal (L). The status counter 638 has six shift stages in correspondence to a 1-bit width 6T of the gray code. The six shift stages are referred to as state 0, state 1, state 2, state 3, state 4, and state 5 from the head. On the basis of the peak detection pulse E3 and its polarity signal E4 by the first read signal when the reading operation of the servo frame is started, the status counter 638 is preset to "100000". Such a presetting operation is executed by using a value of a preset register 640. A fact that both of the peak detection pulse E3 and the polarity signal E4 were obtained is detected by an AND circuit 644. By supplying a detection signal E11 to the load terminal (L) through an OR circuit 650, the presetting operation of the status counter 638 is executed. In this instance, since the output signal E11 from the AND circuit 644 is also supplied to an AND circuit 652, 6-bit data of the preset register 640 is supplied to the preset terminal (P) through the AND circuit 652 and an OR circuit 656. Therefore, the value "100000" of the preset register 640 is preset into the status counter 638 by the presetting operation of the status counter 638 based on the first read signal. After completion of the first presetting operation, the status counter 638 subsequently executes a bit shifting operation by the reference clock CLK of 1T. Further, an output of the final shift stage of the state 5 is fed back to the input stage of the state 0. The status counter operates as what is called a ring counter.

The presetting operation of the 6-bit data from the preset register 640 to the status counter 638 is based on the peak detection and polarity detection of the read signal having the positive polarity. On the other hand, when the peak detection pulse E3 and polarity signal E4 regarding the read signal having the negative polarity that is obtained from the read signal of the positive polarity after 3T are obtained, "000100" stored in the preset register 642 is preset into the status counter 638. Such a detection of the peak detection pulse E3 and polarity signal E4 of the read signal having the negative polarity is executed by an inverting circuit 648 and an AND circuit 646. By supplying the control signal E2 to the load terminal (L) through the OR circuit 650, the value of the preset register 642 is preset. In this instance, a control signal E12 of the AND circuit 646 sets an AND circuit 654 into a permission state. The 6-bit data of the preset register 642 can be supplied to the preset terminal (P) through the OR circuit 656. Namely, when the read signal of "100100" of 6T corresponding to the gray code of bit 1 is obtained, the count value of the status counter 638 in each status state is forcedly preset at the timings of states 0 and 3. On the other hand, with respect to the read signal of "000000" of 6T of the gray code corresponding to bit 0, none of the peak detection pulse E3 and polarity signal E4 is obtained. The status counter 638 is set into a free run state by the reference clock CLK according to the preset synchronization so far.

The reconstruction of bits 0 and 1 based on the gray code is fundamentally executed by using a state-0 signal E13 and a state-3 signal E14 of the status counter 638. The state-0 signal E13 sets a latch circuit 660 through an AND circuit 658. The state-3 signal E14 sets a latch 664 through an AND circuit 662. An output of the AND circuit 644 is supplied to another input of the AND circuit 658. When the peak detection pulse E3 and its polarity signal E4 are normally obtained from the read signal, the AND gate 658 is set into a permission state, thereby allowing a setting operation of the latch circuit 660 by the state-0 signal E13. Similarly, an output of the AND circuit 646 is supplied to another input of the AND circuit 662. When the peak detection pulse E3 and its polarity signal E4 of the read signal having the negative polarity are effectively obtained, a setting operation of the latch circuit 664 by the state-3 signal E14 is permitted. On the other hand, with respect to the read signal of "000000" of 6T of the gray code corresponding to the bit 0, the outputs of the AND circuits 644 and 646 are not set to the logical level 1 even at any timing of the state 0 and state 3 and the presetting operation is not performed for the status counter 638. Further, the setting operations to the latch circuits 660 and 664 by the state-0 signal E13 and state-3 signal E14 are also inhibited. Therefore, in the case where the read signal is normally obtained with regard to the gray code "100100" corresponding to bit 1, the sequence "11" of the statuses 0 and 3 of the status counter 638 is latched into the latch circuits 660 and 664. On the other hand, with respect to the read signal of "000000" of the gray code of bit 0, the sequence "00" is stored into the latch circuits 660 and 664.

Latch outputs of the latch circuits 660 and 664 are supplied to a shift register 670 as a bit demodulation signal E18 through an OR circuit 666. The shift register 670 has shift stages corresponding to the gray code of 14 bits. The shift register 670 receives the bit demodulation signal E18 which is serially inputted and shifts it and supplies cylinder addresses corresponding to the gray codes G12 to GH of 14 bits which were demodulated to the MPU 1024 at a read end timing of the gray code. A shifting operation of the shift register 670 is executed by a state-5 signal E15 of the status counter 638. The state-5 signal E15 is inverted by an inverting circuit 668, thereby resetting the latch circuits 660 and 664.

Further, in the gray code detecting circuit 598 of the invention, in the 6T pattern "100100" of the gray code indicative of bit 1, even if either one of the head read signal corresponding to the state 0 and the read signal at the fourth stage corresponding to the state 3 is dropped out, bit 1 can be normally demodulated. When the first read signal having the positive polarity is dropped out in the recording pattern "100100" of the gray code of 6T and becomes "000100", the presetting operation of the status counter 638 by the preset register 640 is not performed. The latching operation of the latch circuit 660 by the state-0 signal E15 is also inhibited. However, since the negative read signal corresponding to the next fourth state 3 is normally obtained, the presetting operation of the counting operation of the state-3 by the preset register 642 and the setting operation by the state-3 signal E14 for the latch circuit 664 are normally performed. In this case, the latch sequences of the latch circuits 660 and 664 are set to "01". The bit demodulation signal E18 is set to bit 1. The read signal can be normally demodulated.

On the other hand, even if the positive read signal corresponding to the state 0 could be demodulated, if the negative read signal corresponding to the next state 3 is dropped out and becomes "100000", the status counter 638 is preset by the preset register 640 and the latch circuit 660 can also correctly execute the latching operation by the state-0 signal E13. However, since the peak detection pulse E3 and polarity signal E4 are not correctly obtained in the state 3, the presetting operation by the preset register 642 and the setting operation of the latch circuit 664 by the state-3 signal E14 are not executed. In this case, the latch sequences of the latch circuits 660 and 664 are set to "10", the bit demodulation signal E18 from the OR circuit 666 is set to the same bit 1 as that in the normal state, and the read signal can be effectively demodulated.

FIGS. 63A to 63D show processing operations by the peak detecting circuit 590 and polarity detecting circuit 592 in FIG. 55 for the read signal of the gray code. FIG. 63A shows a magnetization pattern of the gray code. Assuming that 6T is set to a 1-bit width and bit 1 is set on a 3T unit basis, a magnetization pattern of "100100" is recorded with respect to the gray codes G12, G11, G10, G9, G8, . . . as shown in the diagram. FIG. 63B shows the read signal E0, a positive read waveform is obtained for the magnetization pattern of the N pole shown by a solid line, and a read waveform having the negative polarity is derived for the magnetization pattern of the S pole shown by a broken line. FIGS. 63C and 63D show the peak detection pulse E1 and polarity signal E2 of the gray code read signal E0 and they are synchronized by the reference clock CLK by the next synchronizing circuit 594 in a manner similar to the case of FIG. 61 and are inputted to the gray code detecting circuit 598 shown in FIG. 62.

FIGS. 64A to 64L show the operation of the gray code detecting circuit in FIG. 62 when the read signal of the magnetization pattern "100100" by the gray code of bit 1 is normally obtained. FIG. 64A shows a magnetization pattern of the gray code corresponding to bit 1 and "100100" is recorded for 6T. The synchronized peak detection pulse E3 in FIG. 64B and the synchronized polarity signal E4 in FIG. 64C are obtained from the read signal of the gray code. The preset signal E11 of the state 0 in FIG. 64D is supplied to the status counter 638 at a timing of the state 0 when the peak detection pulse E3 and polarity signal E4 rise to the logical level 1. The status counter of "100000" is preset. The preset signal E12 of the state 3 in FIG. 64E is derived at the timings of the peak detection pulse E3 and polarity signal E4 at which the negative read signal is derived.

FIG. 64F shows a status state of the status counter 638 by 0 to 5. The state-0 output E13 in FIG. 64G, state-3 output E14 in FIG. 64H, and state-5 output E15 in FIG. 64I are obtained from the status counter 638. As shown in FIG. 64J, the latch circuit 660 latches the state-0 output signal E13 at the timing of the state 0 and generates a latch output E16. As shown in FIG. 64K, the latch circuit 664 generates a latch output E17 which latched the state-3 output signal E14 at the timing of the state 3. Thus, the bit demodulation signal E18 from the OR circuit 666 shown in FIG. 64L is set to the logical level 1 at the timing of the state 3 and is supplied to the shift register 670 at, for example, the leading timing of the state-5 output E15 in FIG. 64I.

FIGS. 65A to 65L show the gray code detecting operation in the case where the head read signal of the 6T pattern "100100" of the gray code corresponding to bit 1 is dropped out. That is, as shown in FIG. 65B, since the head read signal having the positive polarity is dropped out, a pulse 672 of the peak detection pulse E3 is extinguished. In correspondence to it, a signal 674 for the states 0 to 2 of the polarity signal E14 in FIG. 65C is also extinguished. However, the status counter 638 normally operates and the state-3 output E14 is latched into the latch circuit 664 at the timing of the state 3 and is set to the logical level 1. Finally, the bit demodulation signal E18 is demodulated as bit 1 from the OR circuit 666. Even if the head positive read signal is dropped out, the bit demodulation of the gray code can be performed without a problem.

FIGS. 66A to 66L shows the gray code detecting operation in the case where the negative read signal corresponding to the state 3 of the 6T pattern "100100" of the gray code of one bit is dropped out. In this case, in the peak detection pulse E3 in FIG. 66B, a pulse 676 corresponding to the state 3 is dropped out. At the same time, in the polarity signal E4 in FIG. 66C as well, a signal portion 678 of the logical level 0 corresponding to the negative read signal is dropped out and is all set to the logical level 1. However, since the first read signal corresponding to the state 0 is normally obtained, the output signal E16 of the latch circuit 660 in FIG. 66J is set to the logical level 1. Even when the output signal E17 of the latch circuit 664 is held at the logical level 0 due to the drop-out of the signal, the final bit demodulation output by the OR circuit 666 can be correctly reconstructed as bit 1.

FIGS. 67A to 67K show the gray code detecting operation in the case where the read signal causes a phase shift by a delay element or the like of the circuit. FIG. 67A shows the peak detection pulse E3 derived from the read signal in which the phase shift occurred. Namely, the phase shift such that the pulse based on the negative read signal has an advanced phase as shown in a pulse waveform 680 occurs. For the above phase shift, the polarity signal E4 also has a detection waveform of the polarity corresponding to the phase shift as shown in FIG. 67B. In association with the phase shifts of the peak detection pulse E3 and polarity signal E4, the status counter generates the preset signal E12 in the state 3 at the timing of the advanced phase shift as shown in FIG. 67D, thereby forcedly presetting the status counter 638 to "000100" and setting the count state of the state 3. Thus, the status counter 638 counts "013450" and is preset to the state 0 at the timings of the next peak detection and polarity detection. Even in such a phase shift, since the signal states of the states 0 and 3 which are used for bit demodulation are similar to those in the normal state, the output E16 of the latch circuit 660 is set to the logical level 1 at the timing of the state 0. The output E17 of the latch circuit 664 is also set to the logical level 1 at the timing of the state 3 which was shifted. The bit demodulation signal E18 as an output of the OR circuit 666 is also finally set to the logical level 1 at the timing of the state 3 which was shifted. Therefore, even if there is a phase shift, the bits can be normally demodulated.

FIGS. 68A to 68L show the gray code detecting operation in the case where the negative read signal is shifted in the delay direction in a manner opposite to the case of FIGS. 67A to 67K. Namely, as shown in FIG. 68A, a shifted pulse 682 is derived by the phase shift of the negative read signal in the peak detection pulse E3 to the delay side. In correspondence to it, a phase shift also occurs in the polarity detection of the polarity signal E4 in FIG. 67B. In this case, although the status counter 638 counts like "0123" as shown in the status in FIG. 68E, since it is preset to the count state of the state 3 of "000100" by the count of the state 4, the state 3 is again obtained. A change until the state 0 is preset by the next read signal is set to "0123345". Since this means that the operations are substantially the same as the above operations except a different point that the state 3 occurs twice, even when a delay phase shift occurs, the bits can be normally demodulated.

Real-Time Eccentricity Correction

In the disk apparatus using the sector servo system, an eccentricity measurement such that a deviation amount from the track center in each cylinder is measured on a sector unit basis and is stored into a RAM or the like is executed every predetermined time. In the ordinary on-track control, the on-track control associated with the eccentricity correction for always positioning the head to the track center by subtracting the eccentricity deviation amount which has already been measured from a target position is executed.

However, since the deviation value which is used for eccentricity correction has been measured every predetermined time, the eccentricity correction is performed by using the previous measurement value for a period of time between the measurement and the subsequent measurement and there is a problem such that the apparatus cannot cope with a fluctuation of an eccentricity amount by a temperature change. In the disk apparatus of the invention, therefore, the eccentricity deviation value is measured by the first one rotation of the cylinder in the on-track state and is stored into the RAM and the on-track control associated with the eccentricity correction using the previously measured deviation value is executed from the next one rotation, thereby enabling the eccentricity correction to be performed in an almost real-time manner.

Figure 69:
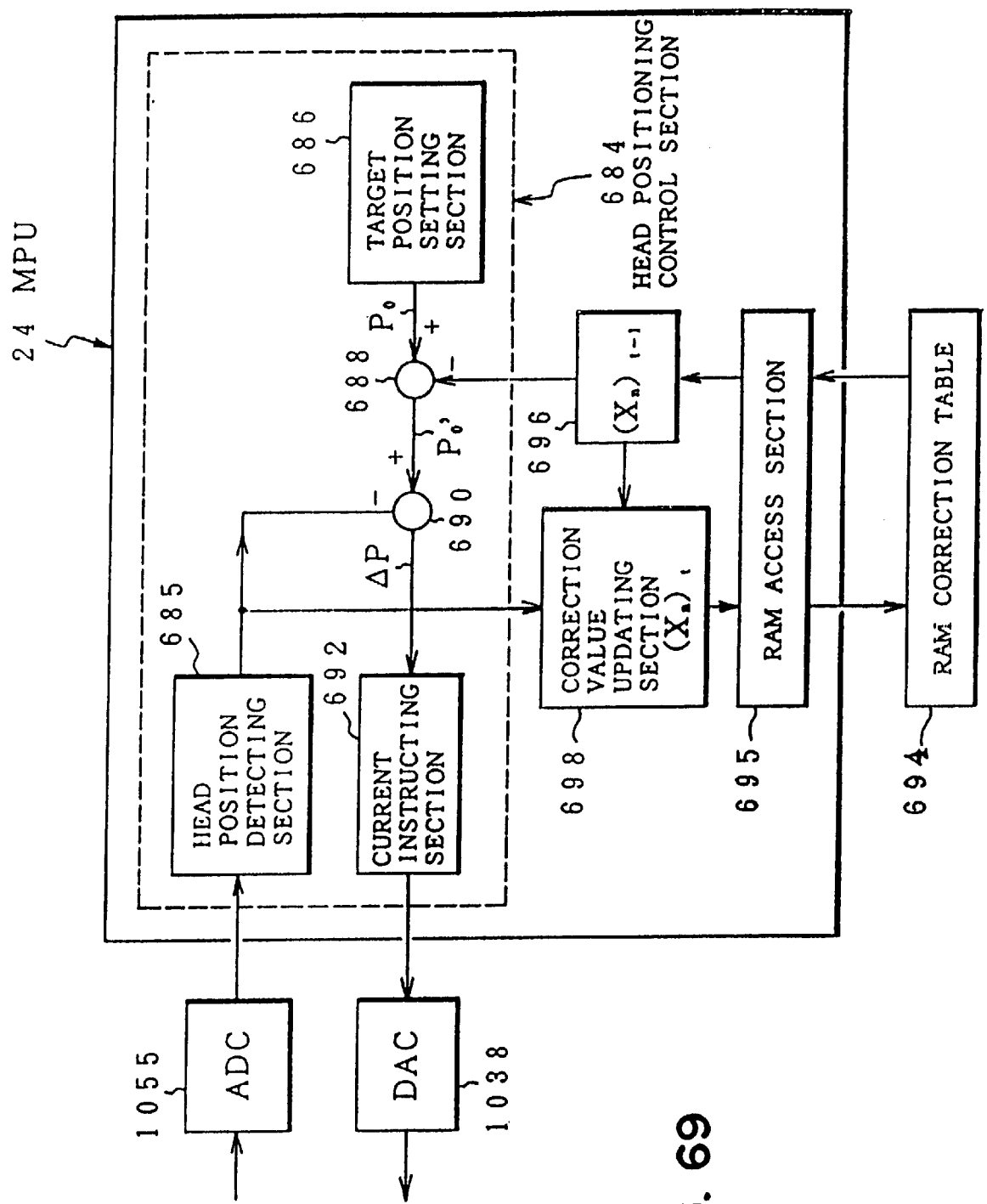
FIG. 69 is a block diagram of an embodiment of the invention in which an eccentricity is measured and corrected in a real-time manner at the time of the on-track.

FIG. 69 shows an embodiment of the disk apparatus of the invention to realize the real-time process of the eccentricity correction. The head positioning control associated with the real-time eccentricity correction is realized as a function by the program control of the MPU 1024. The head positioning control section 684 for controlling the head so as to trace the track center in the on-track state is provided for the MPU 1024. The head positioning control section 684 comprises a head position detecting section 685, a target position setting section 686, adders 688 and 690 of position servo, and a current indicating section 692. The target position setting section 686 outputs a target position P0 indicative of the track center for positioning the head in the on-track state. The target position P0 is sent to the adder 688. A deviation value for the track center obtained by the previous eccentricity measurement read out in a register 696 at that time, namely, an eccentricity correction value $(Xn)_{r-1}$ is subtracted from the target position P0, thereby outputting a corrected target position P0'. The adder 690 obtains a position error ΔP by subtracting a head position Pn detected by the head position detecting section 685 at that time from the corrected target position P0'. The position error ΔP obtained by the adder 690 is supplied to the current indicating section 692. Current indication data comprising a current direction which is shown by the polarity of the position error ΔP and a current value shown by an absolute value is outputted to the D/A converter 1038. The D/A converter 1038 supplies a current to the VCM 20 by the driver 1040 shown in FIG. 4, thereby driving the head and controlling the head so as to set the position error ΔP to 0.

The head position detecting section 685 converts the detection signal of the servo area which was peak held by the peak holding circuit 1054 in FIG. 4 into the digital signal by the A/D converter 1055 and fetches. As servo information, for instance, from the 2-phase servo recorded with the first to fourth fields A, B, C, and D in FIG. 54, the head position Pn at that time is detected.

An RAM correction table 694 for storing correction values Xn obtained by the eccentricity measurement on a sector unit basis of each cylinder is provided for an external RAM. For instance, as shown in FIG. 70, correction values X0 to X59 which were measured every area by using the sector numbers 0 to 59 as addresses are stored in the RAM correction table 694. The contents of the RAM correction table 694 shown in FIG. 70 are formed every cylinder.

An RAM access section 695 is provided for the MPU 1024. On the basis of the cylinder address and the sector number at that time, the eccentricity correction values Xn (n=0 to 59) stored in the RAM correction table 694 are read out and set into the register 696 and are used for correction of the target position P0 in the adder 688. A correction value updating section 698 is provided. The head position Pn measured at present is added to the previous eccentricity correction value $(Xn)_{r-1}$ read out in the register 696, thereby obtaining a new eccentricity correction value $(Xn)_r$. The value $(Xn)_r$ is stored into the address of the corresponding sector number in the RAM correction table 694 by the RAM access section 695. The eccentricity correction value is updated to the new measurement result.

Figure 71A:
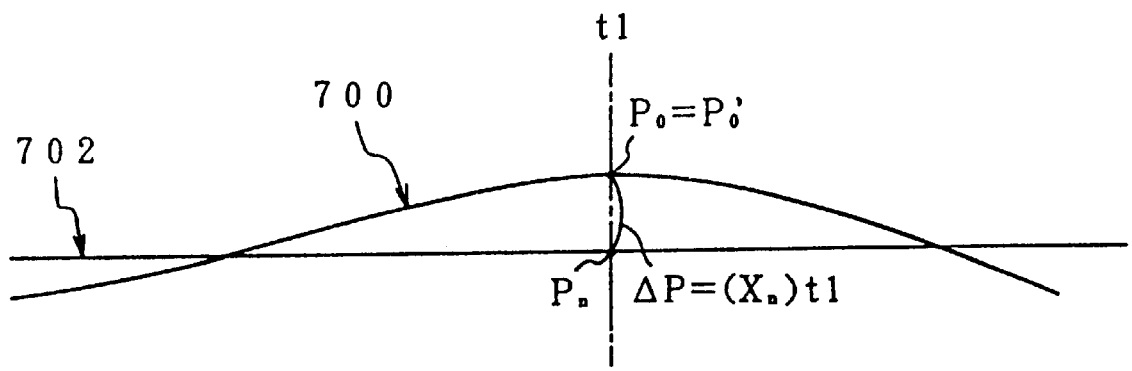
FIGS. 71A and 71B are explanatory diagrams showing states of the real-time eccentricity measurement and correction with respect to a head locus and a track center.
Figure 71B:
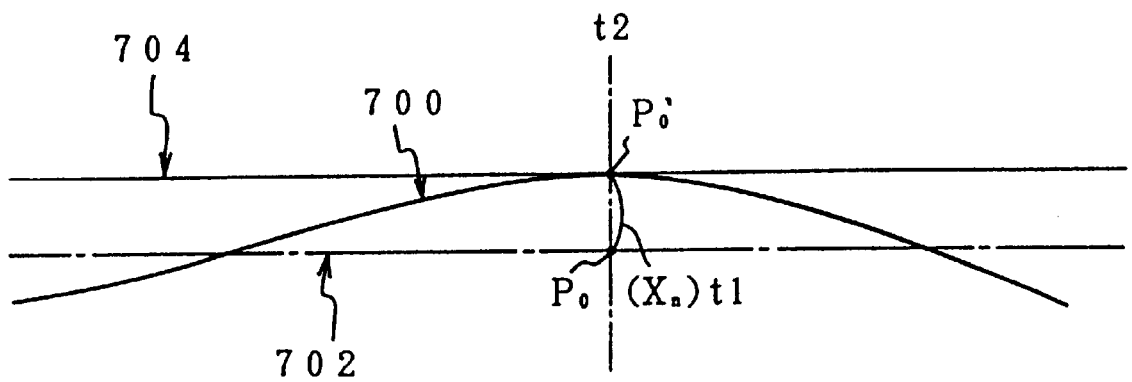

FIGS. 71A and 71B show the relations between the track centers before and after the correction by the real-time eccentricity correction of the invention and the head position. FIG. 71A shows a head locus 702 for a track center 700 at a certain sampling point in the first one rotation of the cylinder after the on-track state was obtained. Namely, the track center 700 gently waves by the eccentricity. On the other hand, since the head locus 702 is set to a predetermined value, it is shown as a straight line locus. The track center 700 is set to the target position P0 in the on-track state. Now, assuming that a sampling time point of the first time is set to t1, a previous sampling time point is set to t0. However, since the correction at this time is the first eccentricity correction, the contents of the corresponding sector in the RAM correction table 694 are equal to 0. A previous eccentricity correction value $(Xn)_{r0}$ in the register 696 is equal to 0. Therefore, the adder 688 outputs the target position P0 itself as a corrected target position P0' to the adder 690. The adder 690 subtracts the head position Pn detected from the target position P0 from P0', thereby obtaining the position error ΔP. The current indicating section 692 outputs current indication data based on the position error ΔP=−Pn to the D/A converter 1038, thereby performing the positioning control of the head so as to set the position error ΔP to 0. Simultaneously, the correction value updating section 698 adds the head position Pn to the previous eccentricity correction value $(Xn)_{r0}$ in the register 696, thereby obtaining a new eccentricity correction value $(Xn)_{t1}$. However, since the previous eccentricity correction value $(X0)_{t0}$ is equal to 0, the detected head position Pn itself is stored as a new eccentricity correction value $(Xn)_{t1}$ into the address of the corresponding sector in the RAM correction table 694 by the RAM access section 695.

FIG. 71B shows the head positioning control at the same sampling point in one rotation of the cylinder of the second time. With respect to the second time, the previous eccentricity correction value $(Xn)_{t0}$ obtained by the eccentricity measurement of the first time in FIG. 71A has been read out in the register 696. Therefore, assuming that the head position detected at that time is set to Pn, the position error ΔP that is obtained by the adders 688 and 690 is calculated as $$\Delta P = P0 - (Xn)_{t0} - Pn$$

The current indicating section 692 outputs the current indication data according to the detection error ΔP to the D/A converter 1038, thereby performing the head positioning control. In case of FIG. 71B, an error of a head locus 704 for the target position P0' which was eccentricity corrected is equal to 0. Thus, the head positioning state by the eccentricity correction of only the previous eccentricity correction value $(Xn)_{t1}$ is derived. If a head positional deviation occurs in the state of FIG. 71B and the head position Pn out of the corrected target position P0' is obtained, the positioning control by the position error ΔP in which such a head position Pn was added is executed. At the same time, a new eccentricity correction value $(Xn)_{t2}$ is obtained by adding the head position Pn newly obtained to the previous eccentricity correction value $(Xn)_{t1}$. The contents of the corresponding sector in the RAM correction table 694 are updated.

Figure 72:
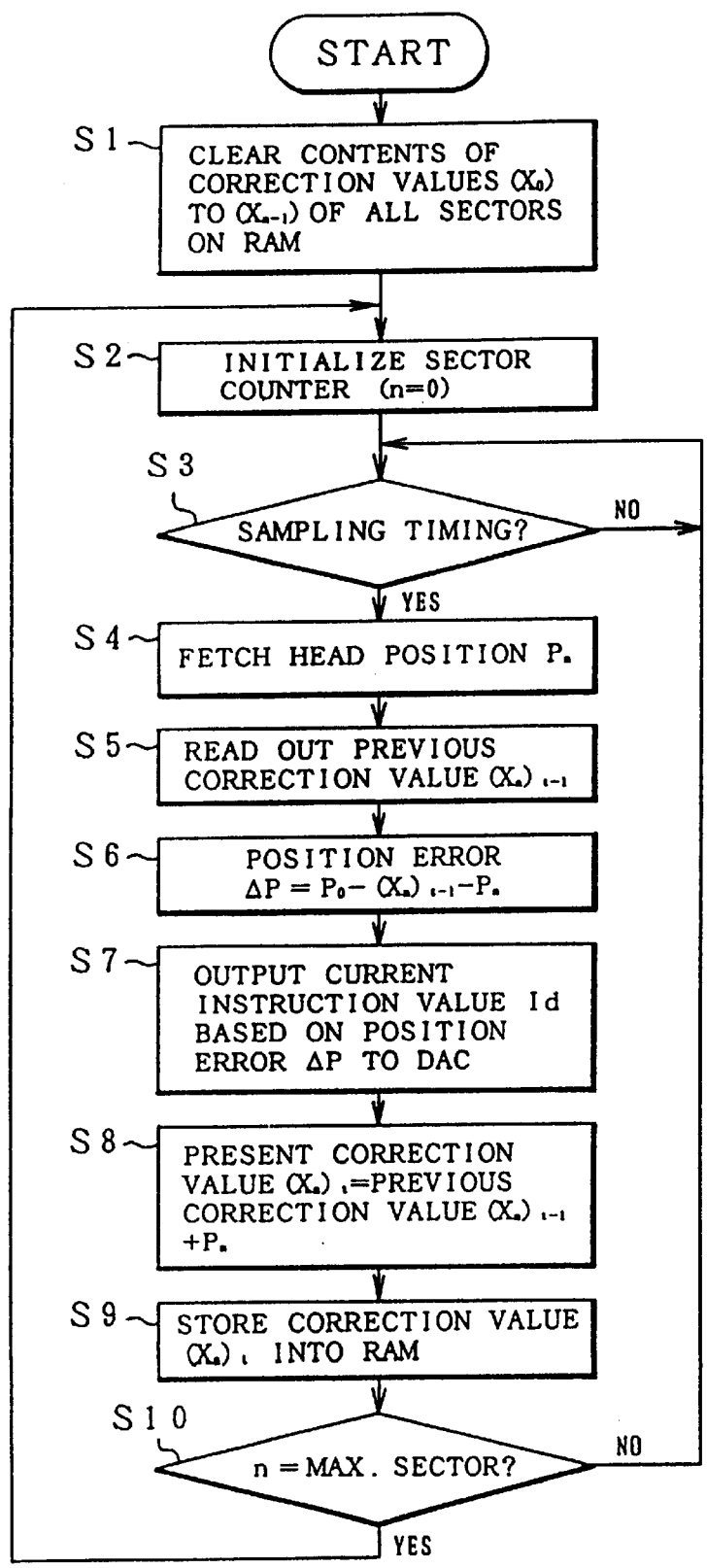
FIG. 72 is a flowchart for measuring and correcting processes of the eccentricity in FIG. 69.

A flowchart of FIG. 72 shows the processing operation of the head positioning control section 684 in FIG. 69 which is executed in the on-track state. When the control mode is switched to the on-track control by the completion of the seek control, the contents of the correction values (X0) to (Xn−1) of all sectors included in the on-tracked cylinder in the RAM correction table 694 are first cleared in step S1. Subsequently in step S2, a sector counter (n) is initialized. After completion of the initialization, a check is made in step S3 to see if a timing is a sampling timing of the head position detection signal in each servo frame or not. When the sampling timing for the head position detection is judged, step S4 follows and the detected head position Pn is fetched. In step S5, the previous eccentricity correction value $(Xn)_{t-1}$ is read out from the address that is designated by the sector counter (n) from the RAM correction table 694. With respect to the first one rotation of the cylinder after the on-track state was set, the previous correction value $(Xn)_{t-1}$ is equal to 0. In step S6, the position error is obtained by using the target position P0, previous correction value $(Xn)_{t-1}$, and detected head position Pn. In step S7, a current instruction value Id based on the position error ΔP is supplied to the D/A converter 1038 and the head positioning control is executed by the driving of the VCM. In step S8, the present head position Pn detected is added to the previous eccentricity correction value $(Xn)_{t-1}$ and the new eccentricity correction value $(Xn)_t$ measured at present is obtained. In step S9, $(Xn)_t$ is stored into the corresponding sector in the RAM correction table 694 and the eccentricity correction value is updated. In step S10, a check is made to see if the count value of the sector counter (n) has reached the maximum sector or not. Until it reaches the maximum sector, the processes in steps S3 to S9 are repeated every sector. In case of the maximum sector, the processing routine is returned to step S2 and similar processes are repeated from the initialization of the sector counter (n).

In the processes in FIG. 72, as a new eccentricity correction value $(Xn)_t$ that is used for updating of the RAM correction table 694, the head position Pn detected at present is added as it is to the previous eccentricity correction value $(Xn)_{t-1}$. However, when the updating such that the head position Pn is added as it is executed, disturbance components other than the stationary eccentricity factors are also added. Therefore, it is desirable to add the following limitations to the head positions Pn.

The first method is a method whereby a weighting process is performed by multiplying a coefficient (K) having a value of 1 or less to the head position Pn and the resultant values are added. The second method is a method whereby the head position is combined to the head position obtained in the adjacent sector and the mean value of the detected head positions is obtained and added. Further, the third method is a method whereby a limit value is decided in the head position to be added and when the head position Pn exceeding the limit value is obtained, the limit value is added.

As mentioned above, a limitation is applied to the head position and a new eccentricity correction value is obtained in addition to the previous eccentricity correction value, so that it is possible to suppress a situation such that the temporary eccentricity component due to the external disturbances is added to the eccentricity correction value.

In the processes in FIG. 72, after all of the contents in the RAM correction table 694 were cleared at the first timing in the on-track state in step S1, the processes are started. However, such a first clearing process is not performed but the positioning correction such that the eccentricity correction value measured at last in the previous on-track state is used at the first time can be also executed. It will be also obviously understood that if the correction value of the present sector is read out and the correcting operation is performed, the correction is executed to the sector which has already been deviated, so that a delay occurs and the correcting operation is not normally performed. Therefore, when reading out the eccentricity correction value from the RAM correction table 694 by the RAM access section 695 in FIG. 69, the sector which is advanced by several sectors for the present sector is read out in consideration of the delay of the correcting operation.

Variable Control of Sector Size

In the disk apparatus using the sector servo system, the servo frames are fixedly formatted on the cylinder at regular intervals and the sector size is fundamentally fixedly determined by the servo frame interval. Namely, a sector pulse is generated synchronously with the detection of the termination of the sector mark. In the fixed sector size, however, since various problems such that the size of data block to be read or written is fixed and the like occur, it is necessary to make the sector size variable. It is, therefore, necessary to generate the sector pulse to decide the sector size at an arbitrary timing as necessary independently of the physical servo frame. The disk apparatus of the invention has a sector pulse generating function which can change the sector size by a simple firmware.

Figure 73:
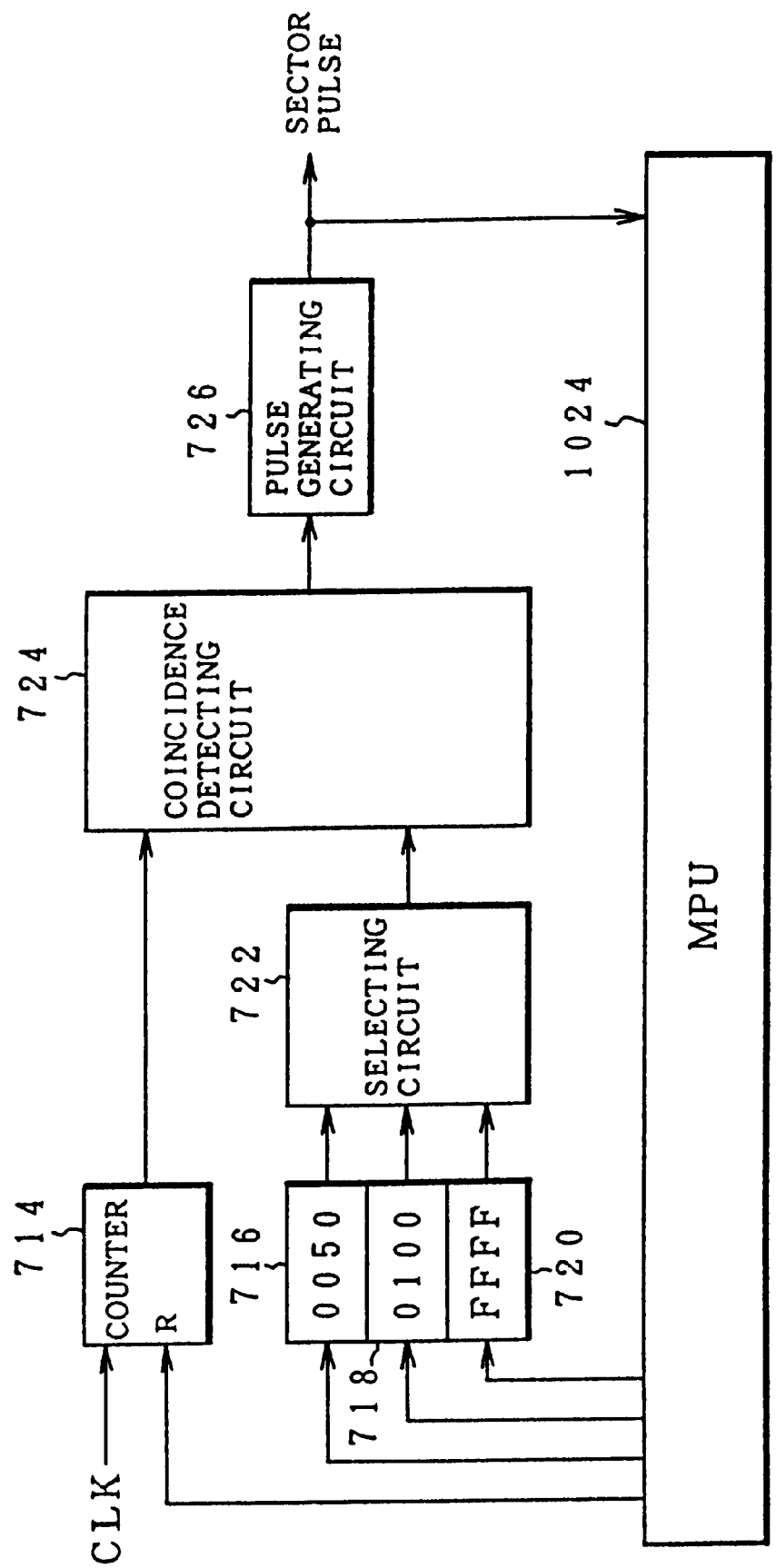
FIG. 73 is a block diagram of an embodiment of the invention in which a sector pulse is generated so that a variable sector size is obtained.

FIG. 73 shows an embodiment of a disk apparatus of the invention to realize a variable sector size. Three control registers 716, 718, and 720 are provided for the MPU 1024. Time data to decide a position at which the sector pulse is subsequently generated by setting, for example, the termination of a certain servo frame to a start point is stored in the control registers 716, 718, and 720. Either one of outputs of the control registers 716, 718, and 720 is selected by a selecting circuit 722 and is supplied to a coincidence detecting circuit 724. A count result of a counter 714 is inputted to the coincidence detecting circuit 724. The counter 714 is reset by the MPU 1024 on the basis of the detection of the termination of the servo frame and starts to count the number of reference clocks CLK from that time point. The coincidence detecting circuit 724 compares either one of the time data of the control registers 716, 718, and 720 selected by the selecting circuit 722, specifically speaking, the time data defined by the number of reference clocks CLK and the count value of the counter 714. When the count value of the counter coincides with the register set time, the coincidence detecting circuit 724 generates a coincidence output to a pulse generating circuit 726, thereby allowing a sector pulse to be generated. A width of sector pulse can be fixedly decided or can be also managed under control of the MPU 1024.

Figures 74A, 74B:
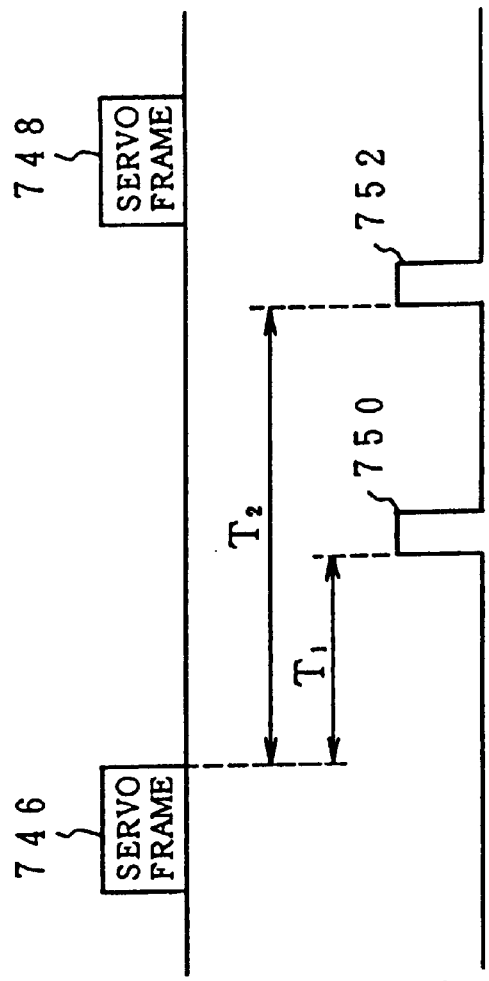
FIGS. 74A and 74B are explanatory diagrams of a generation control of the sector pulse according to FIG. 73.

FIGS. 74A and 74B show the generation of the sector pulse to set the variable sector size according to the embodiment of FIG. 73. In the reading process of a servo frame 746 shown in FIG. 74A, in the case where it is intended to generate sector pulses 750 and 752 in FIG. 74B subsequent to the servo frame 746, times T1 and T2 up to the positions of the sector pulses 750 and 752 are calculated as offset values from the servo frame 746. The time data T1 and T2 are set into the control registers 716 and 718. After the time data T1 and T2 were set, the MPU 1024 selects the register 716 by the selecting circuit 722 and sets the time data T1 into the coincidence detecting circuit 724. The counter 714 is reset by, for example, the end of reading of the servo frame 746 and starts to count the number of reference clocks CLK. When the count value of the counter 714 coincides with the time data Ti, the sector pulse 750 is generated by the pulse generating circuit 726 by the coincidence output. After the sector pulse 750 was generated, the MPU 1024 selects the next control register 718 by the selecting circuit 722 and sets the time data T2 into the coincidence detecting circuit 724. Therefore, when the value of the counter 714 coincides with the time data T2, the coincide detecting circuit 724 generates a coincidence output and the sector pulse 752 is generated from the pulse generating circuit 726.

FIGS. 75A to 75C show the generation control of the sector pulse at the time of the occurrence of a data split such that the data block is separated into two areas by the servo frame by using the control of the variable sector size of the invention. FIG. 75A shows a cylinder recording state. When the write block data exceeds the fixed sector size that is decided by the servo frame interval, it is divided into data 732 and 736 by the fixed sector size, the data 732 is recorded subsequent to a servo frame 728 and an ID 730, and the remaining split data 736 is recorded after next servo frame 734. After the split data 736, there is the next sector and an ID 738 and data 740 are stored. In such a case, as shown in FIG. 75B, a sector pulse 742 is generated just after the servo frame 728. As for the next sector pulse, a sector pulse 744 has to be generated subsequent to the end position of the split data 736 instead of the timing just after the servo frame 734.

To generate such a sector pulse, the time data T1 for the first register 716 in FIGS. 75A and 75B is set to T1=0 and the time data T2 to generate the next sector pulse is the time data in which the gap interval is added to the data 736. The time data T2 is set into the control register 716 for the servo frame 734. By setting the time data T1 into the control register 716, the counter 714 is reset at the end of reading of the servo frame 728 and the counting operation of the reference clocks CLK is started. When the coincidence detecting circuit 724 generates a coincidence output by the selection of the time data T1 by the selecting circuit 722, the first sector pulse 742 is generated from the pulse generating circuit 726. Subsequently, by setting the time data T2 into the control register 716, the counter 714 is reset by the end of reading of the servo frame 734, thereby starting the counting operation of the reference clocks CLK. Thus, when the coincidence detecting circuit 724 generates the coincidence output by the selection of the time data T2 by the selecting circuit 722, the sector pulse 744 is generated from the pulse generating circuit 726.

Further, FIG. 75C shows a read gate. A gating operation is inhibited for periods of time of the servo frames 728 and 734. The reading operations of the ID and data can be performed for a gate effective period of time other than such gate inhibiting periods.

FIGS. 76A to 76C show a generating process of the sector pulse for a sector slipping process for a defective sector. When a defective sector in association with a defective medium is detected on the cylinder, no sector pulse is generated with respect to the defective sector, thereby enabling the continuous reading or writing operation to be performed without being aware of the defective sector. Therefore, in the MPU 1024 in FIG. 73, when the on-track control is executed after completion of the seeking operation of the designated cylinder address, a management table of the defective sectors which has been prepared is referred and time data for inhibiting the generation of the sector pulse for the defective sector is set as shown in, for example, the control register 720 at the timing of the sector number indicative of the defective sector. For example, the maximum register value "FFFF" is set into the control register 720. The set time "FFFF" is the time data exceeding the sector size that is decided by the servo frame. Therefore, even if the time data "FFFF" of the register 720 is selected by the selecting circuit 722 and is set into the coincidence detecting circuit 724, the count value of the counter 714 which was reset by the end of reading of the servo frame doesn't coincide with the time data "FFFF" for a period of time of the defective sector. No coincidence detection output is derived with regard to the defective sector. Thus, the generation of the sector pulse is inhibited.

FIG. 76A shows the reading of the servo frame and a defective sector 754 exists at a specific position. With respect to such a defective sector 754, the time data "FFFF" to inhibit the generation of the sector pulse is set in correspondence to the sector number. Consequently, the generation of the sector pulse can be inhibited as shown in FIG. 76B in the portion of the defective sector 754. If no sector pulse is generated in the defective sector 754, as shown in FIG. 76C, the read gate generates a gate signal that is reset by the first sector mark of the servo frame and is set by the generation of the sector pulse. The reading operation can be executed without being aware of the defective sector 754. The writing operation is also executed in a manner similar to the above. Thus, an alternating process for moving to an alternative area and for reading or writing data which has conventionally been performed when the defective sector 754 exists becomes unnecessary and the access performance can be remarkably improved. FIG. 76C shows the read gate. The same shall also similarly apply to a write gate.

FIGS. 77A to 77D show the generating process of the sector pulse in a digital error test. In the digital error test of the disk medium, it is necessary to generate the sector pulse one by one just after the servo frame. In the embodiment of FIG. 73, accordingly, when receiving a control command of the digital error test, the MPU 1024 sets the time data (T)=0 in order to allow, for example, the control register 716 to generate the sector pulse just after the reading of the servo frame was finished. The selecting circuit 722 fixedly selects the value of the register 716 and supplies to the coincidence detecting circuit 724. In such a set state, the MPU 1024 resets the counter 714 every end of reading of the servo frame and repeats the counting operation, so that the coincidence detecting circuit 724 generates the coincidence output at the first reset timing. The pulse generating circuit 726 generates the sector pulse each time synchronously with the end of reading of the servo frame. Therefore, for the servo frame in FIG. 77A, in case of a digital error test, the sector pulse is generated in a one-to-one corresponding manner as shown in FIG. 77B. A test gate based on a digital error•write test signal for the whole sector interval between the servo frames in FIG. 77C or a digital error read test signal in FIG. 77D can be set. By such a digital error test, an error test for all of the areas excluding the servo frames can be performed. It is possible to properly cope with the variable setting of the sector size in the ordinary reading and writing operations after the end of the error test.

Figure 78:
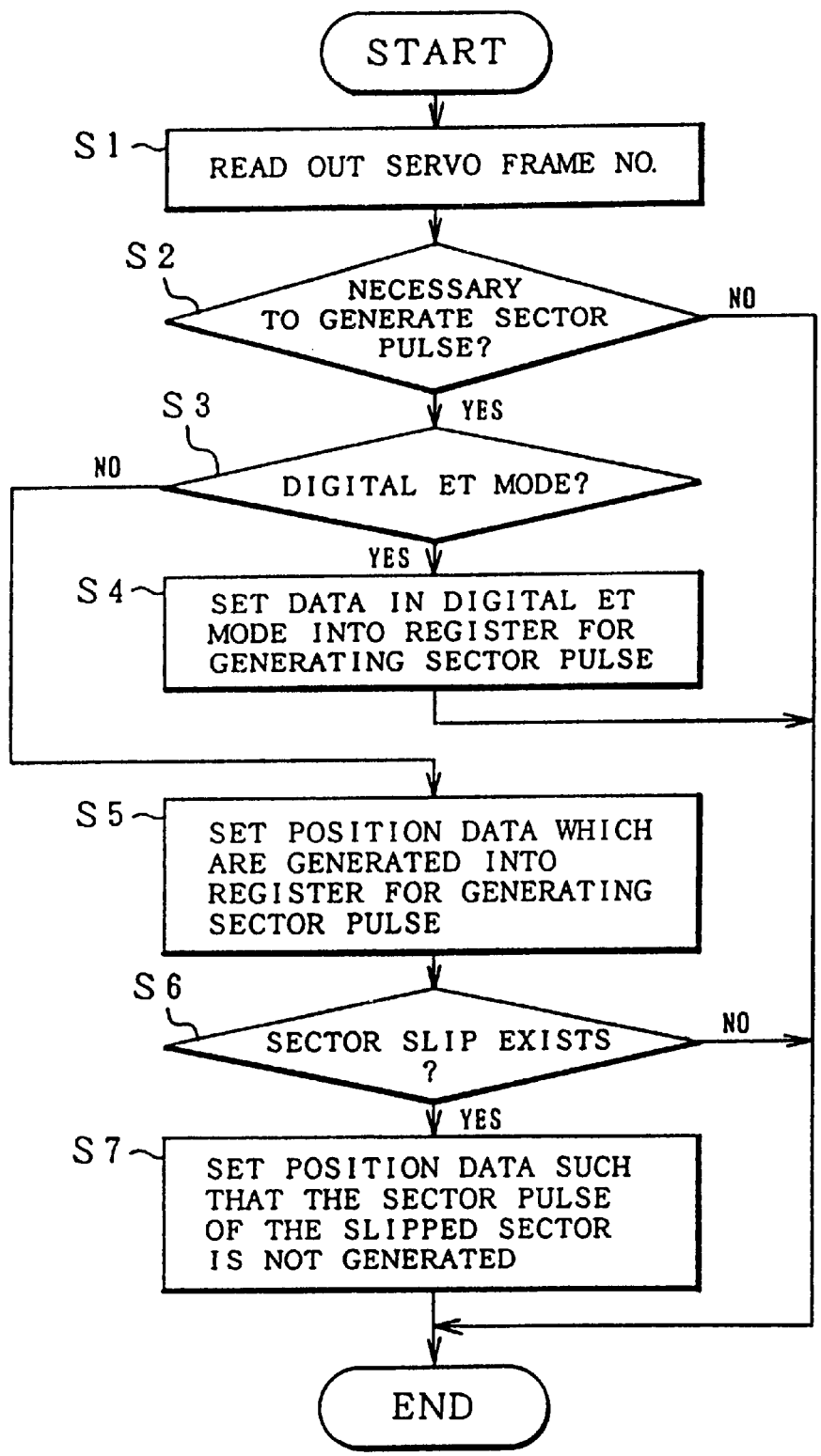
FIG. 78 is a flowchart for the generating process of the sector pulse in FIG. 73.

A flowchart of FIG. 78 shows the data split process, slipping process of the defective sector, and further generating process of the sector pulse including a digital error test. First in step S1, the sector number is read out by reading the servo frame. In step S2, a check is made to see if the generation of the sector pulse is necessary or not. If it is necessary to generate the sector pulse, step S3 follows and a check is made to see if the operating mode is a digital error test mode or not. In case of the initialization diagnosis in association with the turn-on of the power source of the disk apparatus, since the digital error test mode has been set, step S4 follows. The time data in the digital error test mode is set into the register for generating the sector pulse, thereby generating the sector pulse as shown in FIG. 77B every servo frame. In the ordinary state after completion of the activation due to the turn-on of the power source, since the digital error test mode has been released, the processing routine advances to step S5 from step S3. When the data block in which the reading or writing operation was requested from an upper apparatus exceeds the sector size that is decided by the serve frame, one or a plurality of position data (time data) indicative of the sector size generating position are set into the register in order to set a variable sector size. In step S6, the presence or absence of a sector slip for the defective sector is checked. If no sector slip exists, the sector pulse is generated on the basis of the data set in step S5. When the defective sector which needs the sector slip exists in step S6, step S7 follows. In the reading process of the servo frame in which the sector number as a slip target was obtained, the position data such as not to generate the sector pulse, for example, the time data which becomes the register maximum value is set into the register for generating the sector pulse. The generation of the sector pulse in the defective sector is inhibited, thereby allowing the sector slip to be executed.

By variably controlling the generation of the sector pulse as mentioned above, the sector pulse can be generated at an arbitrary position. Particularly, it is effective in the disk apparatus using a constant density recording system (CDR system). By the sector slip process which inhibits the generation of the sector pulse for the defective sector, the writing or reading operation can be performed without being aware of the defective sector. The read/write access performance can be improved as compared with the conventional case where the alternating process is executed for the defective sector.

Further, in the digital error test upon initialization activation, by fixedly generating the sector pulse just after completion of the serve frame, the digital write error test and digital read error test of all of the necessary areas can be realized without causing a gap which becomes a non-test portion between the servo frames. It is possible to properly cope with the variable setting of the sector size that is executed in the ordinary reading and writing operations.

Although the generating time of the sector pulse has been decided by using the termination detection of the servo frame as a reference in the embodiment of FIG. 73, the generating time of the sector pulse can be also decided by using an arbitrary position in the servo frame such as a detection time point of the sector mark or the like as a reference.

Although the embodiment of FIGS. 52 to 78 has been described with respect to the disk apparatus using one disk medium as an example, the number of disk media can be properly increased as necessary. The invention can be also applied to both of the constant density recording system (CDR system) in which the clock frequency is made variable every zone divided in the radial direction and the constant angular velocity recording system (CVR system) in which the clock frequencies are made constant with respect to all of the cylinders. Further, the invention is not limited by the numerical values shown in the embodiments.

Power Saving

Figure 79:
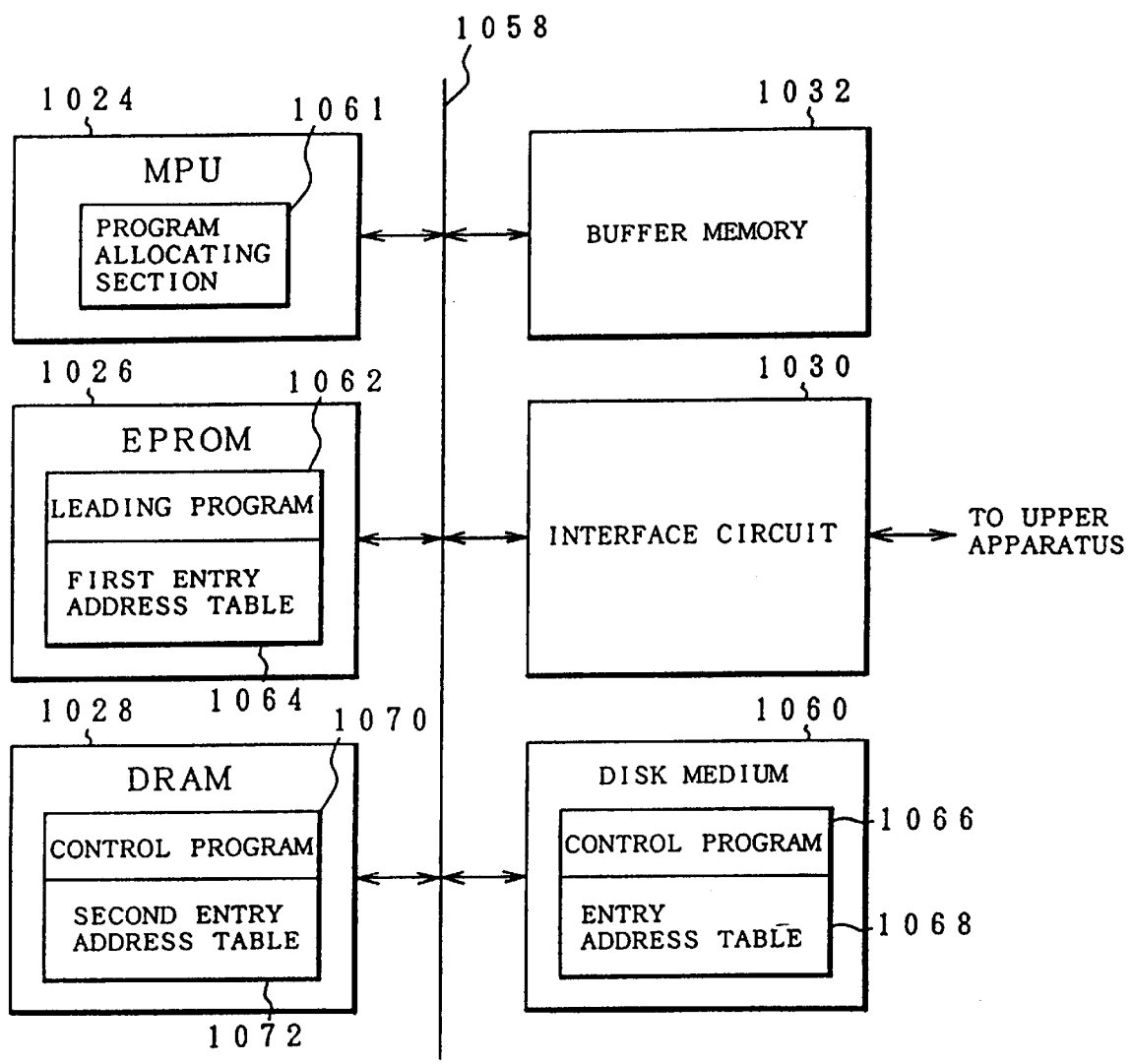
FIG. 79 is a block diagram of a download state of a program to realize the functions of the invention.

FIG. 79 shows the functions of the invention which is applied to the disk apparatus of FIG. 4 with respect to the MPU 1024, EPROM 1026, DRAM 1028, interface circuit 1030, and buffer memory 1032 provided for the drive controller 1012. A leading program 1062 and a first entry address table 1064 indicative of the head positions in the ROM of a plurality of program modules constructing the leading program 1062 have previously been stored in the read only EPROM 1026.

Figure 80:
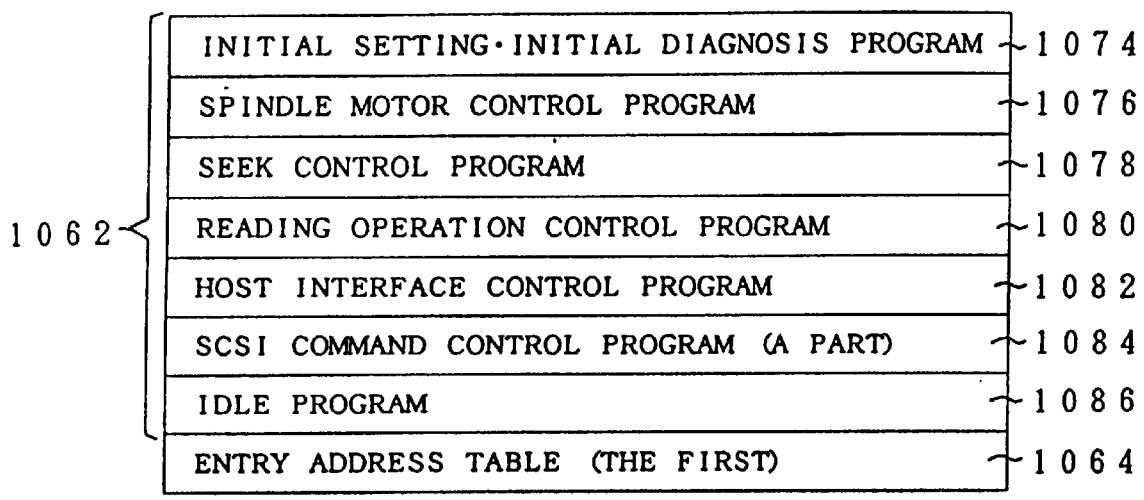
FIG. 80 is an explanatory diagram of the contents of leading programs stored in an EPROM in FIG. 79.

FIG. 80 shows a module construction of the leading program 1062 which is stored in the EPROM 1026. The leading program 1062 comprises: an initial setting•initial diagnosis program 1074; a spindle motor control program 1076; a seek control program 1078; a reading operation control program 1080; a host interface control program 1082; an SCSI command control program 1084; and an idle program 1086. Among them, only a partial command program necessary for communication with the upper apparatus upon activation is stored in the SCSI command control program 1084.

Figure 81:
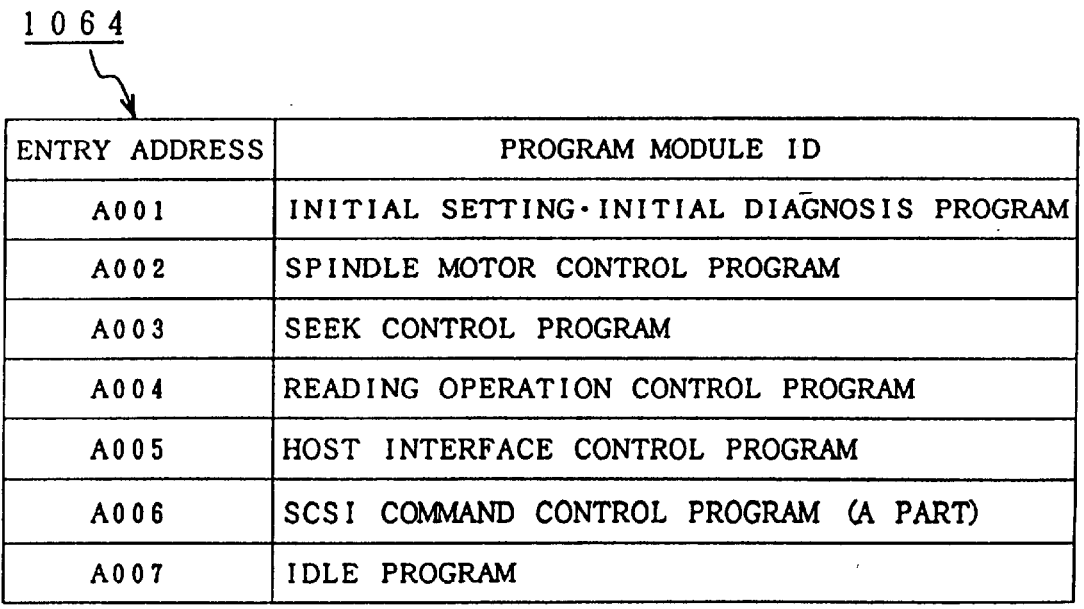
FIG. 81 is an explanatory diagram of an entry address table of the leading programs in FIG. 80.

FIG. 81 shows the contents of the first entry address table 1064 stored together with the leading program 1062 in FIG. 80. Entry addresses A001, A002, . . . , A007 indicative of the head positions in the EPROM 1026 of the program modules are stored in the first entry address table 1064 every ID to specify the program module. Therefore, by referring to the entry address table by the program module ID, the entry address is known and the program can be executed.

Referring again to FIG. 79, a control program 1066 to download to the DRAM 1028 after completion of the initial setting and initial diagnosis in the leading program 1062 of the EPROM 1026 and its entry address table 1068 have previously been stored in a disk medium 1060 provided on the disk enclosure 1000 side.

FIG. 82 shows a module construction of the control program 1066 stored in the disk medium 1060. The control program 1066 stored in the disk medium 1060 comprises: a spindle motor control program 1088; a seek control program 1090; a reading/writing/formatting operation control program 1092; a host interface control program 1094; a cache/ data buffer control program 1096; an SCSI command control program 1098; a defective block management program (fault block management program) 1100; and an ECC error correction program 1102.

FIG. 83 shows the contents of the entry address table 1068 stored together with the control program 1066 stored in the disk medium in FIG. 82. Entry addresses A100, A101, . . . , A107 showing the head positions of the program modules in the DRAM 1028 are stored in the entry address table 1066 for the ID of each program module. Therefore, by referring to the entry address table 1068 by the program module ID, the target program module can be executed.

Referring again to FIG. 79, the control program 1066 stored in the disk medium 1060 is stored into the DRAM 1028 as a control program 1070 by the download which is executed after completion of the initial setting and initial diagnosis by the leading program 1062 in the EPROM 1026. In the invention, a second entry address table 1072 which is stored in the DRAM 1028 has the contents corresponding to a combination of the first entry address table 1064 in the EPROM 1026 and the entry address table 1068 of the disk medium 1060. With respect to the making of the second entry address table 1072, the first entry address table 1064 stored in the EPROM 1026 is first downloaded into the DRAM 1028. Subsequently, the entry address table 1068 is downloaded after the downloading of the control program 1070 from the disk medium 1060. In this instance, in the second entry address table 1072 which was first downloaded, the program module in the leading program 1062 that is also used after completion of the leading process are left as they are. The program module which are not used after the end of the leading process are replaced by the contents in the entry address table 1068 which was downloaded from the disk medium 1060.

Figure 84:
FIG. 84 is an explanatory diagram of the second entry address table after completion of the download.

FIG. 84 shows the contents in the second entry address table 1072 after the end of the download which was stored in the DRAM 1028 in FIG. 79. In the second entry address table 1072, only the idle program having the head entry address A007 remains in the first entry address table 1064 which was downloaded from the EPROM 1026. All of the programs other than the idle program have been replaced by the contents in the entry address table 1068 which was downloaded from the disk medium 1060 in FIG. 83. After completion of the download, the MPU 1024 accesses the necessary program module with reference to the second entry address table 1072 in the DRAM 1028 by a function of its program allocating section 1061 and executes a control process. In this instance, as shown in FIG. 84, the entry address A007 of the idle program in the EPROM 1026 has been stored in the second entry address table 1072. Therefore, in the idle state, the MPU 1024 accesses to the entry address A007 in the EPROM 1026 and executes the idle program. As a hardware, when the MPU accesses to the EPROM 1026 and executes the program module, a chip selection signal of the EPROM 1026 is turned on and a chip selection signal of the DRAM 1028 is turned off. Thus, in the DRAM 1028 in which the chip selection signal is off, the operating state is shifted from the enable state to the disable state in which the operation is stopped, so that an electric power consumption can be reduced as compared with that in the enable state. When the MPU accesses to the control program 1070 on the DRAM 1028 side and executes it, the chip selection signal for the DRAM 1028 is turned on and the chip selection signal for the EPROM 1026 is turned off.

Figure 85:
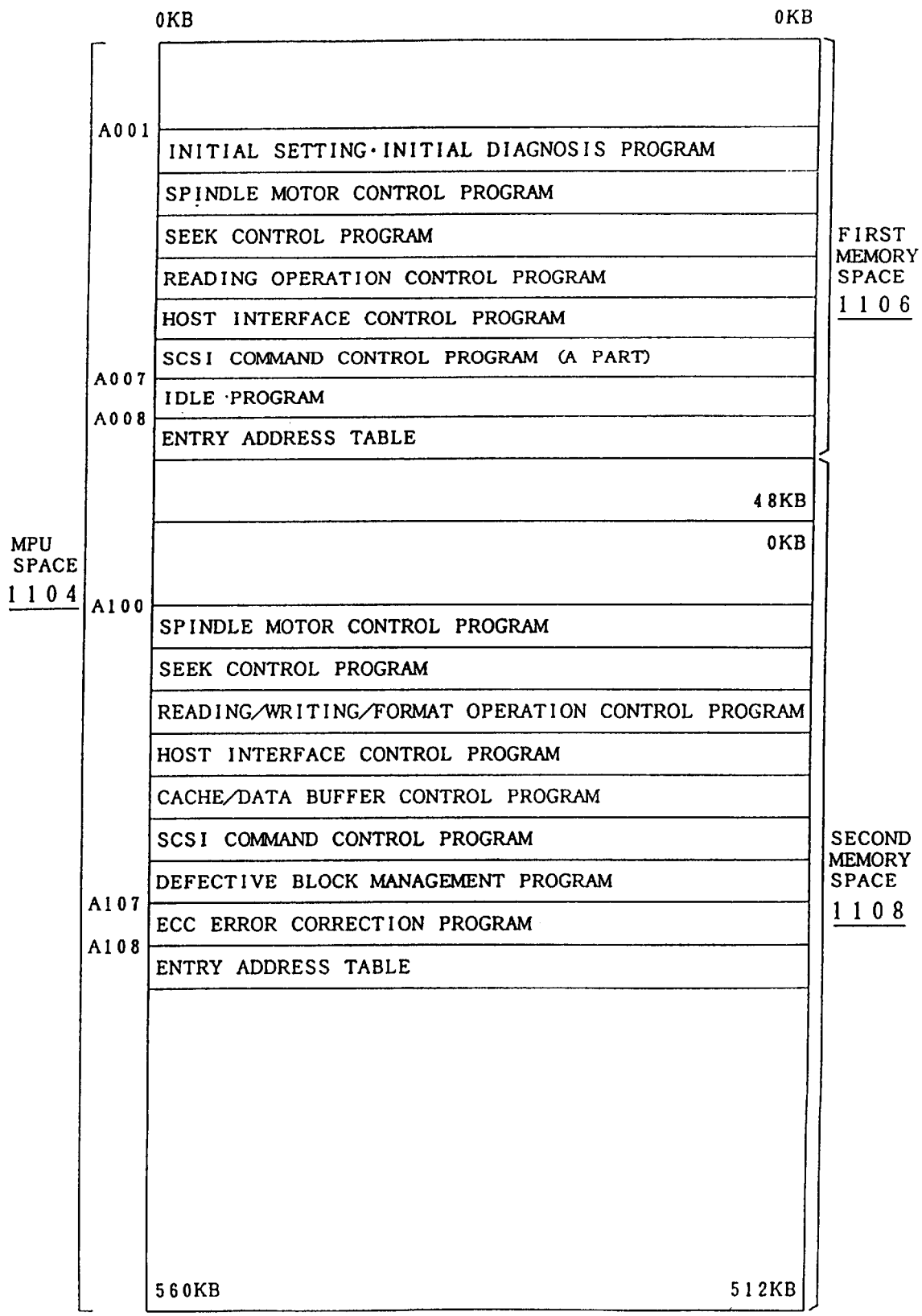
FIG. 85 is an explanatory diagram of an MPU memory space to which the invention is applied.

FIG. 85 shows an MPU memory space which is constructed by the EPROM 1026 and DRAM 1028 when it is seen from the MPU 1024 in FIG. 79. An MPU space 1104 has a memory capacity of, for example, 0 to 560 Kbytes. In the above memory capacity, the former capacity of 0 to 48 Kbytes is constructed as a first memory space 1106 which is allocated by the EPROM 1026 and the remaining memory capacity of 0 to 512 kBytes is allocated as a second memory space 1108 using the DRAM 1028. The MPU 1024 executes processes as one MPU space 1104 without recognizing a difference between the first memory space 1106 and the second memory space 1108. That is, upon activation in association with the turn-on of the power source of the apparatus, only the leading program 1062 and the first entry address table 1064 are stored in the MPU space 1104 corresponding to the first memory space 1106. Therefore, the MPU 1024 accesses the entry address of the necessary program with reference to the entry address table 1064 and executes the initial setting and initial diagnosing processes. As programs which are necessary at the initial setting and initial diagnosis, a spindle motor control program, a seek control program, a reading operation control program, a host interface control program, an SCSI command control program, and an idle program are prepared.

When the initial setting and initial diagnosing processes are finished by the execution of the leading program, the control program 1066 is downloaded from the external disk medium 1060 into the MPU space 1104 corresponding to the second memory space 1108. In the downloading, the second entry address table 1068 comprising the entry address of the idle program in the first memory space 1106 that is used after completion of the activation and the entry address of each program module of the control program 1066 which was downloaded from the disk medium 1060 is produced and stored.

After the control program 1066 was downloaded, the MPU 1024 obtains the entry address with reference to the second entry address table 1072 in FIG. 84 by the corresponding program module ID in accordance with the reception of a command from the upper apparatus or the occurrence of various interruptions. The MPU sequentially reads out the corresponding microprograms from the addresses in the memory space designated by the entry address and executes processes.

A jump command or a call command to shift the process to the idle program in the first memory space 1106 is stored in the last location of each program module of the control program 1066 provided in correspondence to the second memory space 1108. Namely, by executing the jump command or call command, the entry address A007 of the idle program is obtained with reference to the second entry address table 1068. The program counter is set into the entry address A007 in the first memory space 1106. The apparatus enters the idle state by executing the idle program. The idle program is a processing status program which is executed when the input/output process is not performed.

With respect to the shift to the idle state, the hardware turns on the chip selection signal to the EPROM 1026 and also turns off the chip selection signal to the DRAM 1028. When the operation mode is shifted to the executing state of the idle program in the first memory space 1106, the MPU 1024 refers to the self interruption bit register. When an arbitrary interruption bit is turned on by the interruption bit register, the jump command to shift the processing routine to the entry address table 1068 in the second memory space 1108 or the call command is executed. The processing routine advances to the process of the second memory space 1108 from the first memory space 1106. In this process as well, in response to the execution of the jump command or call command, the hardware turns off the chip selection signal to the EPROM 1026 and turns off the chip selection signal to the DRAM 1028. The DRAM is activated and the processing routine is shifted to the entry address A108 in the entry address table 1068 by the jump command or call command. The entry address of the program module corresponding to the interruption is recognized. The process of the corresponding program module in the control program 1066 is executed.

Figure 86:
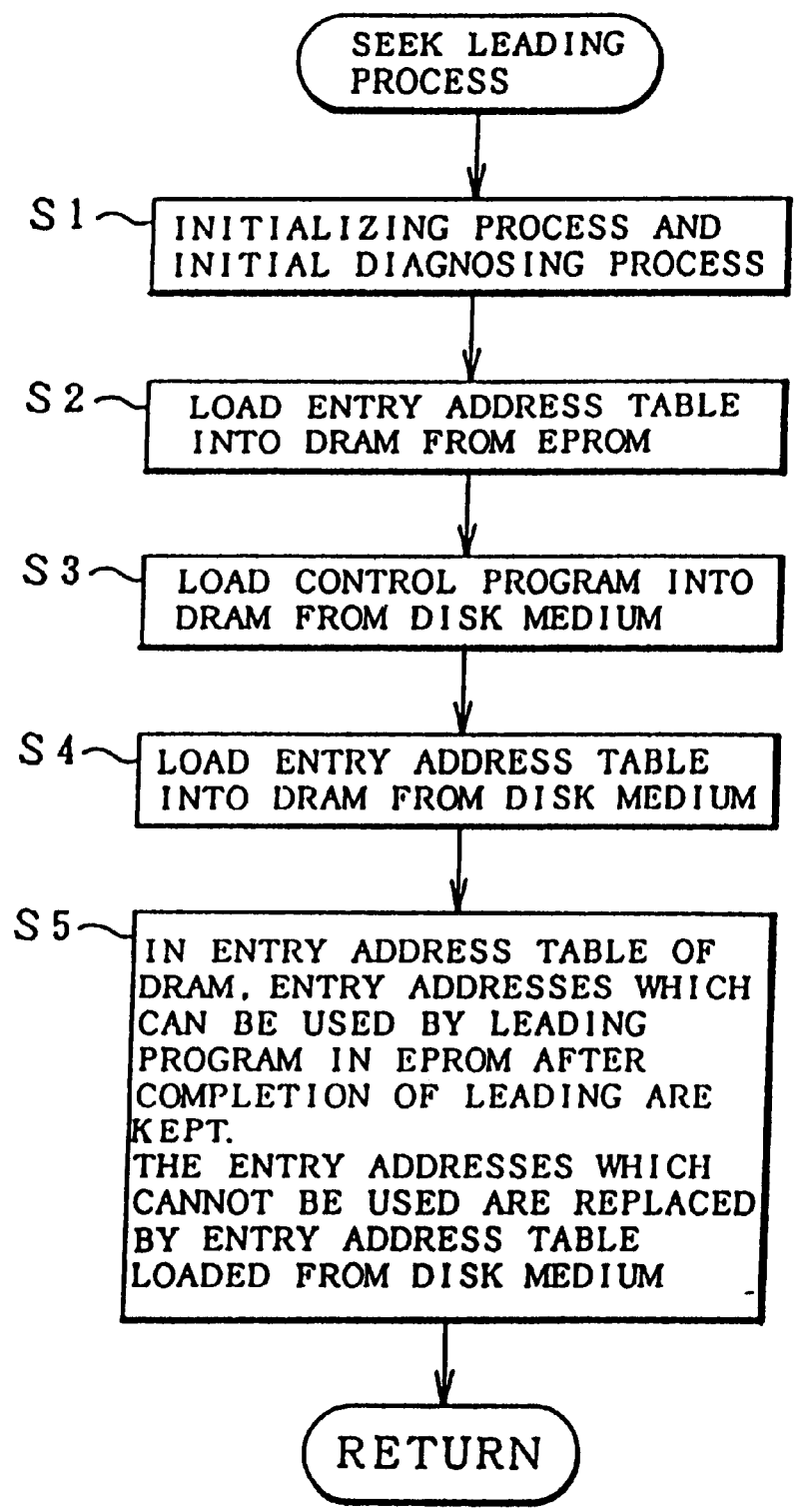
FIG. 86 is a flowchart for the processing operation of the invention.

A flowchart of FIG. 86 shows the processing operation accompanied with the program allocation by the MPU 1024. When the power supply of the disk apparatus is turned on, the system leading process in step S1 is executed. In the system leading process, the MPU 1024 executes the initial setting process, initial diagnosing process, and further a downloading process for the DRAM by using each program module in the leading program 1062 stored in the EPROM 1026.

Figure 87:
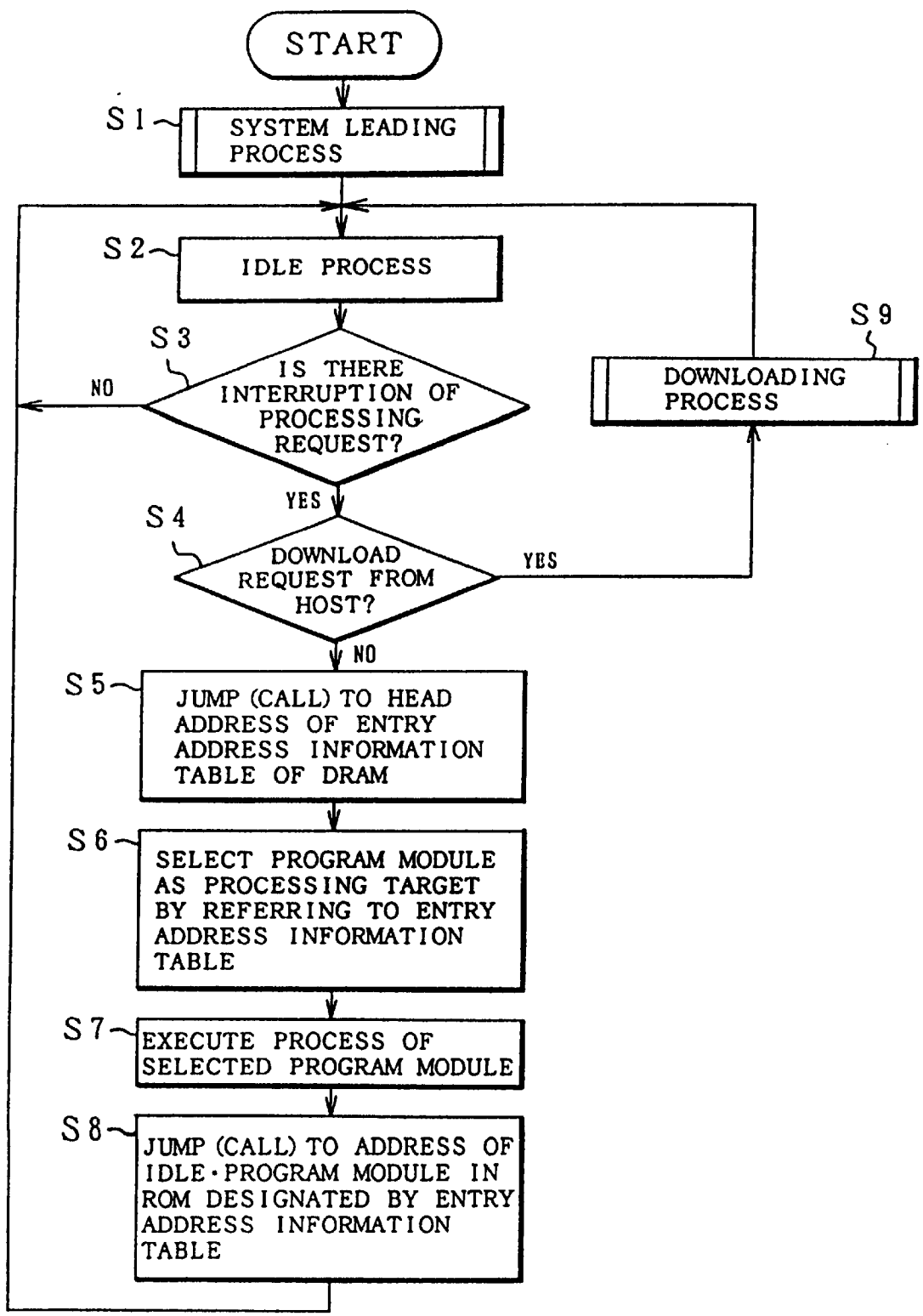

A flowchart of FIG. 87 shows the details of the system leading process in step S1 in FIG. 86 as a subroutine. First, the MPU 1024 executes the initial setting process and initial diagnosing process in step S1. Namely, the MPU 1024 executes an initial setting and initial diagnosing program 1074 in the leading program 1062 stored in the EPROM 1026 in FIG. 80. In the initial setting and initial diagnosing processes, the spindle motor 22 is driven by the spindle motor control program 1076, so that a rotating state of the disk medium 1060 is obtained. After completion of the initial setting and initial diagnosing processes in step S1, a downloading process of the control program to the DRAM 1028 is executed. First in step S2, the first entry address table 1064 stored in the EPROM 1026 is loaded into the DRAM 1028 as a second entry address table 1072. In step S3, the control program 1066 and its entry address table 1068 stored in the disk medium 1060 of the disk enclosure 1000 are loaded into the DRAM 1028. Actually, the control program 1066 and entry address table 1068 in the disk medium 1060 are read out and stored into the data buffer memory 1032. After that, the control program 1070 is first loaded into the DRAM 1028. In step S4, the downloaded entry address table 1068 stored in the buffer memory 1032 is loaded into the DRAM. In such a loading operation, the new second entry table 1072 shown in step S5 is formed. That is, in the second entry address table 1072 loaded in the DRAM 1028 in step S2, the entry addresses which can be used after completion of the activation, namely, only the entry address of the idle program is left and the other unusable entry addresses are replaced by the entry address table 1068 of the control program 1066 transferred from the buffer memory 1032.

Referring again to FIG. 86, after completion of the initial setting and initial diagnosing processes which are executed at the time of the activation of the system in step S1 and, further, after completion of the downloading of the control program and the making of the new entry address table, the activation is finished and the processing routine advances to the idle process in step S2. In the idle process, the MPU 1024 knows the entry address of the idle program with reference to the second entry address table 1072 and accesses to the idle program in the EPROM 1026 and executes the corresponding process. In this instance, although the chip selection signal for the EPROM 1026 to which the program was allocated is on, the chip selection signal for the DRAM 1028 to which the program is not allocated is turned off. The DRAM 1028 is in a disable state. Therefore, the apparatus is in a state of the reduced electric power consumption. The MPU 1024 which entered the idle state in step S2 judges the presence or absence of the interruption in association with the processing request with reference to the self interruption bit register in step S3. When an arbitrary interruption bit in the interruption bit register is set to "1" and the interruption of the processing request is recognized, a check is made in step S4 to see if the processing request is a downloading request from the host computer or not. If it is not the downloading request from the host computer, step S5 follows. The jump command (or call command) is executed and a read accessing process to the entry address A108 as a head in the second entry address table 1072 in the DRAM 1028 is executed. In association with the execution of the jump command (or call command), the chip selection signal of the EPROM 1026 which has been set to ON so far is turned off by the hardware. At the same time, the chip selection signal of the DRAM 1028 which has been set to OFF so far is turned on and the operating mode is switched to the enable state.

In step S5, when the processing routine is jumped to the head address in the second entry address table 1072 in the DRAM 1028, step S6 follows. The entry address of the program module as a target to be processed by the interruption request is recognized with reference to the second entry address table 1072 and the recognized entry address is set into the program counter. In step S7, the process of the selected program module is executed. When the process of the program module is finished in step S7, the jump command (or call command) is executed in step S8 and the processing routine is jumped to the entry address of the idle program in the EPROM that is designated by the second entry address table. The processing routine is again returned to the idle process in step S2. On the other hand, after the interruption of the processing request was received in step S3, if there is a downloading request from the host computer in step S4, step S9 follows and the downloading process is executed. Such an instruction of the downloading request from the host computer is executed, for example, as a part of the program revising process of the disk apparatus in association with the version-up of a notebook type computer serving as a host side.

Figure 88:
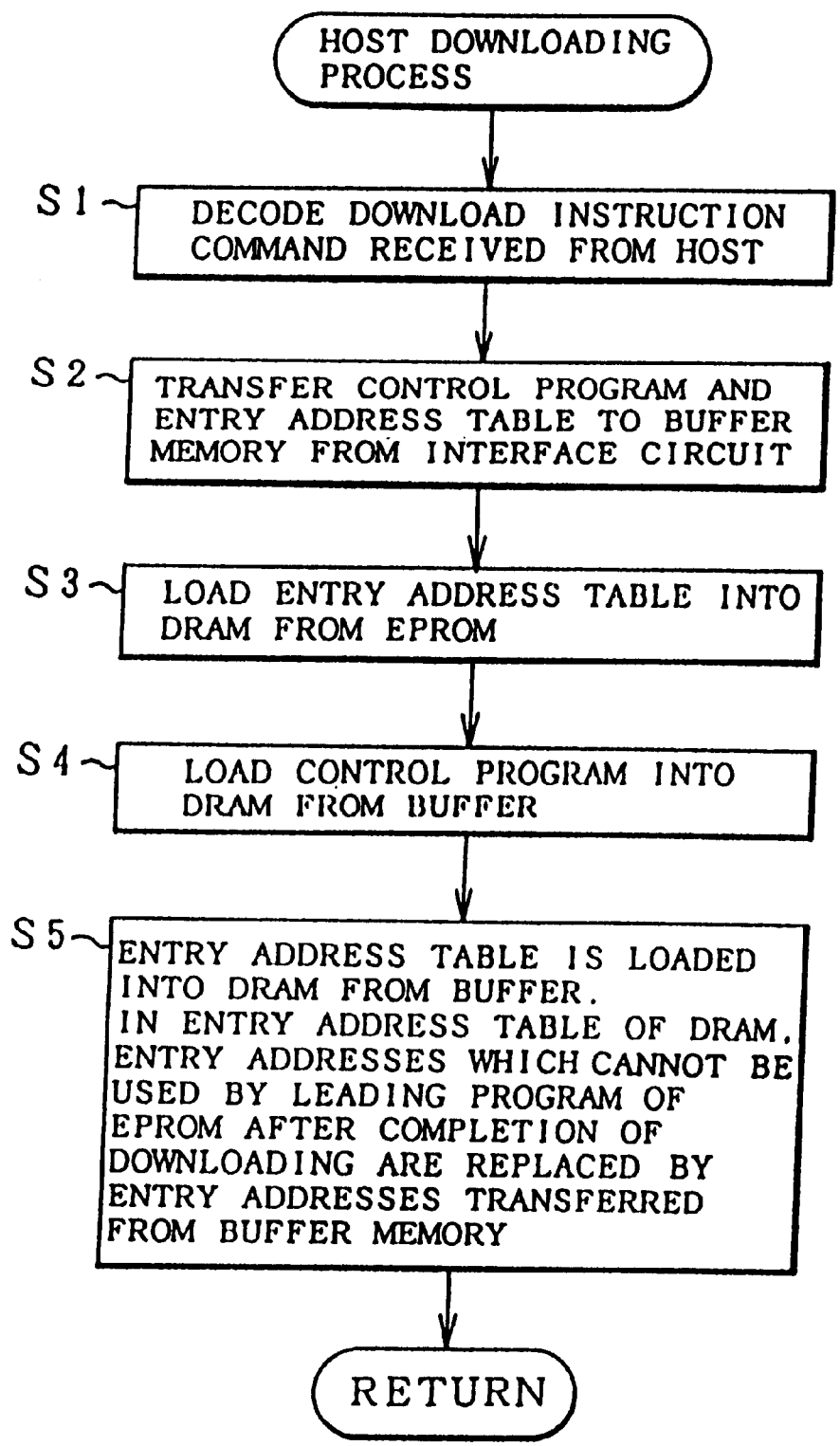
FIG. 88 is a flowchart for the processing operation when a download instruction is received from an upper apparatus.

FIG. 88 shows the details of the downloading process based on the downloading request from the host shown in step S9 in FIG. 86. First in step S1, a download instructing command received from the host is decoded. In step S2, the control program and entry address table transferred from the host side through an interface circuit are stored into the buffer memory 1032. In step S3, the first entry address table 1064 is loaded into the DRAM 1028 from the EPROM 1026 and is set into the second entry address table 1072. In step S4, the control program is transferred from the buffer memory 1032 to the DRAM 1028 and is downloaded. In step S5, the entry address table of the control program is likewise transferred from the buffer memory 1032 to the DRAM. In step S6, in the second entry address table 1072 in the DRAM 1028 which has already been loaded, the entry address of the idle program which can be used by the leading program in the EPROM 1026 after completion of the downloading is left and the entry addresses of the other unusable program modules are replaced by the entry address table 1068 of the control program 1066 transferred from the buffer memory 1032. After completion of the above processes, the processing routine is returned to the idle process in step S2 of the main routine in FIG. 86. The switching operation is executed between the idle state using the idle program in the EPROM 1026 similar to that upon system activation and the execution of the control program of the DRAM 1028 when the interruption of the processing request occurs in the idle state.

Further, in the host downloading process in FIG. 88, after the control program was downloaded to the DRAM 1028, the control program and entry address table in the buffer memory 1032 can be also written into the disk medium 1060 as necessary. Thus, when the power supply is again turned on after completion of the downloading instruction from the host, the revised control program stored in the disk medium can be downloaded into the DRAM 1028 without needing the downloading from the host.

According to the invention as mentioned above, the memory of a large electric power consumption due to the data holding is not used as much as possible but the memory of a small electric power consumption is used. Thus, the number of accessing times to the memory of the large electric power consumption is reduced and the electric power consumption can be suppressed.

Specifically speaking, in the operation of the MPU using the control program which was downloaded into the second memory such as a DRAM or the like of a large electric power consumption, even after completion of the leading process of the apparatus, the specific program module included in the first memory such as a ROM or the like of a small electric power consumption in which the leading program has been stored, for example, the idle program is used. Therefore, the time which is required to use the program module on the second memory of the large electric power consumption is decreased. The electric power consumption can be suppressed by only an amount of such a reduced time. This point shall also similarly be applied to the case of downloading from the host computer.

Although the embodiment of FIGS. 79 to 88 relates to the disk apparatus as an example, the invention can be also similarly applied to an optical disk apparatus having a construction corresponding to the disk enclosure 1000 and drive controller 1012 of the disk apparatus, floppy disk apparatus, magnetic tape apparatus, and further semiconductor memory apparatus.

With respect to the disk apparatus, optical disk apparatus, and magnetic tape apparatus, after the control program and entry address table read out from an external medium were once stored into the buffer memory, they are loaded into the DRAM. However, in the semiconductor disk apparatus, the control program and entry address table can be downloaded into the DRAM just after they were read out.

Further, the invention is not limited to the direct access memory apparatus such as a disk apparatus or the like but can be also applied as it is to an apparatus such as computer apparatus, communication apparatus, and the like so long as they operate under program control by the microprocessor.

Moreover, in order to further reduce the electric power consumption of the DRAM 1028 when the program allocation to be executed by the MPU 1024 is assigned to the idle program of the EPROM 1026, simultaneously with the turn-off of the chip selection signal to the DRAM 1028, a refreshing cycle of a refreshing circuit provided for the DRAM 1028 can be also changed to a long cycle such as not to exceed the limit.

Ordinarily, in the DRAM 1028, the refreshing operation is executed at present at a speed of 15 to 16 microseconds. In the off state of the chip selection signal in which the DRAM 1028 is not used, accordingly, by switching the refreshing cycle from a few microseconds to a few milliseconds, the electric power consumption of the DRAM can be also reduced.

In the above embodiments, although the invention has been applied while using the ROM as a first memory and using the RAM as a second memory, the invention can be also similarly applied to a case of using RAMs for the first and second memories. For instance, the invention can be applied to the case where an SRAM is used as a first memory and a DRAM is used as a second memory.

What is claimed is:

1. A disk apparatus comprising:

a head;

an actuator supporting said head and movable in radial direction of a recording surface of a disk medium; and a motor for rotating said actuator in a predetermined range of a rotational angle, said motor having a flat movable coil supported by said actuator, a pair of permanent magnets fixedly arranged at positions which define a space between said pair of magnets for said coil so that said magnets sandwich said movable coil, and a pair of yoke members for supporting said permanent magnets and forming a magnetic circuit, said pair including a first and second yoke member, wherein said pair of yoke members are fixed together by an adsorption by said permanent magnets whereby said pair of yoke members when in their final operating positions, are held together primarily by magnetic attraction substantially without the use of any other fastening means.

2. An apparatus according to claim 1, wherein each said yoke member further includes a flat plate member; and said first yoke member further includes a plurality of upright members extending toward said second yoke member, each said upright member having an end defining a front edge that faces said second yoke member, and each said upright member further defining sides of said space between said pair of permanent magnets, at least one of said front edges having a projection for positioning said pair of yokes, and said second yoke member having a reception hole for positioning, wherein said reception hole engages said projection.

3. An apparatus according to claim 1, wherein said movable coil further defines a right coil portion opposed to a left coil portion, said left and right coil portions attached through a front coil portion and a back coil portion that opposes the front coil portion, each said portion having an inner edge and an outer edge, each said inner edge facing an opposing portion; and said permanent magnets further having front and rear outer edges respectively corresponding to said front and rear inner edges of said front and rear coil portions, wherein said front and rear outer edges of said pair of permanent magnets are arranged so as to slightly overlap said front and rear inner edges of said movable coil in a radial direction of said actuator, and a magnetic flux of said permanent magnet is allowed to pass outside of a torque generation valid portion defined by said right and left coil portions of said movable coil.

4. A disk apparatus comprising:

an actuator for supporting a head so as to be movable in a radial direction for a recording surface of a disk medium; and a motor rotating said actuator in a predetermined range of a rotational angle;

said actuator including a flat movable coil supported by said actuator, a permanent magnet, provided at a position opposite to said movable coil for imparting a driving force, an upper yoke member and a lower yoke member oppositely arranged with said movable coil positioned between said yoke members, upright members, formed integrally on said upper yoke member, for connecting the upper yoke member and the lower yoke member and defining a space between said upper and lower yoke members, a projection for positioning said upper yoke member and said lower yoke member, and a reception hole provided for engaging said projection; and said upper yoke member and lower yoke member are attracted, connected and secured together, when in their final operating positions, substantially without the use of any other fastening means, primarily by the magnetic attracting force of said permanent magnet in an engagement state achieved by said upright member and said projection for positioning.

5. A disk apparatus comprising:

a head;

an actuator supporting said head and movable in radial direction of a recording surface of a disk medium; and a motor for rotating said actuator in a predetermined range of a rotational angle, said motor having a flat movable coil supported by said actuator;

a permanent magnet provided at a position opposite to said movable coil, for imparting a driving force; and a pair of yoke members for supporting said permanent magnet and forming a magnetic circuit, said pair of yoke members including a first and a second yoke member;

wherein said pair of yoke members are fixed together by an adsorption by said permanent magnet, whereby said pair of yoke members, when in their final operating positions, are held together primarily by magnetic attraction substantially without the use of any other fastening means.

6. A disk apparatus comprising:

an actuator for supporting a head so as to be movable in a radial direction for a recording surface of a disk medium; and a motor rotating said actuator in a predetermined range of a rotational angle;

said actuator including a flat movable coil supported by said actuator;

a permanent magnet, provided at a position opposite to said movable coil for imparting a driving force;

an upper yoke member and a lower yoke member oppositely arranged with said movable coil positioned between said yoke members; and upright member, formed integrally on said upper yoke member, for connecting the upper yoke member and the lower yoke member and defining a space between said upper and lower yoke members;

said upper yoke member and said lower yoke member are attracted, connected and secured together, when in their final operating positions, substantially without the use of any fastening means, primarily by the magnetic attracting force of said permanent magnet in an engagement state achieved by said upright member.

* * * * *